US011593105B2

(12) United States Patent
Ould-Ahmed-Vall

(10) Patent No.: US 11,593,105 B2
(45) Date of Patent: Feb. 28, 2023

(54) VECTOR LOGICAL OPERATION AND TEST INSTRUCTIONS WITH RESULT NEGATION

(71) Applicant: Intel Corporation, Santa Clara, CA (US)

(72) Inventor: ElMoustapha Ould-Ahmed-Vall, Chandler, AZ (US)

(73) Assignee: Intel Corporation, Santa Clara, CA (US)

(*) Notice: Subject to any disclaimer, the term of this patent is extended or adjusted under 35 U.S.C. 154(b) by 20 days.

(21) Appl. No.: 16/236,439

(22) Filed: Dec. 29, 2018

(65) Prior Publication Data

US 2020/0210180 A1    Jul. 2, 2020

(51) Int. Cl.
*G06F 9/305* (2018.01)
*G06F 9/30* (2018.01)

(52) U.S. Cl.
CPC ...... *G06F 9/30029* (2013.01); *G06F 9/30018* (2013.01); *G06F 9/30036* (2013.01)

(58) Field of Classification Search
CPC ............. G06F 9/30021; G06F 9/30029; G06F 9/30036; G06F 9/30018; G06F 9/3016
See application file for complete search history.

(56) References Cited

U.S. PATENT DOCUMENTS

| 6,530,012 B1* | 3/2003 | Wilson | G06F 9/30036 |
| | | | 710/30 |
| 2008/0091991 A1* | 4/2008 | Kapoor | G06F 9/30149 |
| | | | 714/724 |

(Continued)

OTHER PUBLICATIONS

Intel, "Intel 64 and IA-32 Architectures Software Developer's Manual", vol. 1: Basic Architecture, Sep. 2016, 482 pages (Relevant pp. 3-16, A-1, A-2, A-3, and A-4).*

*Primary Examiner* — David J. Huisman
(74) *Attorney, Agent, or Firm* — Nicholson De Vos Webster & Elliott LLP

(57) ABSTRACT

Systems, methods, and apparatuses relating to performing logical operations on packed data elements and testing the results of that logical operation to generate a packed data resultant are described. In one embodiment, a processor includes a decoder to decode an instruction into a decoded instruction, the instruction having fields that identify a first packed data source, a second packed data source, and a packed data destination, and an opcode that indicates a bitwise logical operation to perform on the first packed data source and the second packed data source and indicates a width of each element of the first packed data source and the second packed data source; and an execution circuit to execute the decoded instruction to perform the bitwise logical operation indicated by the opcode on the first packed data source and the second packed data source to produce a logical operation result of packed data elements having a same width as the width indicated by the opcode, perform a test operation on each element of the logical operation result to set a corresponding bit in a packed data test operation result to a first value when any of the bits in a respective element of the logical operation result are set to the first value, and set the corresponding bit to a second value otherwise, and store the packed data test operation result into the packed data destination.

21 Claims, 28 Drawing Sheets

(56) References Cited

U.S. PATENT DOCUMENTS

| | | | | |
|---|---|---|---|---|
| 2012/0216011 A1* | 8/2012 | Gove | ................. | G06F 15/8053 |
| | | | | 712/7 |
| 2014/0281371 A1* | 9/2014 | Thantry | .............. | G06F 9/30036 |
| | | | | 712/7 |
| 2020/0225953 A1* | 7/2020 | Magklis | .............. | G06F 9/30018 |

* cited by examiner

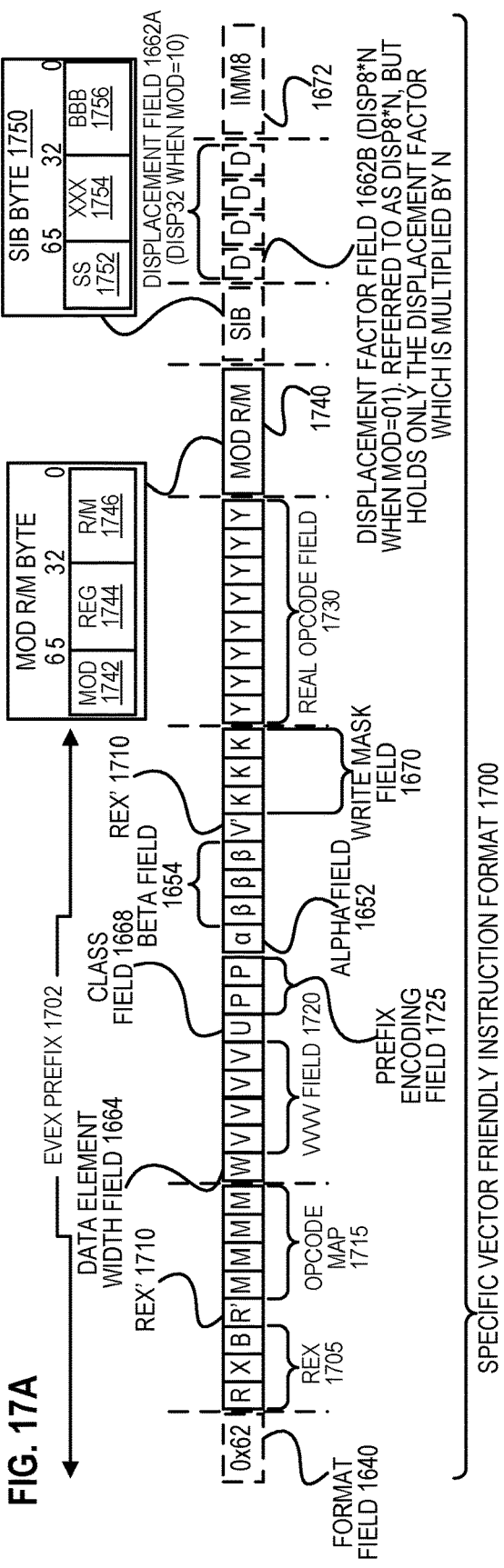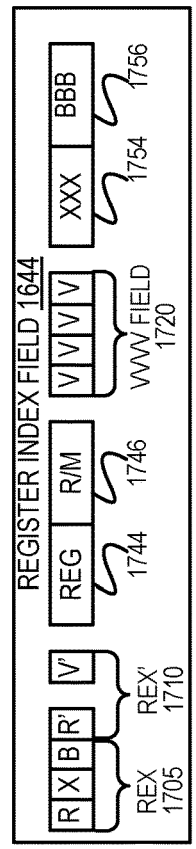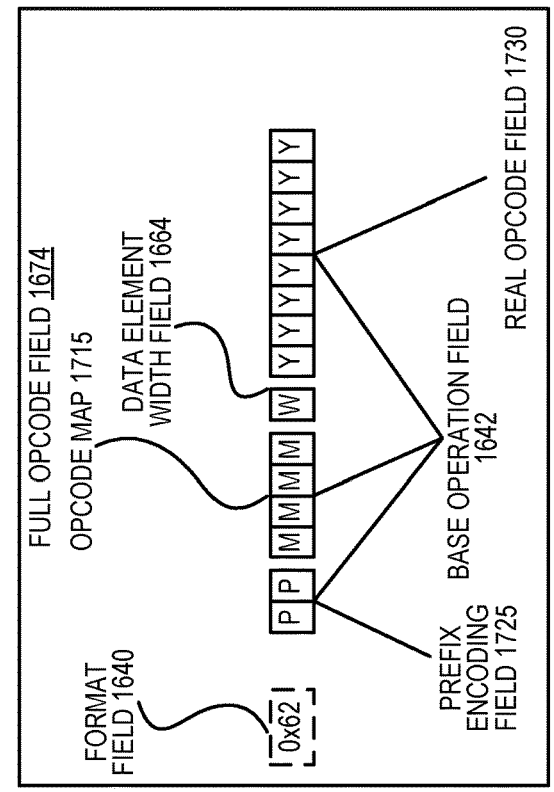
FIG. 17A
FIG. 17B
FIG. 17C

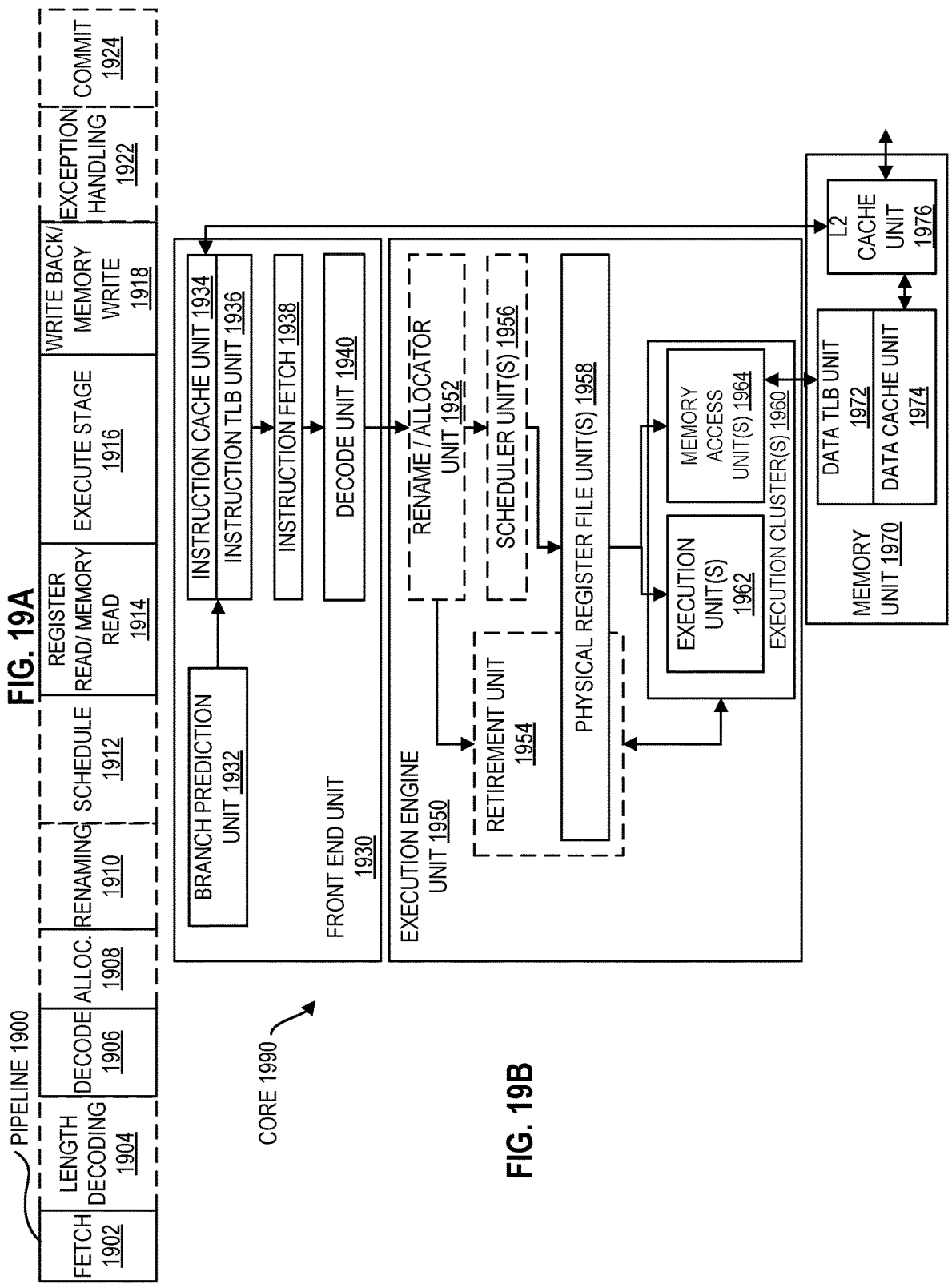

VECTOR LOGICAL OPERATION AND TEST INSTRUCTIONS WITH RESULT NEGATION

TECHNICAL FIELD

The disclosure relates generally to electronics, and, more specifically, an embodiment of the disclosure relates to circuitry to implement a vector logical operation and test instruction.

BACKGROUND

A processor, or set of processors, executes instructions from an instruction set, e.g., the instruction set architecture (ISA). The instruction set is the part of the computer architecture related to programming, and generally includes the native data types, instructions, register architecture, addressing modes, memory architecture, interrupt and exception handling, and external input and output (I/O). It should be noted that the term instruction herein may refer to a macro-instruction, e.g., an instruction that is provided to the processor for execution, or to a micro-instruction, e.g., an instruction that results from a processor's decoder decoding macro-instructions.

BRIEF DESCRIPTION OF THE DRAWINGS

The present disclosure is illustrated by way of example and not limitation in the figures of the accompanying drawings, in which like references indicate similar elements and in which:

FIG. 17A is a block diagram illustrating fields for the generic vector friendly instruction formats in FIGS. 16A and 16B according to embodiments of the disclosure.

FIG. 17B is a block diagram illustrating the fields of the specific vector friendly instruction format in FIG. 17A that make up a full opcode field according to one embodiment of the disclosure.

FIG. 17C is a block diagram illustrating the fields of the specific vector friendly instruction format in FIG. 17A that make up a register index field according to one embodiment of the disclosure.

FIG. 19A is a block diagram illustrating both an exemplary in-order pipeline and an exemplary register renaming, out-of-order issue/execution pipeline according to embodiments of the disclosure.

FIG. 19B is a block diagram illustrating both an exemplary embodiment of an in-order architecture core and an exemplary register renaming, out-of-order issue/execution architecture core to be included in a processor according to embodiments of the disclosure.

DETAILED DESCRIPTION

Figure 1:
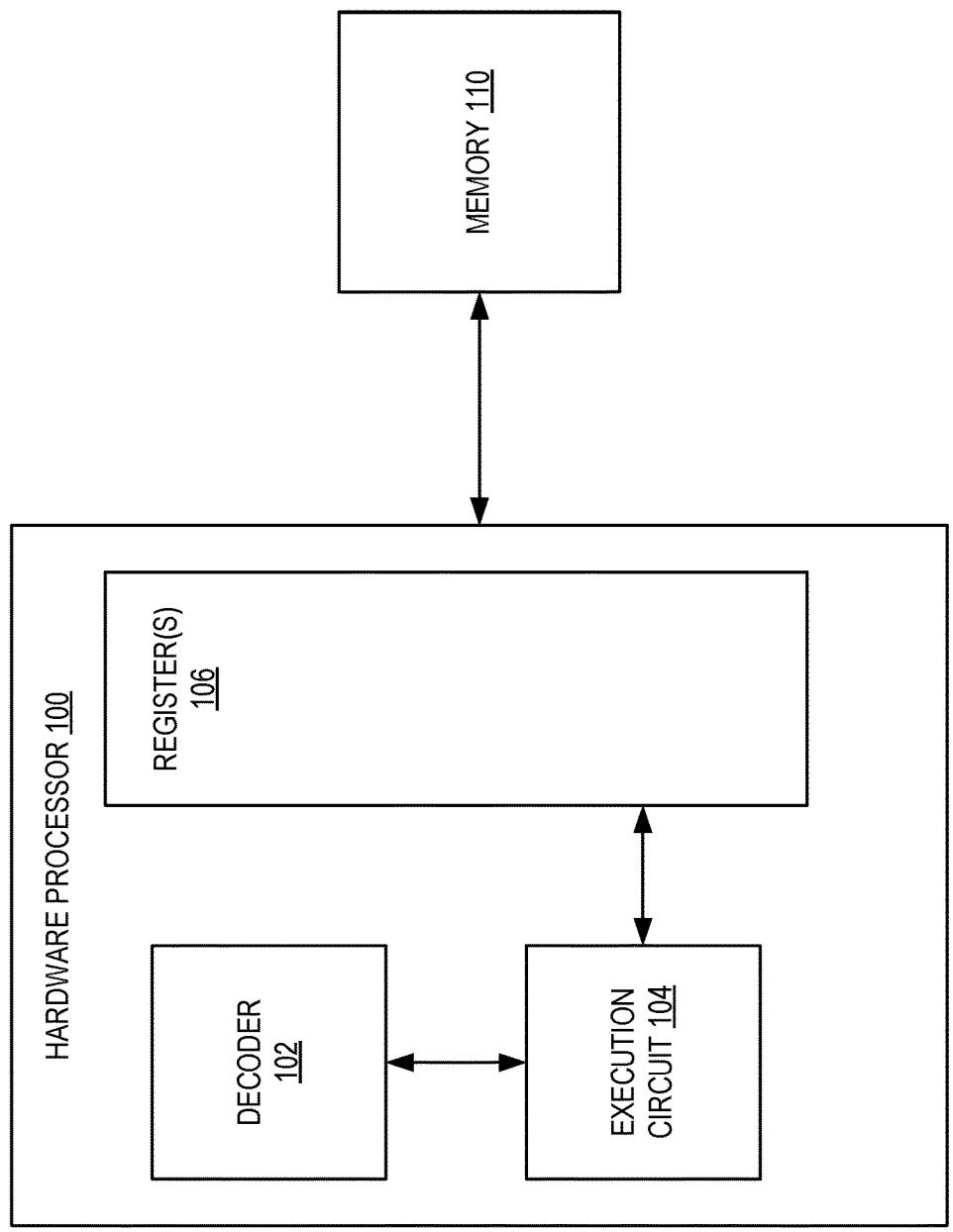
FIG. 1 illustrates a hardware processor coupled to a memory according to embodiments of the disclosure.

In the following description, numerous specific details are set forth. However, it is understood that embodiments of the disclosure may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

A (e.g., hardware) processor (e.g., having one or more cores) may execute instructions (e.g., a thread of instructions) to operate on data, for example, to perform arithmetic, logic, or other functions. For example, software may request an operation and a hardware processor (e.g., a core or cores thereof) may perform the operation in response to the request. One non-limiting example of an operation is a logical operation on packed data elements (e.g., logical OR, logical exclusive OR (XOR), NOT of logical OR, or, NOT of logical XOR of a vector) and testing the results of that logical operation to generate a packed data resultant. In one embodiment, the test output is true (e.g., binary one) if any of the input results are true (e.g., binary one), and false (e.g., binary zero) otherwise. In another embodiment, the test output is false (e.g., binary zero) if any of the input results are false (e.g., binary zero), and true (e.g., binary one) otherwise. In certain embodiments, the packed data resultant is a mask vector. In certain embodiments, the logical operation is a bitwise logical operation, for example, so that the bitwise logical operation is performed on a respective bit from a same bit location of a first packed data source operand and a same bit location of a second packed data source operand. In one embodiment, the operation does not include performing a bitwise AND of two input source operands, or setting a flag accordingly. The instruction format may include an opcode to indicate which logical operation is performed (e.g., XOR, OR, NOT OR, NOT XOR), and a size of each data element. The instruction may also allow for write masking of the resultant vector with a write mask, for example, where the write mask (e.g., write mask register) is identified by a field of the instruction. An instruction may include one or more (e.g., any) of the fields discussed herein.

The instructions disclosed herein are improvements to the functioning of a processor (e.g., of a computer) itself. Instruction decode circuitry (e.g., a decoder) not having such an instruction as a part of its instruction set would not decode as discussed herein. An execution circuit not having such an instruction as a part of its instruction set would not execute as discussed herein. For example, a single instruction that, when a processor decodes the single instruction into a decoded instruction and that decoded instruction is executed by the processor, performs a bitwise logical operation (e.g., as indicated by an opcode) on a first packed data source and a second packed data source to produce a logical operation result of packed data elements having a same width as a width indicated by an opcode, performs a test operation on each element of the logical operation result to set a corresponding bit in a packed data test operation result to a first value when any of the bits in a respective element of the logical operation result are set to the first value, and set the corresponding bit to a second value otherwise, and stores the packed data test operation result into the packed data destination, is an improvement to the functioning of the processor (e.g., of a computer) itself.

FIG. 1 illustrates a hardware processor 100 coupled to a memory 110 according to embodiments of the disclosure. Depicted hardware processor 100 includes a hardware decoder 102 (e.g., decode unit or decode circuit) and a hardware execution circuit 104 (e.g., execution unit). Depicted hardware processor 100 includes register(s) 106. Registers may include one or more of registers to perform operations in, e.g., additionally or alternatively to access of (e.g., load or store) data in memory 110. Note that the figures herein may not depict all data communication connections. One of ordinary skill in the art will appreciate that this is to not obscure certain details in the figures. Note that a double headed arrow in the figures may not require two-way communication, for example, it may indicate one-way communication (e.g., to or from that component or device). Any or all combinations of communications paths may be utilized in certain embodiments herein.

Hardware decoder 102 may receive an (e.g., single) instruction (e.g., macro-instruction) and decode the instruction, e.g., into micro-instructions and/or micro-operations. Hardware execution circuit 104 may execute the decoded instruction (e.g., macro-instruction) to perform an operation or operations. For example, an instruction to be decoded by decoder 102 and for the decoded instruction to be executed by execution circuit 104 may be any instruction discussed herein, e.g., in FIGS. 3-15. Hardware execution circuit 104 may be any of the execution circuits in FIGS. 4-15. Certain embodiments herein are directed to a processor that includes an instruction in its instruction set that performs a logical operation on packed data elements (e.g., logical OR, logical exclusive OR (XOR), NOT of logical OR, or, NOT of logical XOR of a vector) and tests the results of that logical operation to generate a packed data resultant. In certain embodiments, the logical operation is a bitwise logical operation, for example, that operates on individual bits (e.g., pairs of bits from a same element position in two packed data elements). In certain embodiments, a bitwise logical OR operation compares, for each element position of the first packed data source and the second packed data source, a bit from an element position in a first packed data source and a bit from a same element position in a second packed data source and sets a resultant bit to a zero (e.g., a logical zero or binary zero) if both the compared bits are 0, and otherwise sets the resultant bit to a one (e.g., a logical one or binary one). In certain embodiments, a bitwise logical exclusive OR (XOR) operation compares, for each element position of the first packed data source and the second packed data source, a bit from an element position in a first packed data source and a bit from a same element position in a second packed data source and sets a resultant bit to a one (e.g., a logical one or binary one) when only one of the compared bits is a one, but sets the resultant bit to a zero (e.g., a logical zero or binary zero) if both of the compared bits are 1 or both of the compared bits are 1. In certain embodiments, a bitwise logical NOT operation takes a single bit as input and outputs a one for a resultant bit if the input bit is a zero, and outputs a zero for a resultant bit if the input bit is a one. In certain embodiments, a bitwise logical AND operation compares, for each element position of the first packed data source and the second packed data source, a bit from an element position in a first packed data source and a bit from a same element position in a second packed data source and sets a resultant bit to a one (e.g., a logical one or binary one) if both the compared bits are 1, and otherwise sets the resultant bit to a zero (e.g., a logical zero or binary zero).

The decoder 102, execution circuit 104, and registers 106 may be of a single core of the processor, e.g., and multiple cores each with an instance of the circuitry may be included. The processor (e.g., and core thereof) may be a processor and/or core according to any of the disclosure herein.

Figure 2:
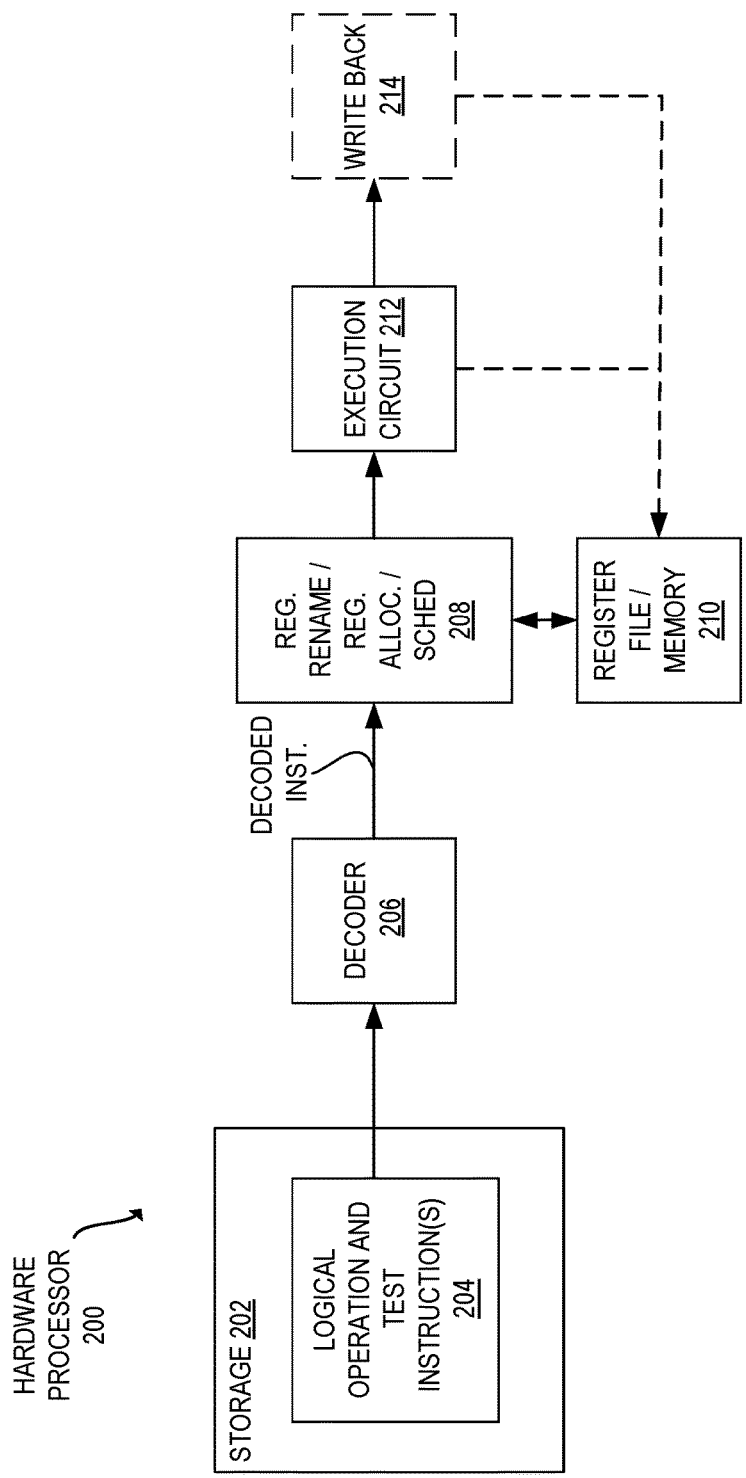
FIG. 2 illustrates a hardware processor coupled to storage that includes one or more logical operation and test instructions according to embodiments of the disclosure.

FIG. 2 illustrates a hardware processor 200 coupled to storage 202 that includes one or more logical operation and test instructions 204 according to embodiments of the disclosure. In certain embodiments, a logical operation and test instruction is according to any of the disclosure herein. In one embodiment, e.g., in response to a request to perform an operation, the instruction (e.g., macro-instruction) is fetched from storage 202 and sent to decoder 206. In the depicted embodiment, the decoder 206 (e.g., decoder circuit) decodes the instruction into a decoded instruction (e.g., one or more micro-instructions or micro-operations). The decoded instruction is then sent for execution, e.g., via scheduler circuit 208 to schedule the decoded instruction for execution.

In certain embodiments, (e.g., where the processor/core supports out-of-order (OoO) execution), the processor includes a register rename/allocator circuit coupled to register file/memory circuit 210 (e.g., unit) to allocate resources and perform register renaming on registers (e.g., vector registers associated with a logical operation and test instruction). In certain embodiments, (e.g., for out-of-order execution), the processor includes one or more scheduler circuits 208 coupled to the decoder. The scheduler circuit(s) may schedule one or more operations associated with decoded instructions, including one or more operations decoded from a logical operation and test instruction, for execution on the execution circuit 212.

In certain embodiments, a write back circuit 214 is included to write back results of an instruction to a destination (e.g., write them to a register(s) and/or memory), for example, so those results are visible within a processor (e.g., visible outside of the execution circuit that produced those results).

One or more of these components (e.g., decoder 206, register rename/register allocator/scheduler 208, execution circuit 212, register file/memory 210, or write back circuit 214) may be in a single core of a hardware processor (e.g., and multiple cores each with an instance of these components.

Figure 3:
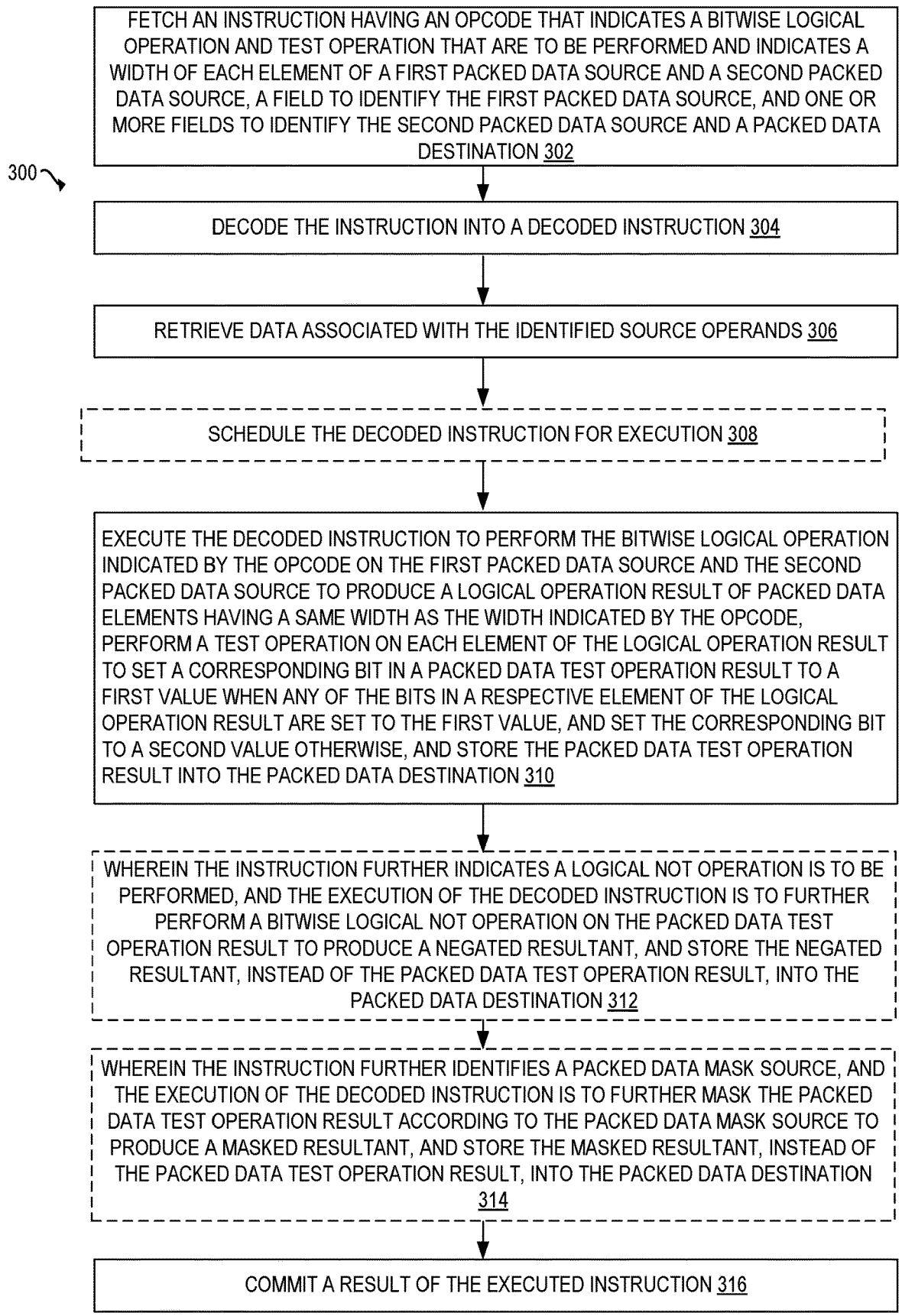
FIG. 3 illustrates a method of processing a logical operation and test instruction according to embodiments of the disclosure.

FIG. 3 illustrates a method 300 of processing a logical operation and test instruction according to embodiments of the disclosure. A processor (e.g., or processor core) may perform method 300, e.g., in response to receiving a request to execute an instruction from software. Depicted method 300 includes processing a logical operation and test instruction by: fetch an instruction having an opcode that indicates a bitwise logical operation and test operation that are to be performed and indicates a width of each element of a first packed data source and a second packed data source, a field to identify the first packed data source, and one or more fields to identify the second packed data source and a packed data destination 302, decode the instruction into a decoded instruction 304, retrieve data associated with the identified source operands 306, (optionally) schedule the decoded instruction for execution 308, execute the decoded instruction to perform the bitwise logical operation indicated by the opcode on the first packed data source and the second packed data source to produce a logical operation result of packed data elements having a same width as the width indicated by the opcode, perform a test operation on each element of the logical operation result to set a corresponding bit in a packed data test operation result to a first value when any of the bits in a respective element of the logical operation result are set to the first value, and set the corresponding bit to a second value otherwise, and store the packed data test operation result into the packed data destination 310, (optionally) wherein the instruction further indicates a logical not operation is to be performed, and the execution of the decoded instruction is to further perform a bitwise logical not operation on the packed data test operation result to produce a negated resultant, and store the negated resultant, instead of the packed data test operation result, into the packed data destination 312, (optionally) wherein the instruction further identifies a packed data mask source, and the execution of the decoded instruction is to further mask the packed data test operation result according to the packed data mask source to produce a masked resultant, and store the masked resultant, instead of the packed data test operation result, into the packed data destination 314, and commit a result of the executed instruction 316. A bitwise logical operation may be a logical OR or a logical exclusive OR (XOR). In certain embodiments, an instruction includes a format of having a vector opcode (vopcode) that indicates which bitwise logical operation is to be performed.

The vector opcode may correspond to (e.g., identifies) the instruction mnemonic of VPTESTOP (where "OP" represents the logical operation to be performed). In one embodiment, vector opcode corresponds to (e.g., identifies) the instruction mnemonic of VPTESTXOR for a logical XOR operation. In one embodiment, vector opcode corresponds to (e.g., identifies) the instruction mnemonic of VPTESTOR for a logical OR operation. The vector opcode may also include a following letter of M (e.g., VPTESTOPM) to indicate when the result is being written to a mask register, e.g., in contrast to writing to a data register/general purpose register. In one embodiment, vector opcode corresponds to (e.g., identifies) the instruction mnemonic of VPTESTXORM for a logical XOR operation whose test results are written to a mask register. In one embodiment, vector opcode corresponds to (e.g., identifies) the instruction mnemonic of VPTESTORM for a logical OR operation whose test results are written to a mask register. The vector opcode may also include a following letter of B (e.g., VPTESTOPMB) to indicate that the instruction operates on bytes of data (e.g., element sizes that are 1 or integer multiples of a byte) and that the result is being written to a mask register, e.g., in contrast to writing to a data register/ general purpose register. In one embodiment, vector opcode corresponds to (e.g., identifies) the instruction mnemonic of VPTESTXORMB for an instruction that operates on bytes of data (e.g., element sizes that are 1 or integer multiples of a byte) to perform a logical XOR operation whose test results are written to a mask register. In one embodiment, vector opcode corresponds to (e.g., identifies) the instruction mnemonic of VPTESTORMB for an instruction that operates on bytes of data (e.g., element sizes that are 1 or integer multiples of a byte) to perform a logical OR operation whose test results are written to a mask register. An instruction may also allow for write masking of the mask vector, e.g., by including a field that identifies a write mask to apply to the result(s). The decoding and execution of an instruction may cause a bitwise logical operation to be performed on elements of two single instruction, multiple data (SIMD) (e.g. vector) registers to produce a result that is tested and bits of a mask in the destination are set based on the result of this test.

In one embodiment, an instruction has the following format for its fields: VPTESTXORMB k{k1}, src1, src2/mem: e.g., where XOR refers to the logical operation used, M refers to results being written to a mask register, B is that the instruction operates on bytes of data (in other embodiments, this may be modified for all data types), src1 is the first packed data source (e.g., register), src2 is the second packed data source (e.g., which may be a register or memory address), k is a destination of mask registers containing a vector of bits, and {k1} is an optional mask register that can be used to control whether the destination is updated or not at a bit granularity as well as optionally whether the corresponding source element is read from memory (e.g., memory fault suppression) in the case of a memory source.

Pseudocode for the performance of this instruction may be as follows (e.g., where KL is the number of bits in a mask and VL is the number of bits in a vector of packed data):

```
(KL, VL) = (16, 128), (32, 256), (64, 512)
For j: 0 to KL-1
    i = j*8
    If k1[j] or if there is no masking
        THEN Dest[j] = (SRC1[i+7:i] XOR SRC2[i+7:i]) == 0 ? 0:1 //
            Get result of XOR, if
                // this result is 0 then set mask bit to 0 otherwise
                set it to 1
    ELSE
        IF * merging masking*    // merging masking
            THEN *Dest[j] remains unchanged*
            ELSE Dest[j] = 0    // zeroing masking
        FI
    FI                //End If
ENDFOR
Dest[Max_KL-1:KL] = 0
```

In one embodiment, an instruction has the following format for its fields: VPTESTORMB k{k1}, src1, src2/mem: e.g., where OR refers to the logical operation used, M refers to results being written to a mask register, B is that the instruction operates on bytes of data (in other embodiments, this may be modified for all data types), src1 is the first packed data source (e.g., register), src2 is the second packed data source (e.g., which may be a register or memory address), k is a destination of mask registers containing a vector of bits, and {k1} is an optional mask register that can be used to control whether the destination is updated or not at a bit granularity as well as optionally whether the corresponding source element is read from memory (e.g., memory fault suppression) in the case of a memory source.

Pseudocode for the performance of this instruction may be as follows (e.g., where KL is the number of bits in a mask and VL is the number of bits in a vector of packed data):

```
(KL, VL) = (16, 128), (32, 256), (64, 512)
For j: 0 to KL-1
    i = j*8
    If k1[j] or if there is no masking
        THEN Dest[j] = (SRC1[i+7:i] OR SRC2[i+7:i]) == 0 ? 0:1 // Get
            result of OR, if
                // this result is 0 then set mask bit to 0 otherwise
                set it to 1
    ELSE
        IF *merging masking*           // merging masking
            THEN *Dest[j] remains unchanged*
            ELSE Dest[j] = 0           // zeroing masking
        FI
    FI
ENDFOR
Dest[Max_KL-1:KL] = 0
```

In one embodiment, an instruction has the following format for its fields: VPTESTNXORMB k{k1}, src1, src2/mem: e.g., where XOR refers to the logical operation used, N refers to the logical NOT operation also being used, M refers to results being written to a mask register, B is that the instruction operates on bytes of data (in other embodiments, this may be modified for all data types), src1 is the first packed data source (e.g., register), src2 is the second packed data source (e.g., which may be a register or memory address), k is a destination of mask registers containing a vector of bits, and {k1} is an optional mask register that can be used to control whether the destination is updated or not at a bit granularity as well as optionally whether the corresponding source element is read from memory (e.g., memory fault suppression) in the case of a memory source.

Pseudocode for the performance of this instruction may be as follows (e.g., where KL is the number of bits in a mask and VL is the number of bits in a vector of packed data):

```
(KL, VL) = (16, 128), (32, 256), (64, 512)
For j: 0 to KL-1
    i = j*8
    If k1[j] or if there is no masking
        THEN Dest[j] = NOT ((SRC1[i+7:i] XOR SRC2[i+7:i]) == 0 ?
            1:0) // Get result of
                //XOR, if this result is 0 then set mask bit to 1
                //otherwise set it to 0 owing to the NOT operation
    ELSE
        IF * merging masking*           // merging masking
            THEN *Dest[j] remains unchanged*
            ELSE Dest[j] = 0            // zeroing masking
        FI
    FI
ENDFOR
Dest[Max_KL-1:KL] = 0
```

In one embodiment, an instruction has the following format for its fields: VPTESTNORMB k{k1}, src1, src2/mem: e.g., where OR refers to the logical operation used, M refers to results being written to a mask register, N refers to the logical NOT operation also being used, B is that the instruction operates on bytes of data (in other embodiments, this may be modified for all data types), src1 is the first packed data source (e.g., register), src2 is the second packed data source (e.g., which may be a register or memory address), k is a destination of mask registers containing a vector of bits, and {k1} is an optional mask register that can be used to control whether the destination is updated or not at a bit granularity as well as optionally whether the corresponding source element is read from memory (e.g., memory fault suppression) in the case of a memory source.

Pseudocode for the performance of this instruction may be as follows (e.g., where KL is the number of bits in a mask and VL is the number of bits in a vector of packed data):

```
(KL, VL) = (16, 128), (32, 256), (64, 512)
For j: 0 to KL-1
    i = j*8
    If k1[j] or if there is no masking
        THEN Dest[j] = NOT ((SRC1[i+7:i] OR SRC2[i+7:i]) == 0 ?
        1:0) // Get result of
            //OR, if this result is 0 then set mask bit to 1 otherwise
            // set it to 0 owing to the NOT operation
        ELSE
        IF *merging masking*                // merging masking
            THEN *Dest[j] remains unchanged*
            ELSE Dest[j] = 0                // zeroing masking
        FI
    FI
ENDFOR
Dest[Max_KL-1:KL] = 0
```

In one embodiment, the width of each element in the input operands is a single byte (8 bits). In the Figures herein, e.g., FIGS. 4-15, data may be loaded from a register and/or memory and stored in a register or memory. In certain embodiments, the first packed data source (input) and the second packed data source (input) each have the same number of bits. In certain embodiments, the resultant packed data destination (output) has fewer bits than the number of bits in the first packed data source (input) or the second packed data source (input). In one embodiment, the resultant packed data destination (output) has a single bit for each element (e.g., byte or bytes) in the in the first packed data source (input) and/or the second packed data source (input).

In certain embodiments, some or all of the data may be accessed in (e.g., system) memory. The input and output vector values and sizes herein are also examples, and other values and sizes may be utilized. The data may be according to big-endian or little-endian order.

Read masking may be included (e.g., alternatively or in addition to write masking). A mask may be a read mask. A write mask and a separate read mask may be used by an instruction. In certain embodiments herein, masking is used to not only control how the destination elements are updated but also to suppress memory faults in the case of a memory source. In one embodiment, a data source being memory may cause faults such as a page fault, and such a fault may be suppressed (e.g., not signaled to software) by masking, for example, if a fault occurs for an element that is only used as a source for destination elements that are masked out. Thus, certain embodiments herein ensure that the behavior in case of vectorizing these operations matches what happens in the scalar case where the sources for masked out elements are not read. In certain embodiments, merging masking causes the destination element to retain its original value instead of being set to 0.

Figure 4:
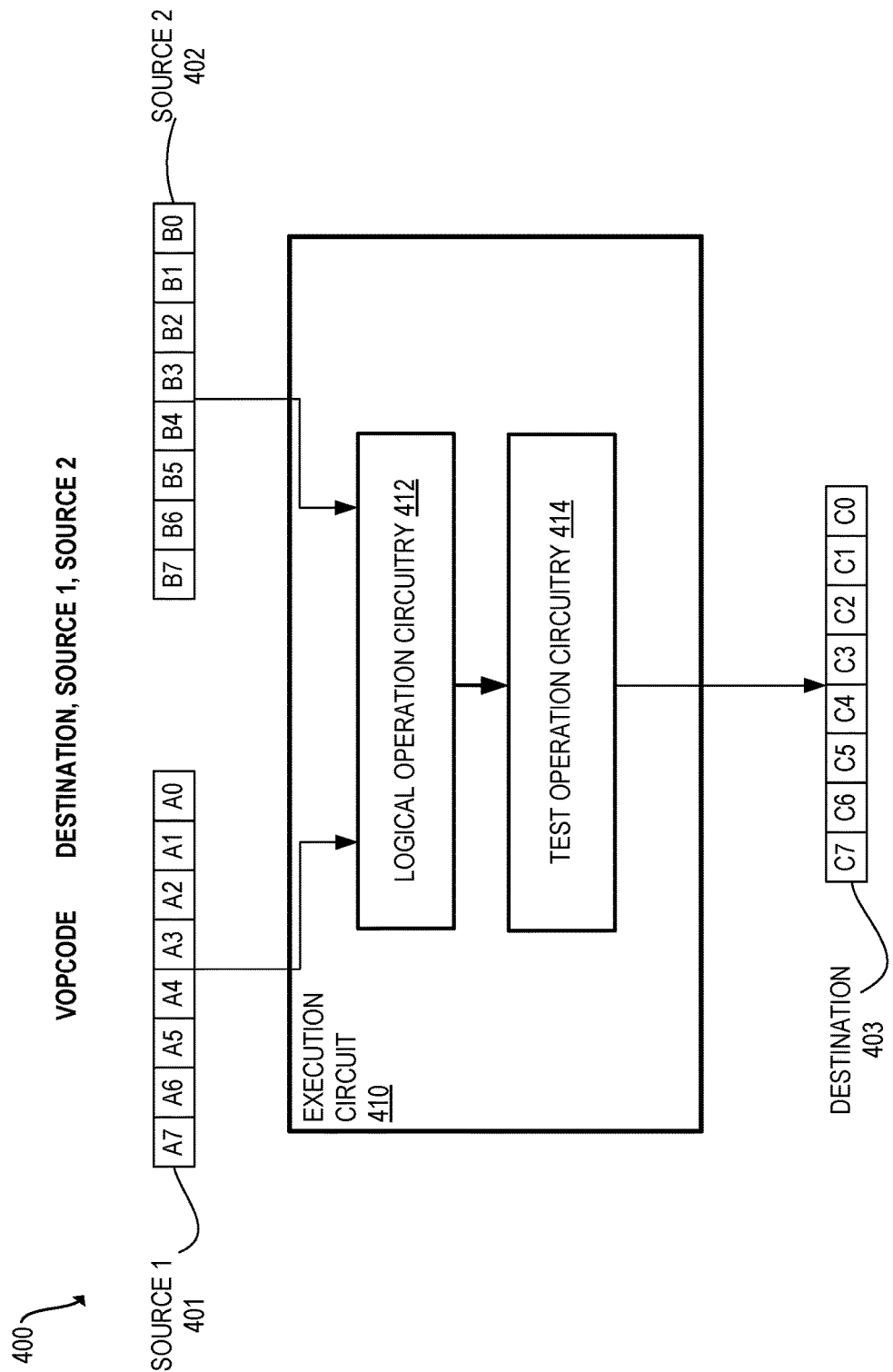
FIG. 4 illustrates circuitry including an execution circuit with logical operation circuitry and test operation circuitry according to embodiments of the disclosure.

FIG. 4 illustrates circuitry 400 including an execution circuit 410 with logical operation circuitry 412 and test operation circuitry 414 according to embodiments of the disclosure. In certain embodiments, decoder (e.g., decoder 102 in FIG. 1 or decoder 206 in FIG. 2) decodes an instruction into a decoded instruction that causes execution circuit 410 to perform a logical operation with logical operation circuity 412 and test operation circuitry 414 (for example, the decoded instruction indicate to execution circuit 410 which components to use, e.g., here to use the logical operation circuity 412 and test operation circuitry 414). In the depicted embodiment, an instruction format may include one or more fields that identifies the destination 403, first packed data source 401, and the second packed data source 402. In the depicted embodiment, the first packed data source 401 and the second packed data source 402 each include eight elements (indexed 0-7). However, it should be understood that any number of elements, or a proper subset of any numbers, may be utilized with the instruction(s) disclosed herein. In certain embodiments, each element in a packed data source has a same bit width (e.g., a byte or bytes) and/or each of the elements in each of the first packed data source 401 and the second packed data source 402 have a same bit width (e.g., a byte or bytes). In certain embodiments, logical operation circuity 412 of execution circuit 410 performs a bitwise logical operation that is indicated by the instruction (e.g., by the opcode) on the first packed data source 401 (e.g., first input vector) and the second packed data source 402 (e.g., second input vector). In one embodiment, the bitwise logical operation is performed on each pair of elements (e.g., A7 to B7, A6 to B6, etc.) in parallel. In one embodiment, the bitwise logical operation is performed on the first packed data source 401 and the second packed data source 402 in parallel. In one embodiment, the bitwise logical operation is any one of logical OR, logical exclusive OR (XOR), NOT of logical OR, or, NOT of logical XOR.

The execution circuit 410 then causes logical operation result from logical operation circuity 412 to be sent to test operation circuitry 414. In certain embodiments, the test operation circuitry 414 performs a test operation on each element (e.g., having the same width as the width indicated by the opcode). In one embodiment, the test operation checks for ones and zeros, e.g., where the test output is true (e.g., binary one) if any of the input results in a single element are true (e.g., binary one), and false (e.g., binary zero) otherwise. In another embodiment, the test output is false (e.g., binary zero) if any of the input results in a single element are false (e.g., binary zero), and true (e.g., binary one) otherwise. The packed data test operation result may then be stored into destination 403. In one embodiment, each of C7-C0 store a single bit that is the result of the test operation for a corresponding element position of the logical operation result.

Figure 5:
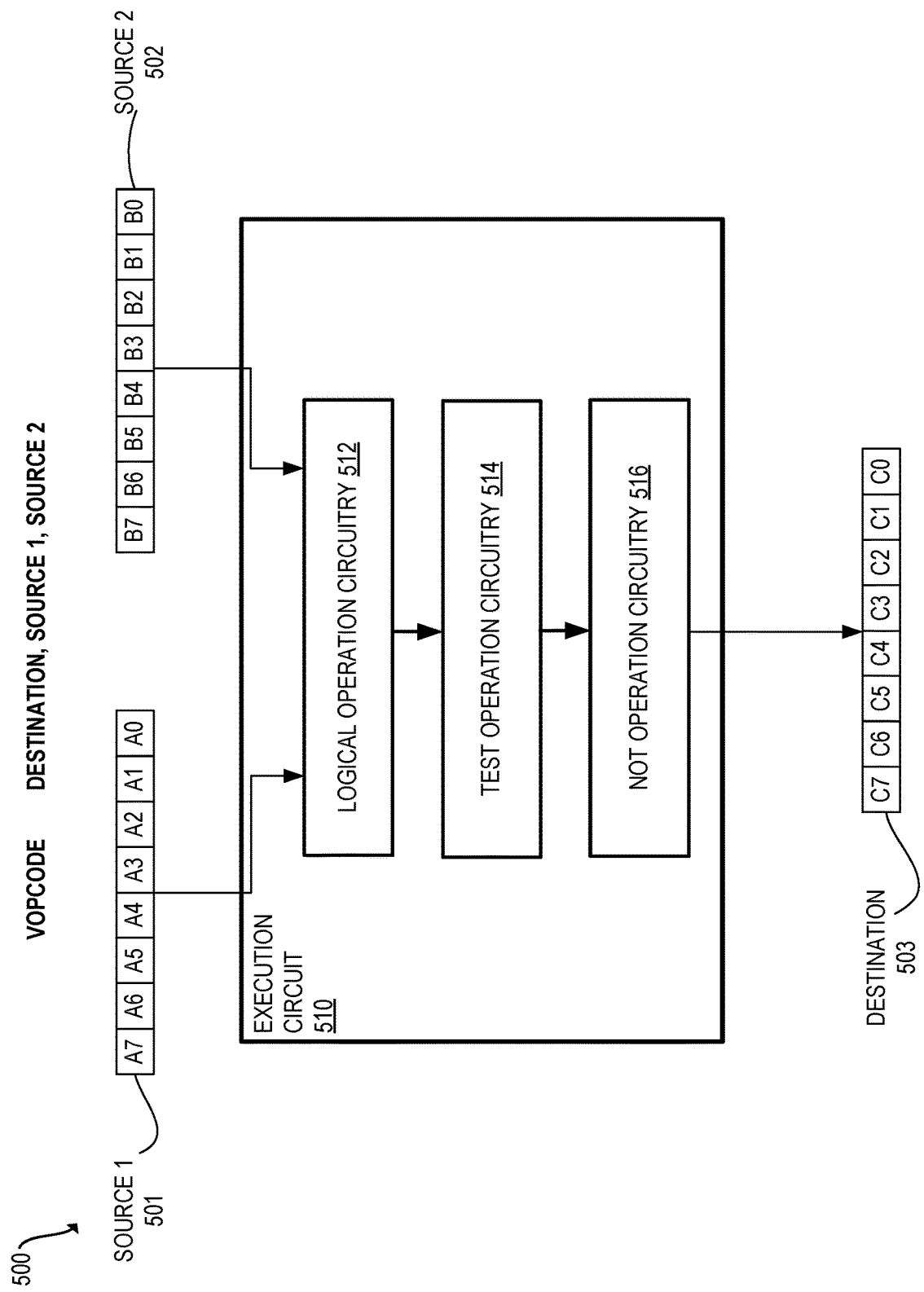
FIG. 5 illustrates circuitry including an execution circuit with logical operation circuitry, test operation circuitry, and not operation circuitry according to embodiments of the disclosure.

FIG. 5 illustrates circuitry 500 including an execution circuit 510 with logical operation circuitry 512, test operation circuitry 514, and "not" operation circuitry 516 according to embodiments of the disclosure. In certain embodiments, decoder (e.g., decoder 102 in FIG. 1 or decoder 206 in FIG. 2) decodes an instruction into a decoded instruction that causes execution circuit 510 to perform a logical operation with logical operation circuity 512, test operation circuitry 514, and "not" operation circuitry 516 (for example, the decoded instruction indicate to execution circuit 510 which components to use, e.g., here to use the logical operation circuity 512, test operation circuitry 514, and circuitry 516). In the depicted embodiment, an instruction format may include one or more fields that identifies the destination 403, first packed data source 401, and the second packed data source 402. In the depicted embodiment, the first packed data source 501 and the second packed data source 502 each include eight elements (indexed 0-7). However, it should be understood that any number of elements, or a proper subset of any numbers, may be utilized with the instruction(s) disclosed herein. In certain embodiments, each element in a packed data source has a same bit width (e.g., a byte or bytes) and/or each of the elements in each of the first packed data source 501 and the second packed data source 502 have a same bit width (e.g., a byte or bytes). In certain embodiments, logical operation circuity 512 of execution circuit 510 performs a bitwise logical operation that is indicated by the instruction (e.g., by the opcode) on the first packed data source 501 (e.g., first input vector) and the second packed data source 502 (e.g., second input vector). In one embodiment, the bitwise logical operation is performed on each pair of elements (e.g., A7 to B7, A6 to B6, etc.) in parallel. In one embodiment, the bitwise logical operation is performed on the first packed data source 501 and the second packed data source 502 in parallel. In one embodiment, the bitwise logical operation is any one of logical OR, logical exclusive OR (XOR), NOT of logical OR, or, NOT of logical XOR.

The execution circuit 510 then causes logical operation result from logical operation circuity 512 to be sent to test operation circuitry 514. In certain embodiments, the test operation circuitry 514 performs a test operation on each element (e.g., having the same width as the width indicated by the opcode). In one embodiment, the test operation checks for ones and zeros, e.g., where the test output is true (e.g., binary one) if any of the input results in a single element are true (e.g., binary one), and false (e.g., binary zero) otherwise. In another embodiment, the test output is false (e.g., binary zero) if any of the input results in a single element are false (e.g., binary zero), and true (e.g., binary one) otherwise.

The execution circuit 510 then causes the packed data test operation result from test operation circuitry 514 to be sent to not operation circuitry 516. In certain embodiments, the not operation circuitry 516 is to perform a bitwise logical NOT operation on the packed data test operation result to produce a (e.g., negated) result. The negated result may then be stored into destination 503. In one embodiment, each of C7-C0 store a single bit that is the logical complement of the result of the test operation for a corresponding element position of the logical operation result.

Figure 6:
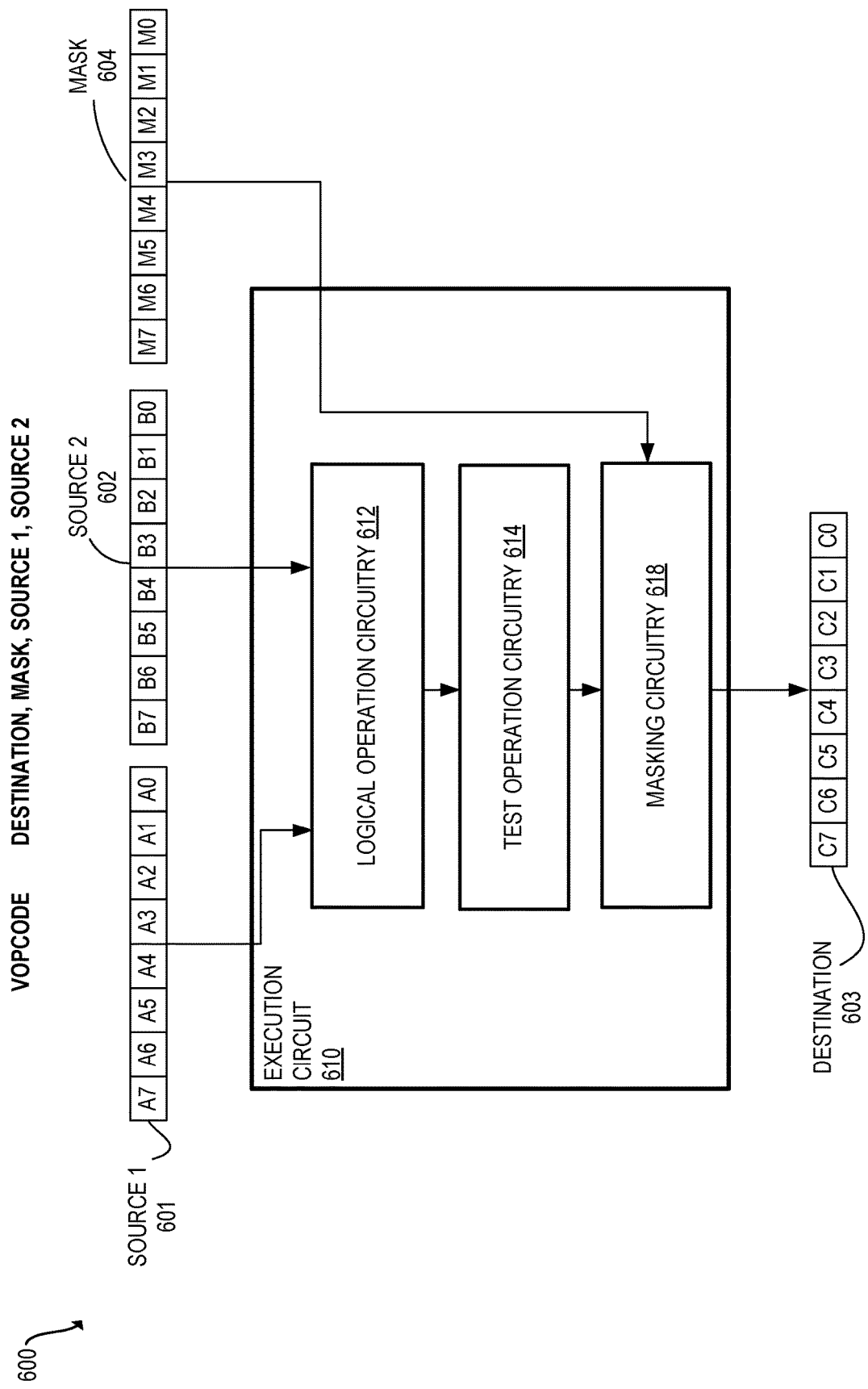
FIG. 6 illustrates circuitry including an execution circuit with logical operation circuitry, test operation circuitry, and masking circuitry according to embodiments of the disclosure.

FIG. 6 illustrates circuitry 600 including an execution circuit 610 with logical operation circuitry 612, test operation circuitry 614, and masking circuitry 618 according to embodiments of the disclosure. In certain embodiments, decoder (e.g., decoder 102 in FIG. 1 or decoder 206 in FIG. 2) decodes an instruction into a decoded instruction that causes execution circuit 610 to perform a logical operation with logical operation circuity 612, test operation circuitry 614, and masking circuitry 618 (for example, the decoded instruction indicate to execution circuit 610 which components to use, e.g., here to use the logical operation circuity 612, test operation circuitry 614, and masking circuitry 618). In the depicted embodiment, an instruction format may include one or more fields that identifies a mask 604, the destination 603, first packed data source 601, and the second packed data source 602. In the depicted embodiment, the first packed data source 601 and the second packed data source 602 each include eight elements (indexed 0-7). However, it should be understood that any number of elements, or a proper subset of any numbers, may be utilized with the instruction(s) disclosed herein. In certain embodiments, each element in a packed data source has a same bit width (e.g., a byte or bytes) and/or each of the elements in each of the first packed data source 601 and the second packed data source 602 have a same bit width (e.g., a byte or bytes). In certain embodiments, logical operation circuity 612 of execution circuit 610 performs a bitwise logical operation that is indicated by the instruction (e.g., by the opcode) on the first packed data source 601 (e.g., first input vector) and the second packed data source 602 (e.g., second input vector). In one embodiment, the bitwise logical operation is performed on each pair of elements (e.g., A7 to B7, A6 to B6, etc.) in parallel. In one embodiment, the bitwise logical operation is performed on the first packed data source 601 and the second packed data source 602 in parallel. In one embodiment, the bitwise logical operation is any one of logical OR, logical exclusive OR (XOR), NOT of logical OR, or, NOT of logical XOR.

The execution circuit 610 then causes logical operation result from logical operation circuity 612 to be sent to test operation circuitry 614. In certain embodiments, the test operation circuitry 614 performs a test operation on each element (e.g., having the same width as the width indicated by the opcode). In one embodiment, the test operation checks for ones and zeros, e.g., where the test output is true (e.g., binary one) if any of the input results in a single element are true (e.g., binary one), and false (e.g., binary zero) otherwise. In another embodiment, the test output is false (e.g., binary zero) if any of the input results in a single element are false (e.g., binary zero), and true (e.g., binary one) otherwise.

The execution circuit 610 then causes the packed data test operation result from test operation circuitry 614 to be sent to masking circuitry 618. Masking circuitry 618 may then apply mask 604 to the packed data test operation result, for example, at the granularity of the element width (e.g., single bit wide) of the packed data test operation result from test operation circuitry 614 and not the element width of the logical operation result from logical operation circuity 612. In one embodiment, each of M7-M0 store a single mask bit, that when high (e.g., one), cause the result (e.g., 0 or 1) from the corresponding position of the packed data test operation result from test operation circuitry 614 to be output, and when low (e.g., zero) cause the result (e.g., 0 or 1) from the corresponding position of the packed data test operation result from test operation circuitry 614 to be a zero regardless on the result value, to produce a masked resultant. This masked resultant may then be stored in destination 603 as C7-C0. In another embodiment, the masking circuitry 618 may be separate from an execution circuit, e.g., as part of masking circuitry in a processor.

Figure 7:
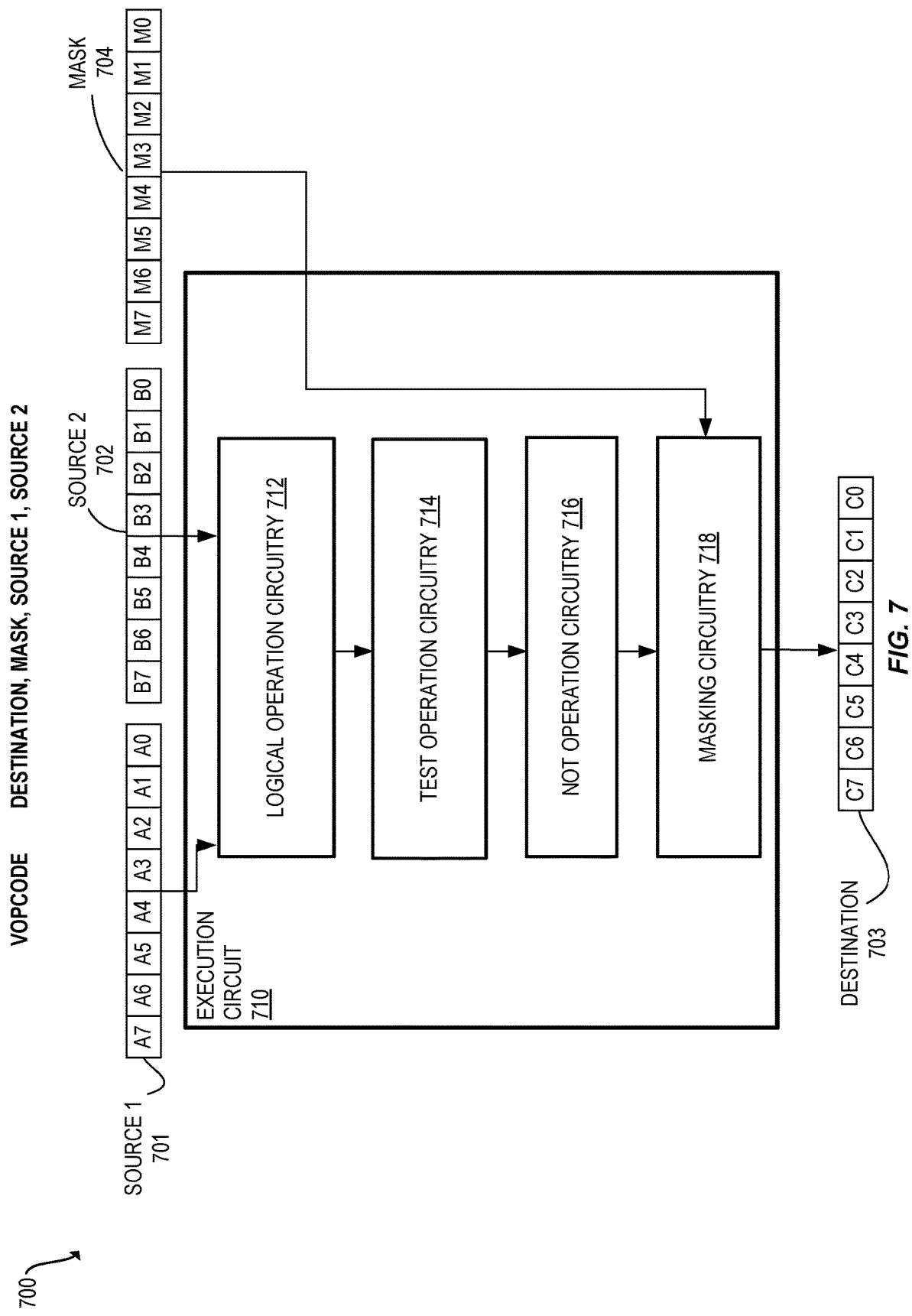
FIG. 7 illustrates circuitry including an execution circuit with logical operation circuitry, test operation circuitry, not operation circuitry, and masking circuitry according to embodiments of the disclosure.

FIG. 7 illustrates circuitry 700 including an execution circuit 710 with logical operation circuitry 712, test operation circuitry 714, not operation circuitry 716, and masking circuitry 718 according to embodiments of the disclosure. In certain embodiments, decoder (e.g., decoder 102 in FIG. 1 or decoder 206 in FIG. 2) decodes an instruction into a decoded instruction that causes execution circuit 710 to perform a logical operation with logical operation circuity 712, test operation circuitry 714, not operation circuitry 716, and masking circuitry 718 (for example, the decoded instruction indicate to execution circuit 710 which components to use, e.g., here to use the logical operation circuity 712, test operation circuitry 714, not operation circuitry 716, and masking circuitry 718). In the depicted embodiment, an instruction format may include one or more fields that identifies a mask 704, the destination 703, first packed data source 701, and the second packed data source 702. In the depicted embodiment, the first packed data source 701 and the second packed data source 702 each include eight elements (indexed 0-7). However, it should be understood that any number of elements, or a proper subset of any numbers, may be utilized with the instruction(s) disclosed herein. In certain embodiments, each element in a packed data source has a same bit width (e.g., a byte or bytes) and/or each of the elements in each of the first packed data source 701 and the second packed data source 702 have a same bit width (e.g., a byte or bytes). In certain embodiments, logical operation circuity 712 of execution circuit 710 performs a bitwise logical operation that is indicated by the instruction (e.g., by the opcode) on the first packed data source 701 (e.g., first input vector) and the second packed data source 702 (e.g., second input vector). In one embodiment, the bitwise logical operation is performed on each pair of elements (e.g., A7 to B7, A6 to B6, etc.) in parallel. In one embodiment, the bitwise logical operation is performed on the first packed data source 701 and the second packed data source 702 in parallel. In one embodiment, the bitwise logical operation is any one of logical OR, logical exclusive OR (XOR), NOT of logical OR, or, NOT of logical XOR.

The execution circuit 710 then causes logical operation result from logical operation circuity 712 to be sent to test operation circuitry 714. In certain embodiments, the test operation circuitry 714 performs a test operation on each element (e.g., having the same width as the width indicated by the opcode). In one embodiment, the test operation checks for ones and zeros, e.g., where the test output is true (e.g., binary one) if any of the input results in a single element are true (e.g., binary one), and false (e.g., binary zero) otherwise. In another embodiment, the test output is false (e.g., binary zero) if any of the input results in a single element are false (e.g., binary zero), and true (e.g., binary one) otherwise.

The execution circuit 710 then causes the packed data test operation result from test operation circuitry 714 to be sent to not operation circuitry 716. In certain embodiments, the not operation circuitry 716 is to perform a bitwise logical NOT operation on the packed data test operation result to produce a (e.g., negated) result, e.g., the logical complement of the result of the test operation for a corresponding element position of the logical operation result.

The execution circuit 710 then causes the result from not operation circuitry 716 to be sent to masking circuitry 718. Masking circuitry 718 may then apply mask 704 to the result, for example, at the granularity of the element width (e.g., single bit wide) of the packed data test operation result from test operation circuitry 714 and not the element width of the logical operation result from logical operation circuity 712. In one embodiment, each of M7-M0 store a single mask bit, that when high (e.g., one), cause the result (e.g., 0 or 1) from the corresponding position of the result from not operation circuitry 716 to be output, and when low (e.g., zero) cause the result (e.g., 0 or 1) from the corresponding position of the result from not operation circuitry 716 to be a zero regardless on the result value, to produce a masked resultant. This masked resultant may then be stored in destination 703 as C7-C0. In another embodiment, the masking circuitry 718 may be separate from an execution circuit, e.g., as part of masking circuitry in a processor.

Turning now to FIGS. 8-15, examples are provided. It should be understood that these are non-limiting examples. For example, input packed data sources are depicted as having a single byte (8 bits) width and a total length of two bytes (16 bits), but other granularities may be used (e.g., a total length of 32, 64, 128, 256, 512, 1024 bits, etc. and/or any plurality of bits for a bit width).

Figure 8:
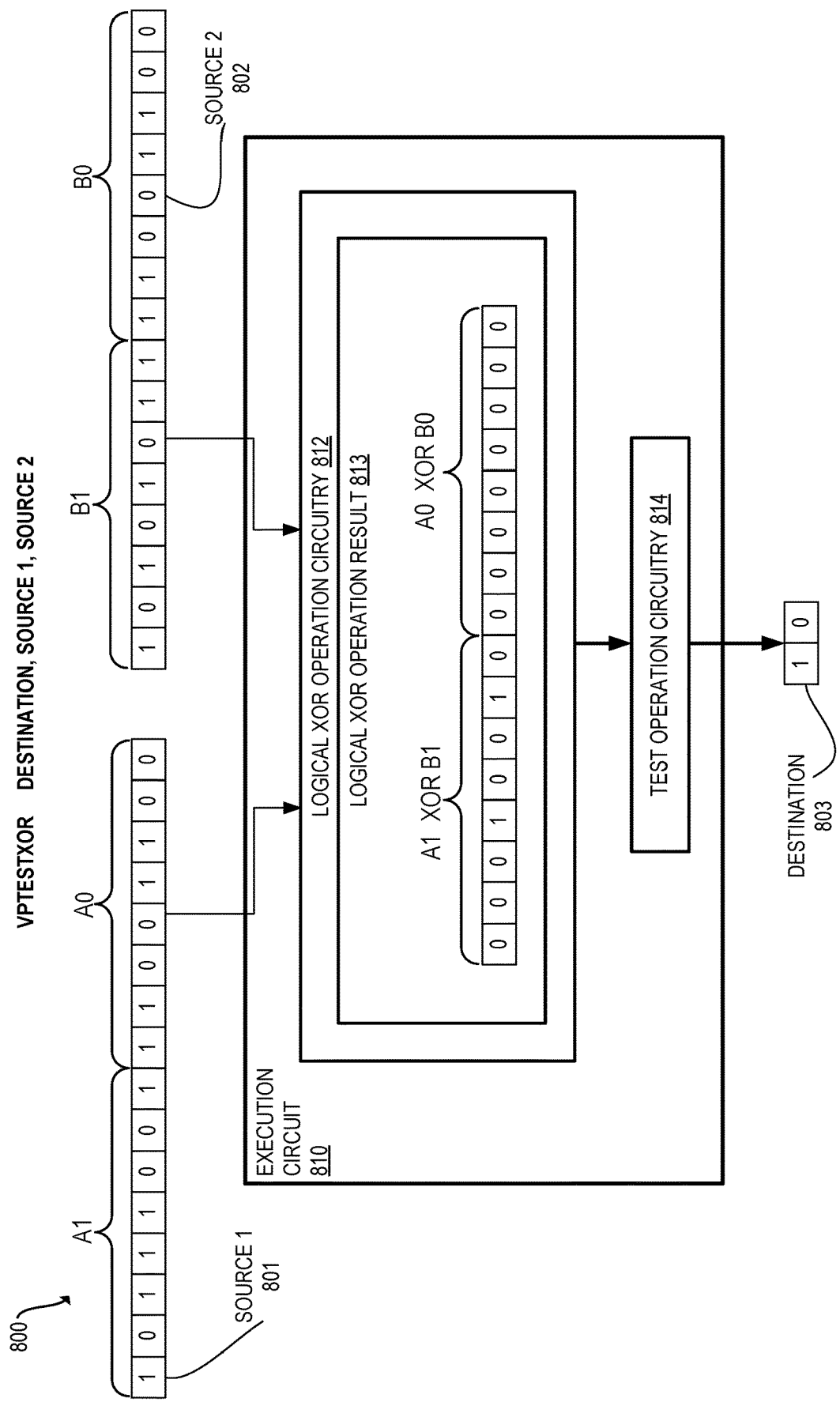
FIG. 8 illustrates circuitry including an execution circuit with logical XOR operation circuitry and test operation circuitry according to embodiments of the disclosure.

FIG. 8 illustrates circuitry 800 including an execution circuit 810 with logical XOR operation circuity 812 and test operation circuitry 814 according to embodiments of the disclosure. In certain embodiments, decoder (e.g., decoder 102 in FIG. 1 or decoder 206 in FIG. 2) decodes an instruction into a decoded instruction that causes execution circuit 810 to perform a logical XOR operation with logical XOR operation circuity 812 and test operation circuitry 814 (for example, the decoded instruction indicate to execution circuit 810 which components to use, e.g., here to use the logical XOR operation circuity 812 and test operation circuitry 814). In the depicted embodiment, an instruction format may include one or more fields that identifies the destination 803, first packed data source 801, and the second packed data source 802. In the depicted embodiment, the first packed data source 801 and the second packed data source 802 each include two elements (indexed 0-1). However, it should be understood that any number of elements, or a proper subset of any numbers, may be utilized with the instruction(s) disclosed herein. In certain embodiments, each element in a packed data source has a same bit width (e.g., a byte or bytes) and/or each of the elements in each of the first packed data source 801 and the second packed data source 802 have a same bit width (e.g., a byte or bytes). In certain embodiments, logical XOR operation circuitry 812 of execution circuit 810 performs a bitwise logical XOR operation that is indicated by the instruction (e.g., by the opcode) on the first packed data source 801 (e.g., first input vector) and the second packed data source 802 (e.g., second input vector). In one embodiment, the bitwise logical XOR operation is performed on each pair of elements (e.g., A1 to B1, A0 to B0) in parallel. In one embodiment, the bitwise logical XOR operation is performed on the first packed data source 801 and the second packed data source 802 in parallel.

The execution circuit 810 then causes logical XOR operation result 813 from logical XOR operation circuity 812 to be sent to test operation circuitry 814. In certain embodiments, the test operation circuitry 814 performs a test operation on each element (e.g., having the same width as the width indicated by the opcode). In one embodiment, the test operation checks for ones and zeros, e.g., where the test output is true (e.g., binary one) if any of the input results in a single element are true (e.g., binary one), and false (e.g., binary zero) otherwise. In another embodiment, the test output is false (e.g., binary zero) if any of the input results in a single element are false (e.g., binary zero), and true (e.g., binary one) otherwise. The packed data test operation result may then be stored into destination 803. In one embodiment, each of C1-C0 store a single bit that is the result of the test operation for a corresponding element position of the logical XOR operation result 813.

In the depicted embodiment, the first element (A1 XOR B1) of logical XOR operation result 813 includes at least one bit set high (to one), so the corresponding bit position C1 in the destination 803 is set to a one, and the second element (A0 XOR B0) of logical XOR operation result 813 does not include at least one bit set high (to one), so the corresponding bit position C0 in the destination 803 is set to a zero.

Figure 9:
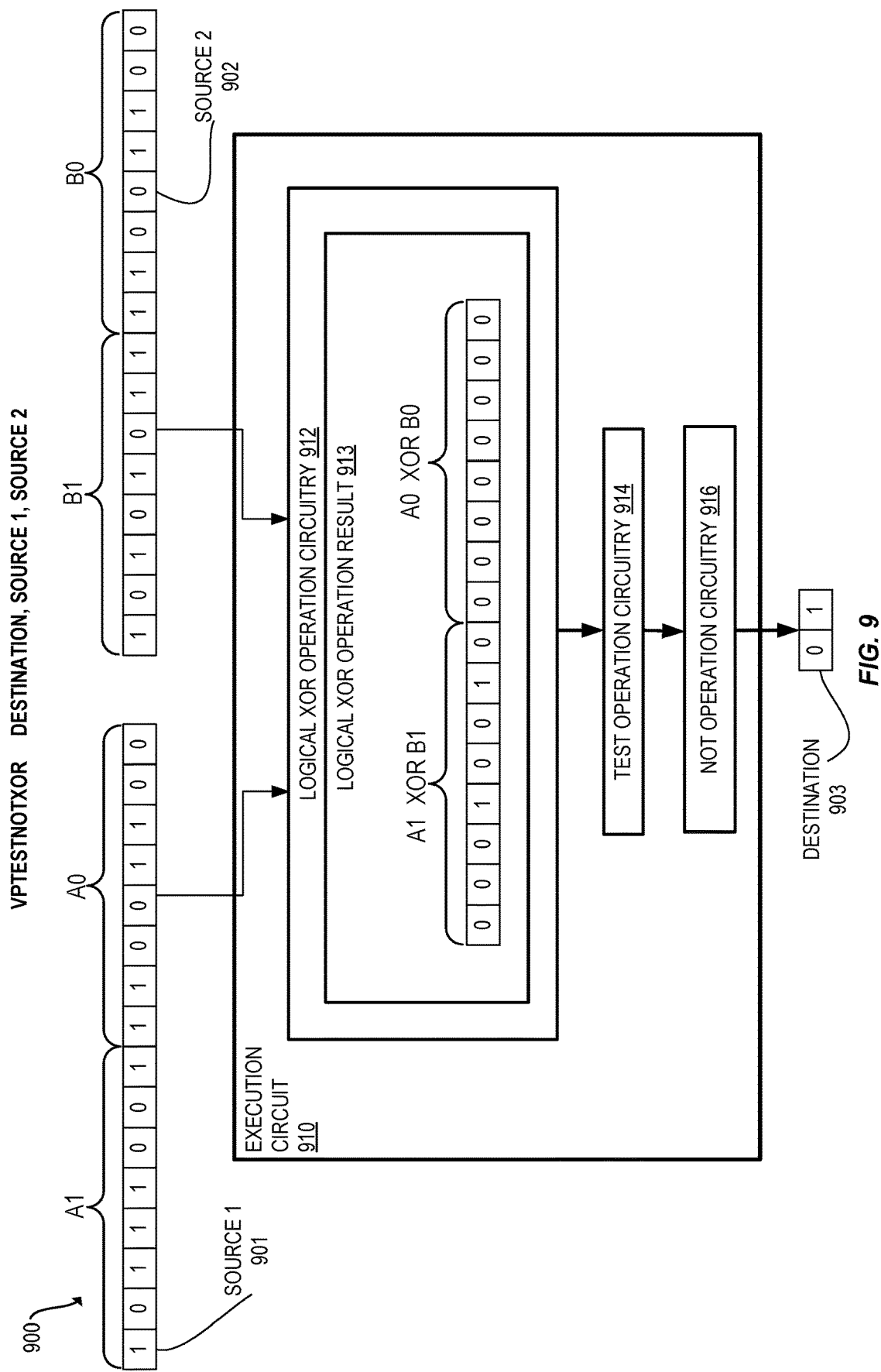
FIG. 9 illustrates circuitry including an execution circuit with logical XOR operation circuitry, test operation circuitry, and not operation circuitry according to embodiments of the disclosure.

FIG. 9 illustrates circuitry 900 including an execution circuit 910 with logical XOR operation circuitry 912, test operation circuitry 914, and "not" operation circuitry 916 according to embodiments of the disclosure. In certain embodiments, decoder (e.g., decoder 102 in FIG. 1 or decoder 206 in FIG. 2) decodes an instruction into a decoded instruction that causes execution circuit 910 to perform a logical XOR operation with logical XOR operation circuity 912, test operation circuitry 914, and "not" operation circuitry 916 (for example, the decoded instruction indicate to execution circuit 910 which components to use, e.g., here to use the logical XOR operation circuity 912, test operation circuitry 914, and circuitry 916). In the depicted embodiment, an instruction format may include one or more fields that identifies the destination 903, first packed data source 901, and the second packed data source 902. In the depicted embodiment, the first packed data source 901 and the second packed data source 902 each include two elements (indexed 0-1). However, it should be understood that any number of elements, or a proper subset of any numbers, may be utilized with the instruction(s) disclosed herein. In certain embodiments, each element in a packed data source has a same bit width (e.g., a byte or bytes) and/or each of the elements in each of the first packed data source 901 and the second packed data source 902 have a same bit width (e.g., a byte or bytes). In certain embodiments, logical XOR operation circuitry 912 of execution circuit 910 performs a bitwise logical XOR operation that is indicated by the instruction (e.g., by the opcode) on the first packed data source 901 (e.g., first input vector) and the second packed data source 902 (e.g., second input vector). In one embodiment, the bitwise logical XOR operation is performed on each pair of elements (e.g., A1 to B1, A0 to B0) in parallel. In one embodiment, the bitwise logical XOR operation is performed on the first packed data source 901 and the second packed data source 902 in parallel.

The execution circuit 910 then causes logical XOR operation result 913 from logical XOR operation circuitry 912 to be sent to test operation circuitry 914. In certain embodiments, the test operation circuitry 914 performs a test operation on each element (e.g., having the same width as the width indicated by the opcode). In one embodiment, the test operation checks for ones and zeros, e.g., where the test output is true (e.g., binary one) if any of the input results in a single element are true (e.g., binary one), and false (e.g., binary zero) otherwise. In another embodiment, the test output is false (e.g., binary zero) if any of the input results in a single element are false (e.g., binary zero), and true (e.g., binary one) otherwise.

In the depicted embodiment, the first element (A1 XOR B1) of logical XOR operation result 913 includes at least one bit set high (to one), so the corresponding bit position in the packed data test operation result is set to a one, and the second element (A0 XOR B0) of logical XOR operation result 913 does not include at least one bit set high (to one), so the corresponding bit position in the packed data test operation result is set to a zero, i.e., [1,0].

The execution circuit 910 then causes the packed data test operation result from test operation circuitry 914 to be sent to not operation circuitry 916. In certain embodiments, the not operation circuitry 916 is to perform a bitwise logical NOT operation on the packed data test operation result to produce a (e.g., negated) result. The negated result may then be stored into destination 903. In one embodiment, each of C1-C0 store a single bit that is the logical complement of the result of the test operation for a corresponding element position of the logical XOR operation result 913.

In the depicted embodiment, the packed data test operation result is [1,0], so the corresponding bit position C1 in the destination 903 is set to a zero, and the corresponding bit position C0 in the destination 903 is set to a one. In some embodiments, performing a NOT operation on the fewer bits of the output of a test operation is faster than performing NOT operation on all of the input bits (e.g., input operands 901 and 902).

Figure 10:
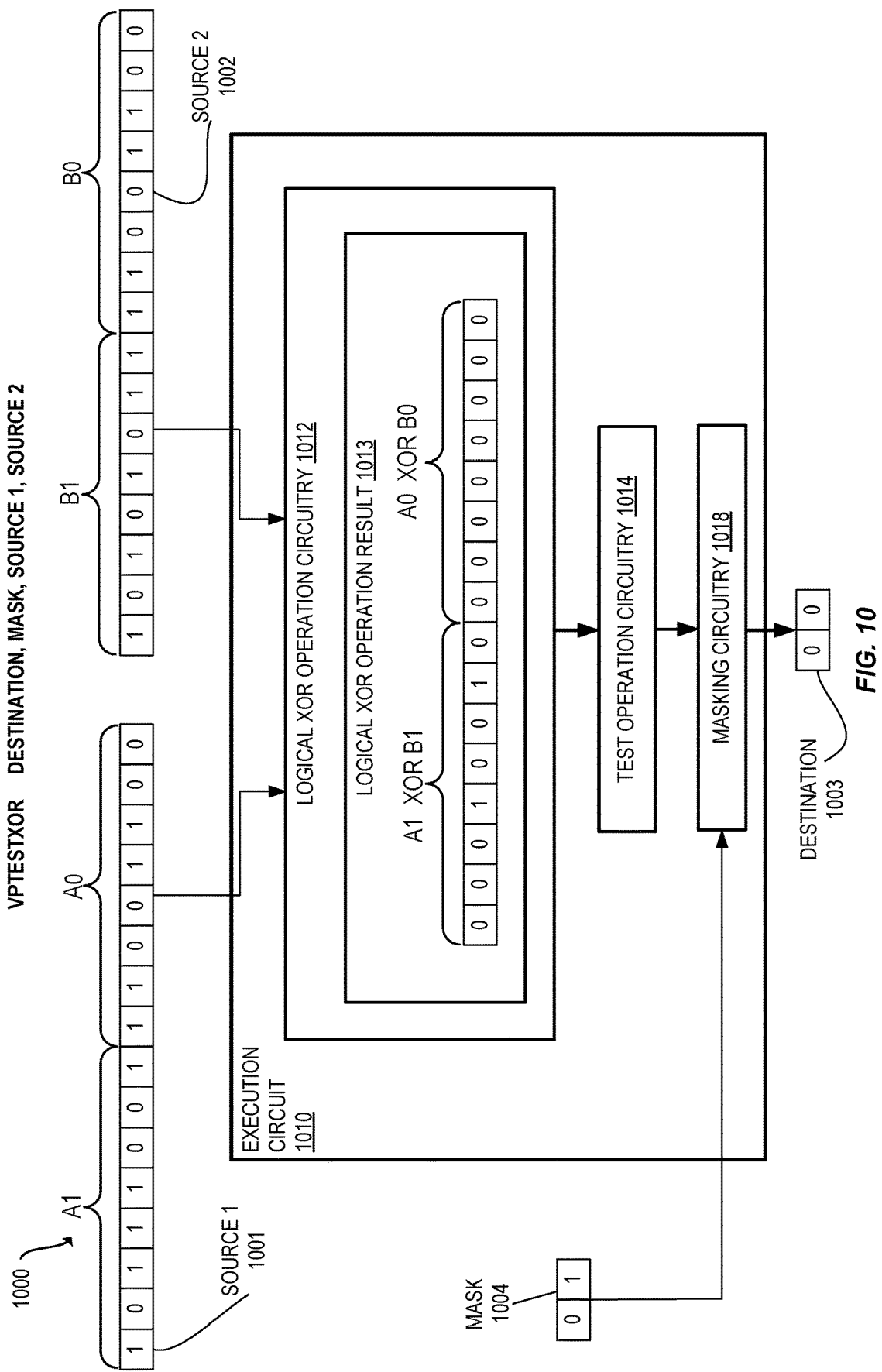
FIG. 10 illustrates circuitry including an execution circuit with logical XOR operation circuitry, test operation circuitry, and masking circuitry according to embodiments of the disclosure.

FIG. 10 illustrates circuitry 1000 including an execution circuit 1010 with logical XOR operation circuitry 1012, test operation circuitry 1014, and masking circuitry 1018 according to embodiments of the disclosure. In certain embodiments, decoder (e.g., decoder 102 in FIG. 1 or decoder 206 in FIG. 2) decodes an instruction into a decoded instruction that causes execution circuit 1010 to perform a logical XOR operation with logical XOR operation circuitry 1012, test operation circuitry 1014, and masking circuitry 1018 (for example, the decoded instruction indicate to execution circuit 1010 which components to use, e.g., here to use the logical XOR operation circuity 1012, test operation circuitry 1014, and masking circuitry 1018). In the depicted embodiment, an instruction format may include one or more fields that identifies a mask 1004, the destination 1003, first packed data source 1001, and the second packed data source 1002. In the depicted embodiment, the first packed data source 1001 and the second packed data source 1002 each include two elements (indexed 0-1). However, it should be understood that any number of elements, or a proper subset of any numbers, may be utilized with the instruction(s) disclosed herein. In certain embodiments, each element in a packed data source has a same bit width (e.g., a byte or bytes) and/or each of the elements in each of the first packed data source 1001 and the second packed data source 1002 have a same bit width (e.g., a byte or bytes). In certain embodiments, logical XOR operation circuitry 1012 of execution circuit 1010 performs a bitwise logical XOR operation that is indicated by the instruction (e.g., by the opcode) on the first packed data source 1001 (e.g., first input vector) and the second packed data source 1002 (e.g., second input vector). In one embodiment, the bitwise logical XOR operation is performed on each pair of elements (e.g., A1 to B1, A0 to B0) in parallel. In one embodiment, the bitwise logical XOR operation is performed on the first packed data source 1001 and the second packed data source 1002 in parallel.

The execution circuit 1010 then causes logical XOR operation result 1013 from logical XOR operation circuitry 1012 to be sent to test operation circuitry 1014. In certain embodiments, the test operation circuitry 1014 performs a test operation on each element (e.g., having the same width as the width indicated by the opcode). In one embodiment, the test operation checks for ones and zeros, e.g., where the test output is true (e.g., binary one) if any of the input results in a single element are true (e.g., binary one), and false (e.g., binary zero) otherwise. In another embodiment, the test output is false (e.g., binary zero) if any of the input results in a single element are false (e.g., binary zero), and true (e.g., binary one) otherwise.

In the depicted embodiment, the first element (A1 XOR B1) of logical XOR operation result 1013 includes at least one bit set high (to one), so the corresponding bit position in the packed data test operation result is set to a one, and the second element (A0 XOR B0) of logical XOR operation result 1013 does not include at least one bit set high (to one), so the corresponding bit position in the packed data test operation result is set to a zero, i.e., [1,0].

The execution circuit 1010 then causes the packed data test operation result from test operation circuitry 1014 to be sent to masking circuitry 1018. Masking circuitry 1018 may then apply mask 1004 to the packed data test operation result, for example, at the granularity of the element width (e.g., single bit wide) of the packed data test operation result from test operation circuitry 1014 and not the element width of the logical XOR operation result 1013 from logical XOR operation circuity 1012. In one embodiment, each of M1-M0 store a single mask bit, that when high (e.g., one), cause the result (e.g., 0 or 1) from the corresponding position of the packed data test operation result from test operation circuitry 1014 to be output, and when low (e.g., zero) cause the result (e.g., 0 or 1) from the corresponding position of the packed data test operation result from test operation circuitry 1014 to be a zero regardless on the result value, to produce a masked resultant. This masked resultant may then be stored in destination 1003 as C1-C0. In another embodiment, the masking circuitry 1018 may be separate from an execution circuit, e.g., as part of masking circuitry in a processor.

In the depicted embodiment, the mask 1004 is [0, 1], and applying that to the packed data test operation result of [1,0] causes the corresponding bit position C1 in the destination 1003 to be set (e.g., masked) to a zero, and the corresponding bit position C0 in the destination 1003 to be set to a zero.

Figure 11:
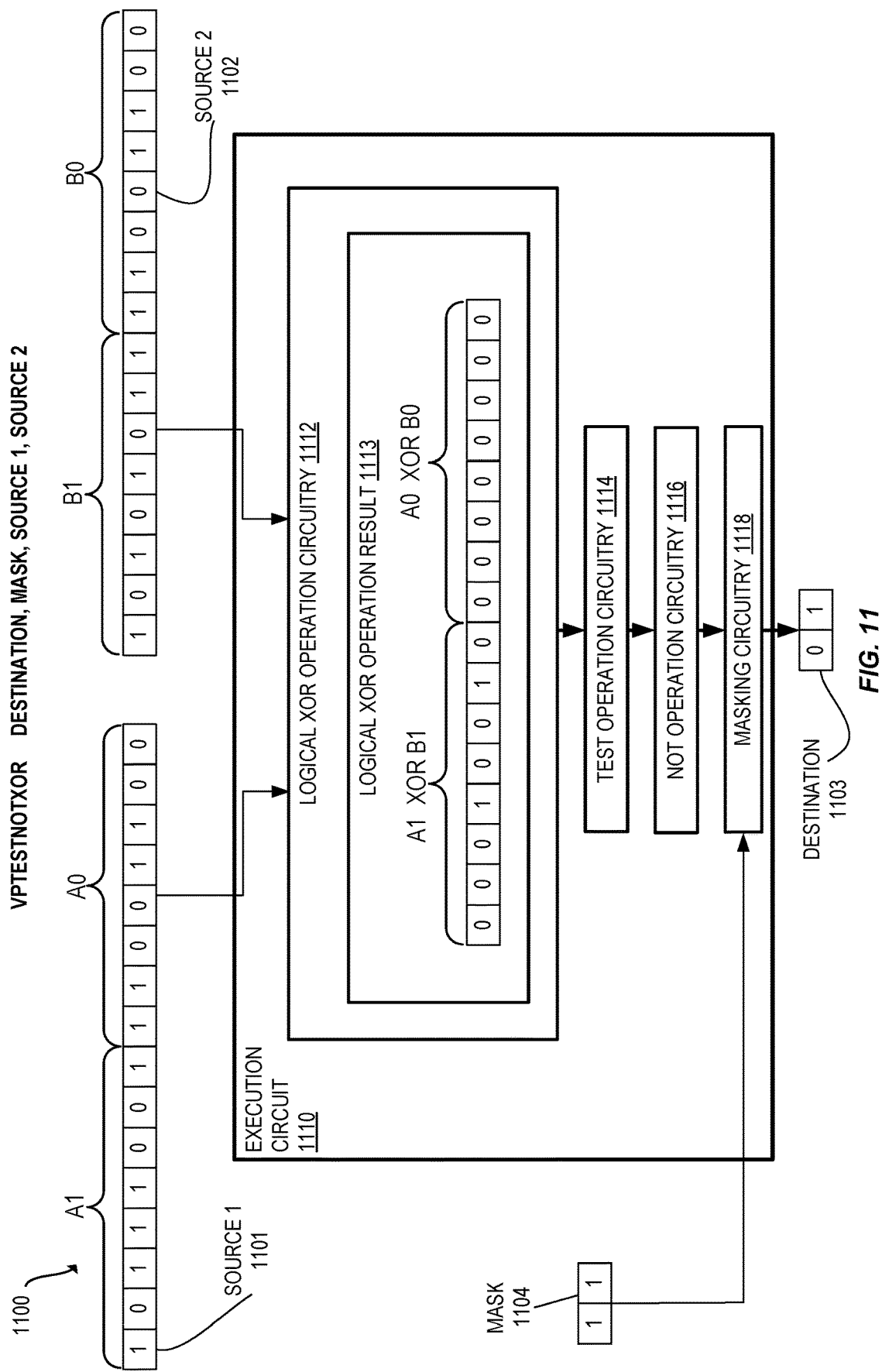
FIG. 11 illustrates circuitry including an execution circuit with logical XOR operation circuitry, test operation circuitry, not operation circuitry, and masking circuitry according to embodiments of the disclosure.

FIG. 11 illustrates circuitry 1100 including an execution circuit 1110 with logical XOR operation circuitry 1112, test operation circuitry 1114, not operation circuitry 1116, and masking circuitry 1118 according to embodiments of the disclosure. In certain embodiments, decoder (e.g., decoder 102 in FIG. 1 or decoder 206 in FIG. 2) decodes an instruction into a decoded instruction that causes execution circuit 1110 to perform a logical XOR operation with logical XOR operation circuity 1112, test operation circuitry 1114, not operation circuitry 1116, and masking circuitry 1118 (for example, the decoded instruction indicate to execution circuit 1110 which components to use, e.g., here to use the logical XOR operation circuity 1112, test operation circuitry 1114, not operation circuitry 1116, and masking circuitry 1118). In the depicted embodiment, an instruction format may include one or more fields that identifies a mask 1104, the destination 1103, first packed data source 1101, and the second packed data source 1102. In the depicted embodiment, the first packed data source 1101 and the second packed data source 1102 each include two elements (indexed 0-1). However, it should be understood that any number of elements, or a proper subset of any numbers, may be utilized with the instruction(s) disclosed herein. In certain embodiments, each element in a packed data source has a same bit width (e.g., a byte or bytes) and/or each of the elements in each of the first packed data source 1101 and the second packed data source 1102 have a same bit width (e.g., a byte or bytes). In certain embodiments, logical XOR operation circuity 1112 of execution circuit 1110 performs a bitwise logical XOR operation that is indicated by the instruction (e.g., by the opcode) on the first packed data source 1101 (e.g., first input vector) and the second packed data source 1102 (e.g., second input vector). In one embodiment, the bitwise logical XOR operation is performed on each pair of elements (e.g., A1 to B1, A0 to B0) in parallel. In one embodiment, the bitwise logical XOR operation is performed on the first packed data source 1101 and the second packed data source 1102 in parallel.

The execution circuit 1110 then causes logical XOR operation result 1113 from logical XOR operation circuity 1112 to be sent to test operation circuitry 1114. In certain embodiments, the test operation circuitry 1114 performs a test operation on each element (e.g., having the same width as the width indicated by the opcode). In one embodiment, the test operation checks for ones and zeros, e.g., where the test output is true (e.g., binary one) if any of the input results in a single element are true (e.g., binary one), and false (e.g., binary zero) otherwise. In another embodiment, the test output is false (e.g., binary zero) if any of the input results in a single element are false (e.g., binary zero), and true (e.g., binary one) otherwise.

In the depicted embodiment, the first element (A1 XOR B1) of logical XOR operation result 1113 includes at least one bit set high (to one), so the corresponding bit position in the packed data test operation result is set to a one, and the second element (A0 XOR B0) of logical XOR operation result 1113 does not include at least one bit set high (to one), so the corresponding bit position in the packed data test operation result is set to a zero, i.e., [1,0].

The execution circuit 1110 then causes the packed data test operation result from test operation circuitry 1114 to be sent to not operation circuitry 1116. In certain embodiments, the not operation circuitry 1116 is to perform a bitwise logical NOT operation on the packed data test operation result to produce a (e.g., negated) result, e.g., the logical complement of the result of the test operation for a corresponding element position of the logical XOR operation result 1113.

In the depicted embodiment, the packed data test operation result is [1,0], so the corresponding bit position in the result from not operation circuitry 1116 is set to a zero, and the corresponding bit position the result from not operation circuitry 1116 is set to a one, i.e., [0,1].

The execution circuit 1110 then causes the result from not operation circuitry 1116 to be sent to masking circuitry 1118. Masking circuitry 1118 may then apply mask 1104 to the result, for example, at the granularity of the element width (e.g., single bit wide) of the packed data test operation result from test operation circuitry 1114 and not the element width of the logical XOR operation result 1113 from logical XOR operation circuity 1112. In one embodiment, each of M1-M0 store a single mask bit, that when high (e.g., one), cause the result (e.g., 0 or 1) from the corresponding position of the result from not operation circuitry 1116 to be output, and when low (e.g., zero) cause the result (e.g., 0 or 1) from the corresponding position of the result from not operation circuitry 1116 to be a zero regardless on the result value, to produce a masked resultant. This masked resultant may then be stored in destination 1103 as C1-C0. In another embodiment, the masking circuitry 1118 may be separate from an execution circuit, e.g., as part of masking circuitry in a processor.

In the depicted embodiment, the mask 1104 is [1, 1], and applying that to the result from not operation circuitry 1116 of [0,1] causes the corresponding bit position C1 in the destination 1103 to be set to a zero, and the corresponding bit position C0 in the destination 1103 to be set to a one.

Figure 12:
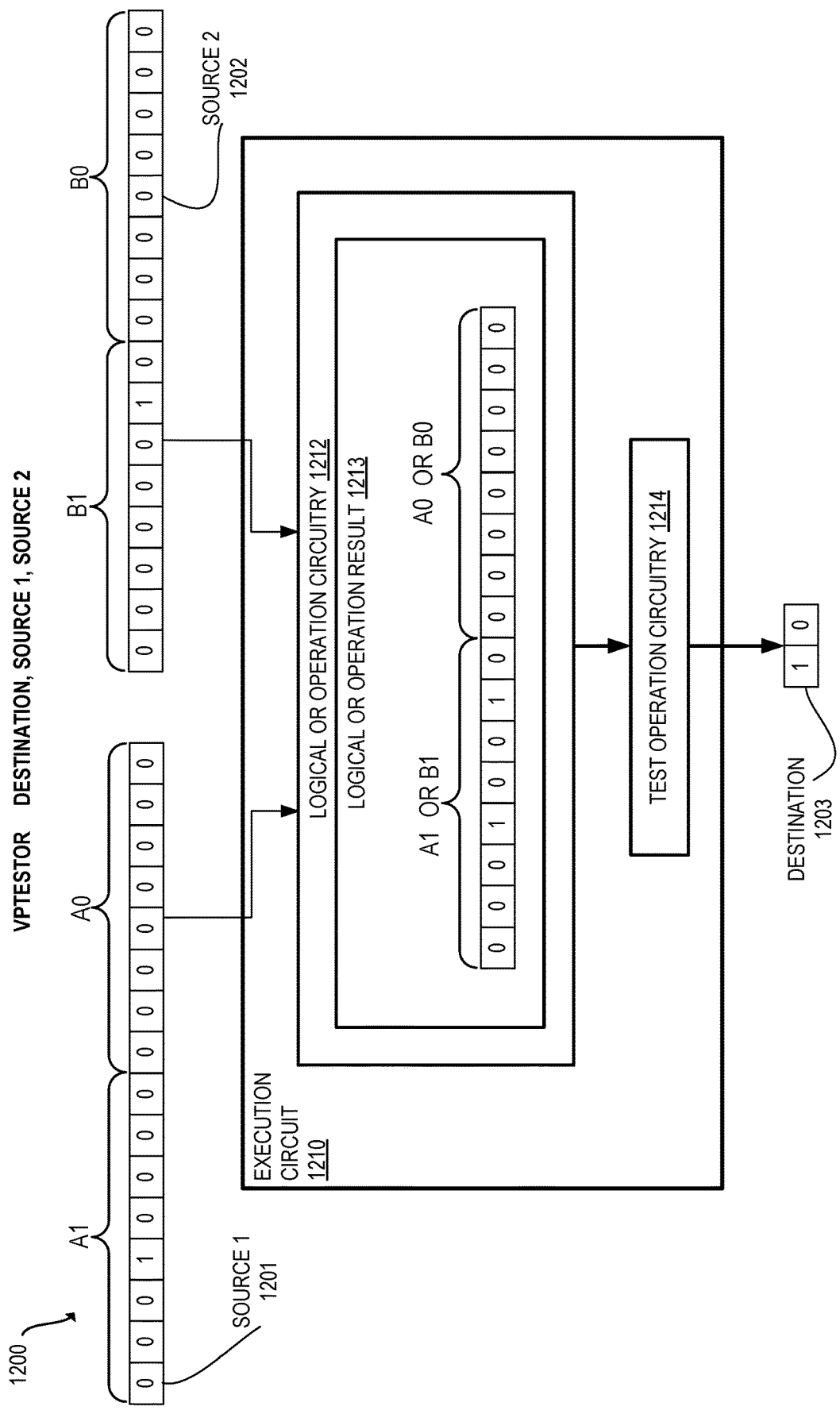
FIG. 12 illustrates circuitry including an execution circuit with logical OR operation circuitry and test operation circuitry according to embodiments of the disclosure.

FIG. 12 illustrates circuitry 1200 including an execution circuit 1210 with logical OR operation circuitry 1212 and test operation circuitry 1214 according to embodiments of the disclosure. In certain embodiments, decoder (e.g., decoder 102 in FIG. 1 or decoder 206 in FIG. 2) decodes an instruction into a decoded instruction that causes execution circuit 1210 to perform a logical OR operation with logical OR operation circuity 1212 and test operation circuitry 1214 (for example, the decoded instruction indicate to execution circuit 1210 which components to use, e.g., here to use the logical OR operation circuity 1212 and test operation circuitry 1214). In the depicted embodiment, an instruction format may include one or more fields that identifies the destination 1203, first packed data source 1201, and the second packed data source 1202. In the depicted embodiment, the first packed data source 1201 and the second packed data source 1202 each include two elements (indexed 0-1). However, it should be understood that any number of elements, or a proper subset of any numbers, may be utilized with the instruction(s) disclosed herein. In certain embodiments, each element in a packed data source has a same bit width (e.g., a byte or bytes) and/or each of the elements in each of the first packed data source 1201 and the second packed data source 1202 have a same bit width (e.g., a byte or bytes). In certain embodiments, logical OR operation circuity 1212 of execution circuit 1210 performs a bitwise logical OR operation that is indicated by the instruction (e.g., by the opcode) on the first packed data source 1201 (e.g., first input vector) and the second packed data source 1202 (e.g., second input vector). In one embodiment, the bitwise logical OR operation is performed on each pair of elements (e.g., A1 to B1, A0 to B0) in parallel. In one embodiment, the bitwise logical OR operation is performed on the first packed data source 1201 and the second packed data source 1202 in parallel.

The execution circuit 1210 then causes logical OR operation result 1213 from logical OR operation circuitry 1212 to be sent to test operation circuitry 1214. In certain embodiments, the test operation circuitry 1214 performs a test operation on each element (e.g., having the same width as the width indicated by the opcode). In one embodiment, the test operation checks for ones and zeros, e.g., where the test output is true (e.g., binary one) if any of the input results in a single element are true (e.g., binary one), and false (e.g., binary zero) otherwise. In another embodiment, the test output is false (e.g., binary zero) if any of the input results in a single element are false (e.g., binary zero), and true (e.g., binary one) otherwise. The packed data test operation result may then be stored into destination 1203. In one embodiment, each of C1-C0 store a single bit that is the result of the test operation for a corresponding element position of the logical OR operation result 1213.

In the depicted embodiment, the first element (A1 XOR B1) of logical OR operation result 1213 includes at least one bit set high (to one), so the corresponding bit position C1 in the destination 1203 is set to a one, and the second element (A0 XOR B0) of logical OR operation result 1213 does not include at least one bit set high (to one), so the corresponding bit position C0 in the destination 1203 is set to a zero.

Figure 13:
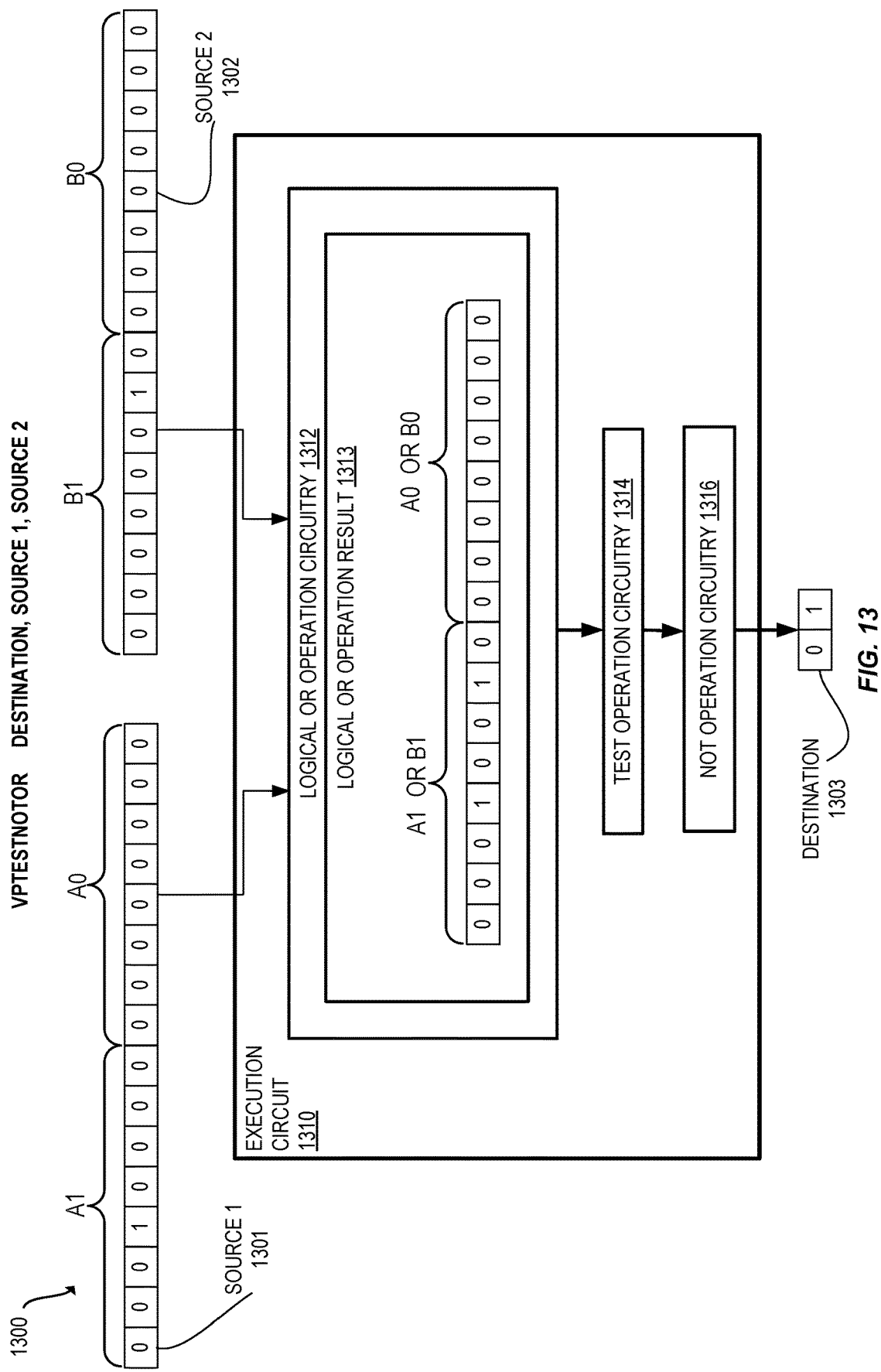
FIG. 13 illustrates circuitry including an execution circuit with logical OR operation circuitry, test operation circuitry, and not operation circuitry according to embodiments of the disclosure.

FIG. 13 illustrates circuitry 1300 including an execution circuit 1310 with logical OR operation circuitry 1312, test operation circuitry 1314, and "not" operation circuitry 1316 according to embodiments of the disclosure. In certain embodiments, decoder (e.g., decoder 102 in FIG. 1 or decoder 206 in FIG. 2) decodes an instruction into a decoded instruction that causes execution circuit 1310 to perform a logical OR operation with logical OR operation circuity 1312, test operation circuitry 1314, and "not" operation circuitry 1316 (for example, the decoded instruction indicate to execution circuit 1310 which components to use, e.g., here to use the logical OR operation circuity 1312, test operation circuitry 1314, and circuitry 1316). In the depicted embodiment, an instruction format may include one or more fields that identifies the destination 1303, first packed data source 1301, and the second packed data source 1302. In the depicted embodiment, the first packed data source 1301 and the second packed data source 1302 each include two elements (indexed 0-1). However, it should be understood that any number of elements, or a proper subset of any numbers, may be utilized with the instruction(s) disclosed herein. In certain embodiments, each element in a packed data source has a same bit width (e.g., a byte or bytes) and/or each of the elements in each of the first packed data source 1301 and the second packed data source 1302 have a same bit width (e.g., a byte or bytes). In certain embodiments, logical OR operation circuity 1312 of execution circuit 1310 performs a bitwise logical OR operation that is indicated by the instruction (e.g., by the opcode) on the first packed data source 1301 (e.g., first input vector) and the second packed data source 1302 (e.g., second input vector). In one embodiment, the bitwise logical OR operation is performed on each pair of elements (e.g., A1 to B1, A0 to B0) in parallel. In one embodiment, the bitwise logical OR operation is performed on the first packed data source 1301 and the second packed data source 1302 in parallel.

The execution circuit 1310 then causes logical OR operation result 1313 from logical OR operation circuitry 1312 to be sent to test operation circuitry 1314. In certain embodiments, the test operation circuitry 1314 performs a test operation on each element (e.g., having the same width as the width indicated by the opcode). In one embodiment, the test operation checks for ones and zeros, e.g., where the test output is true (e.g., binary one) if any of the input results in a single element are true (e.g., binary one), and false (e.g., binary zero) otherwise. In another embodiment, the test output is false (e.g., binary zero) if any of the input results in a single element are false (e.g., binary zero), and true (e.g., binary one) otherwise.

In the depicted embodiment, the first element (A1 XOR B1) of logical OR operation result 1313 includes at least one bit set high (to one), so the corresponding bit position in the packed data test operation result is set to a one, and the second element (A0 XOR B0) of logical OR operation result 1313 does not include at least one bit set high (to one), so the corresponding bit position in the packed data test operation result is set to a zero, i.e., [1,0].

The execution circuit 1310 then causes the packed data test operation result from test operation circuitry 1314 to be sent to not operation circuitry 1316. In certain embodiments, the not operation circuitry 1316 is to perform a bitwise logical NOT operation on the packed data test operation result to produce a (e.g., negated) result. The negated result may then be stored into destination 1303. In one embodiment, each of C1-C0 store a single bit that is the logical complement of the result of the test operation for a corresponding element position of the logical OR operation result 1313.

In the depicted embodiment, the packed data test operation result is [1,0], so the corresponding bit position C1 in the destination 1303 is set to a zero, and the corresponding bit position C0 in the destination 1303 is set to a one. In some embodiments, performing a NOT operation on the fewer bits of the output of a test operation is faster than performing NOT operation on all of the input bits (e.g., input operands 1301 and 1302).

Figure 14:
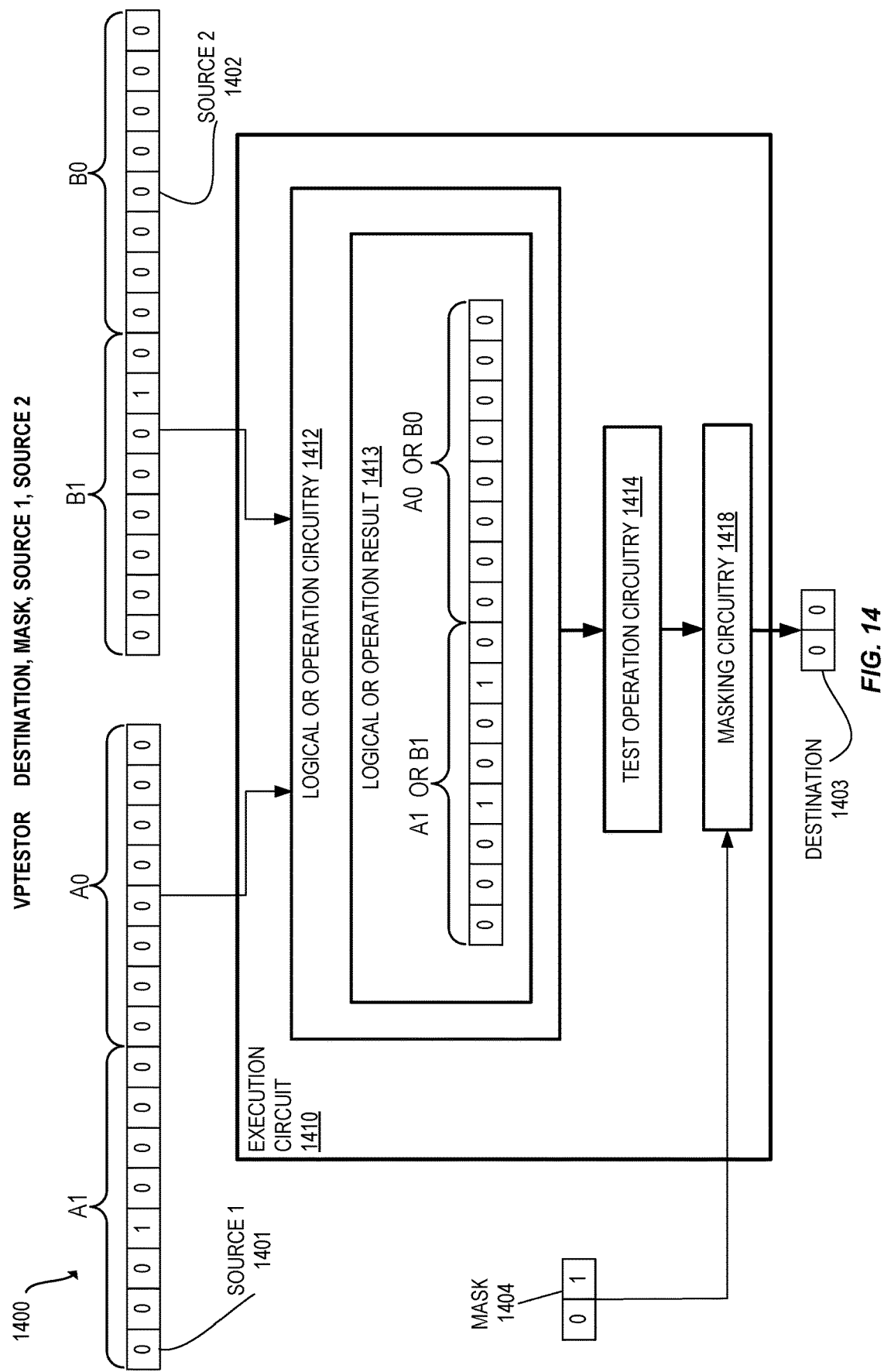
FIG. 14 illustrates circuitry including an execution circuit with logical OR operation circuitry, test operation circuitry, and masking circuitry according to embodiments of the disclosure.

FIG. 14 illustrates circuitry 1400 including an execution circuit 1410 with logical OR operation circuitry 1412, test operation circuitry 1414, and masking circuitry 1418 according to embodiments of the disclosure. In certain embodiments, decoder (e.g., decoder 102 in FIG. 1 or decoder 206 in FIG. 2) decodes an instruction into a decoded instruction that causes execution circuit 1410 to perform a logical OR operation with logical OR operation circuity 1412, test operation circuitry 1414, and masking circuitry 1418 (for example, the decoded instruction indicate to execution circuit 1410 which components to use, e.g., here to use the logical OR operation circuity 1412, test operation circuitry 1414, and masking circuitry 1418). In the depicted embodiment, an instruction format may include one or more fields that identifies a mask 1404, the destination 1403, first packed data source 1401, and the second packed data source 1402. In the depicted embodiment, the first packed data source 1401 and the second packed data source 1402 each include two elements (indexed 0-1). However, it should be understood that any number of elements, or a proper subset of any numbers, may be utilized with the instruction(s) disclosed herein. In certain embodiments, each element in a packed data source has a same bit width (e.g., a byte or bytes) and/or each of the elements in each of the first packed data source 1401 and the second packed data source 1402 have a same bit width (e.g., a byte or bytes). In certain embodiments, logical OR operation circuity 1412 of execution circuit 1410 performs a bitwise logical OR operation that is indicated by the instruction (e.g., by the opcode) on the first packed data source 1401 (e.g., first input vector) and the second packed data source 1402 (e.g., second input vector). In one embodiment, the bitwise logical OR operation is performed on each pair of elements (e.g., A1 to B1, A0 to B0) in parallel. In one embodiment, the bitwise logical OR operation is performed on the first packed data source 1401 and the second packed data source 1402 in parallel.

The execution circuit 1410 then causes logical OR operation result 1413 from logical OR operation circuity 1412 to be sent to test operation circuitry 1414. In certain embodiments, the test operation circuitry 1414 performs a test operation on each element (e.g., having the same width as the width indicated by the opcode). In one embodiment, the test operation checks for ones and zeros, e.g., where the test output is true (e.g., binary one) if any of the input results in a single element are true (e.g., binary one), and false (e.g., binary zero) otherwise. In another embodiment, the test output is false (e.g., binary zero) if any of the input results in a single element are false (e.g., binary zero), and true (e.g., binary one) otherwise.

In the depicted embodiment, the first element (A1 XOR B1) of logical OR operation result 1413 includes at least one bit set high (to one), so the corresponding bit position in the packed data test operation result is set to a one, and the second element (A0 XOR B0) of logical OR operation result 1413 does not include at least one bit set high (to one), so the corresponding bit position in the packed data test operation result is set to a zero, i.e., [1,0].

The execution circuit 1410 then causes the packed data test operation result from test operation circuitry 1414 to be sent to masking circuitry 1418. Masking circuitry 1418 may then apply mask 1404 to the packed data test operation result, for example, at the granularity of the element width (e.g., single bit wide) of the packed data test operation result from test operation circuitry 1414 and not the element width of the logical OR operation result 1413 from logical OR operation circuity 1412. In one embodiment, each of M1-M0 store a single mask bit, that when high (e.g., one), cause the result (e.g., 0 or 1) from the corresponding position of the packed data test operation result from test operation circuitry 1414 to be output, and when low (e.g., zero) cause the result (e.g., 0 or 1) from the corresponding position of the packed data test operation result from test operation circuitry 1414 to be a zero regardless on the result value, to produce a masked resultant. This masked resultant may then be stored in destination 1403 as C1-C0. In another embodiment, the masking circuitry 1418 may be separate from an execution circuit, e.g., as part of masking circuitry in a processor.

In the depicted embodiment, the mask 1404 is [0, 1], and applying that to the packed data test operation result of [1,0] causes the corresponding bit position C1 in the destination 1403 to be set (e.g., masked) to a zero, and the corresponding bit position C0 in the destination 1403 to be set to a zero.

Figure 15:
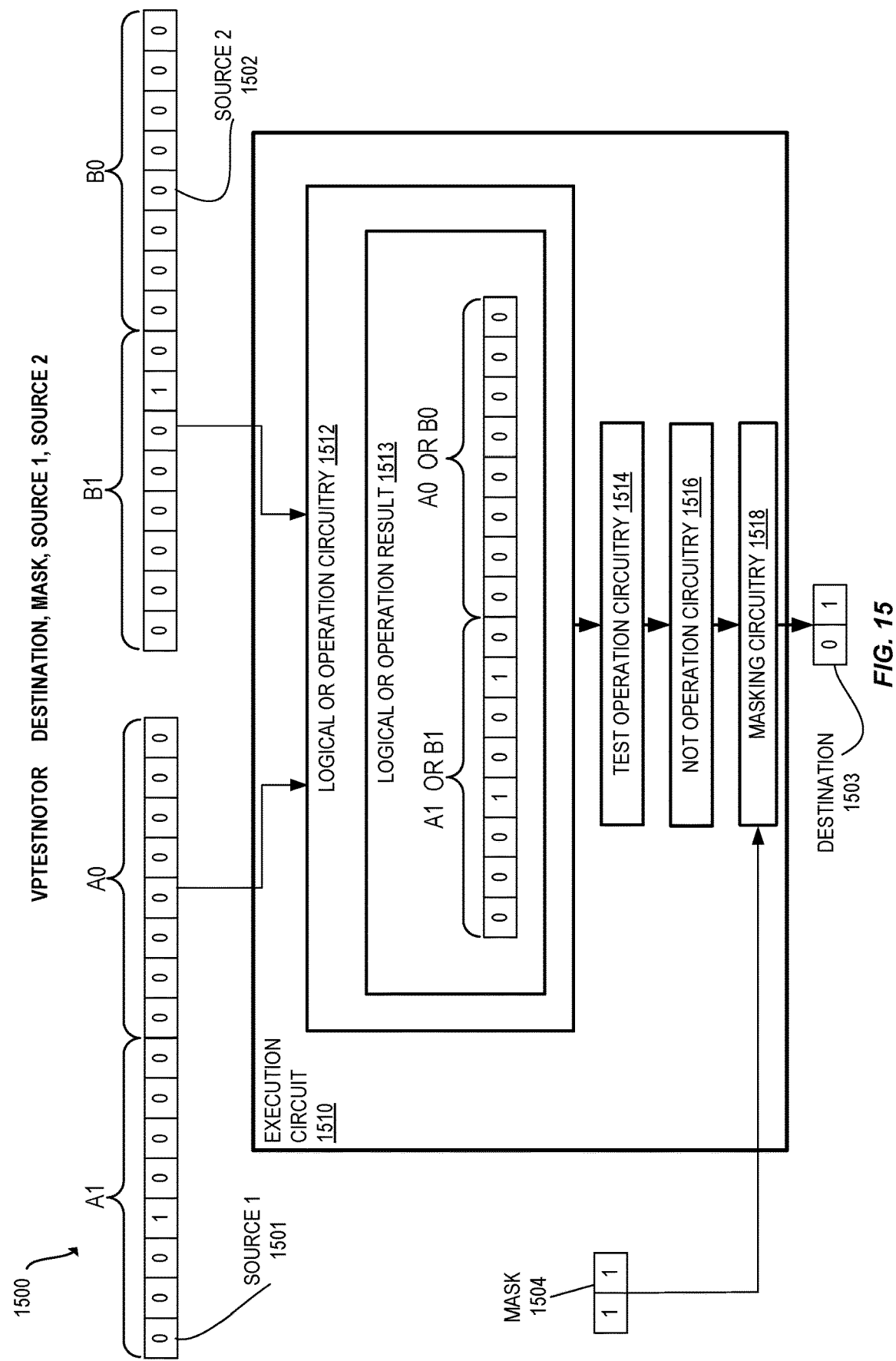
FIG. 15 illustrates circuitry including an execution circuit with logical OR operation circuitry, test operation circuitry, not operation circuitry, and masking circuitry according to embodiments of the disclosure.

FIG. 15 illustrates circuitry 1500 including an execution circuit 1510 with logical OR operation circuitry 1512, test operation circuitry 1514, not operation circuitry 1516, and masking circuitry 1518 according to embodiments of the disclosure. In certain embodiments, decoder (e.g., decoder 102 in FIG. 1 or decoder 206 in FIG. 2) decodes an instruction into a decoded instruction that causes execution circuit 1510 to perform a logical OR operation with logical OR operation circuity 1512, test operation circuitry 1514, not operation circuitry 1516, and masking circuitry 1518 (for example, the decoded instruction indicate to execution circuit 1510 which components to use, e.g., here to use the logical OR operation circuity 1512, test operation circuitry 1514, not operation circuitry 1516, and masking circuitry 1518). In the depicted embodiment, an instruction format may include one or more fields that identifies a mask 1504, the destination 1503, first packed data source 1501, and the second packed data source 1502. In the depicted embodiment, the first packed data source 1501 and the second packed data source 1502 each include two elements (indexed 0-1). However, it should be understood that any number of elements, or a proper subset of any numbers, may be utilized with the instruction(s) disclosed herein. In certain embodiments, each element in a packed data source has a same bit width (e.g., a byte or bytes) and/or each of the elements in each of the first packed data source 1501 and the second packed data source 1502 have a same bit width (e.g., a byte or bytes). In certain embodiments, logical OR operation circuity 1512 of execution circuit 1510 performs a bitwise logical OR operation that is indicated by the instruction (e.g., by the opcode) on the first packed data source 1501 (e.g., first input vector) and the second packed data source 1502 (e.g., second input vector). In one embodiment, the bitwise logical OR operation is performed on each pair of elements (e.g., A1 to B1, A0 to B0) in parallel. In one embodiment, the bitwise logical OR operation is performed on the first packed data source 1501 and the second packed data source 1502 in parallel.

The execution circuit 1510 then causes logical OR operation result 1513 from logical OR operation circuity 1512 to be sent to test operation circuitry 1514. In certain embodiments, the test operation circuitry 1514 performs a test operation on each element (e.g., having the same width as the width indicated by the opcode). In one embodiment, the test operation checks for ones and zeros, e.g., where the test output is true (e.g., binary one) if any of the input results in a single element are true (e.g., binary one), and false (e.g., binary zero) otherwise. In another embodiment, the test output is false (e.g., binary zero) if any of the input results in a single element are false (e.g., binary zero), and true (e.g., binary one) otherwise.

In the depicted embodiment, the first element (A1 XOR B1) of logical OR operation result 1513 includes at least one bit set high (to one), so the corresponding bit position in the packed data test operation result is set to a one, and the second element (A0 XOR B0) of logical OR operation result 1513 does not include at least one bit set high (to one), so the corresponding bit position in the packed data test operation result is set to a zero, i.e., [1,0].

The execution circuit 1510 then causes the packed data test operation result from test operation circuitry 1514 to be sent to not operation circuitry 1516. In certain embodiments, the not operation circuitry 1516 is to perform a bitwise logical NOT operation on the packed data test operation result to produce a (e.g., negated) result, e.g., the logical complement of the result of the test operation for a corresponding element position of the logical OR operation result 1513.

In the depicted embodiment, the packed data test operation result is [1,0], so the corresponding bit position in the result from not operation circuitry 1516 is set to a zero, and the corresponding bit position the result from not operation circuitry 1516 is set to a one, i.e., [0,1].

The execution circuit 1510 then causes the result from not operation circuitry 1516 to be sent to masking circuitry 1518. Masking circuitry 1518 may then apply mask 1504 to the result, for example, at the granularity of the element width (e.g., single bit wide) of the packed data test operation result from test operation circuitry 1514 and not the element width of the logical OR operation result 1513 from logical OR operation circuity 1512. In one embodiment, each of M1-M0 store a single mask bit, that when high (e.g., one), cause the result (e.g., 0 or 1) from the corresponding position of the result from not operation circuitry 1516 to be output, and when low (e.g., zero) cause the result (e.g., 0 or 1) from the corresponding position of the result from not operation circuitry 1516 to be a zero regardless on the result value, to produce a masked resultant. This masked resultant may then be stored in destination 1503 as C1-C0. In another embodiment, the masking circuitry 1518 may be separate from an execution circuit, e.g., as part of masking circuitry in a processor.

In the depicted embodiment, the mask 1504 is [1, 1], and applying that to the result from not operation circuitry 1516 of [0,1] causes the corresponding bit position C1 in the destination 1503 to be set to a zero, and the corresponding bit position C0 in the destination 1503 to be set to a one.

In one embodiment, a processor includes a decoder to decode an instruction into a decoded instruction, the instruction having fields that identify a first packed data source, a second packed data source, and a packed data destination, and an opcode that may indicate a bitwise logical operation to perform on the first packed data source and the second packed data source and indicate a width of each element of the first packed data source and the second packed data source; and an execution circuit to execute the decoded instruction to: perform the bitwise logical operation indicated by the opcode on the first packed data source and the second packed data source to produce a logical operation result of packed data elements having a same width as the width indicated by the opcode, perform a test operation on each element of the logical operation result to set a corresponding bit in a packed data test operation result to a first value when any of the bits in a respective element of the logical operation result are set to the first value, and set the corresponding bit to a second value otherwise, and store the packed data test operation result into the packed data destination. The fields of the instruction may further identify a packed data mask source, and the execution circuit may execute the decoded instruction to further mask the packed data test operation result according to the packed data mask source to produce a masked resultant, and store the masked resultant, instead of the packed data test operation result, into the packed data destination. The packed data destination may be a write mask register. The packed data destination may be a vector register. The bitwise logical operation may be a bitwise logical OR. The bitwise logical operation may be a bitwise logical XOR. The opcode may indicate a logical not operation may be performed, and the execution circuit may execute the decoded instruction to further perform a bitwise logical not operation on the packed data test operation result to produce a negated resultant, and store the negated resultant, instead of the packed data test operation result, into the packed data destination. The bitwise logical operation may be a bitwise logical XOR or a bitwise logical OR, the opcode may further indicates a logical not operation may be performed, and the execution circuit may execute the decoded instruction to further perform a bitwise logical not operation on the packed data test operation result to produce a negated resultant, and store the negated resultant, instead of the packed data test operation result, into the packed data destination.

In another embodiment, a method includes decoding an instruction with a decoder of a processor into a decoded instruction, the instruction having fields that identify a first packed data source, a second packed data source, and a packed data destination, and an opcode that may indicate a bitwise logical operation to perform on the first packed data source and the second packed data source and indicate a width of each element of the first packed data source and the second packed data source; and executing the decoded instruction with an execution circuit of the processor to: perform the bitwise logical operation indicated by the opcode on the first packed data source and the second packed data source to produce a logical operation result of packed data elements having a same width as the width indicated by the opcode, perform a test operation on each element of the logical operation result to set a corresponding bit in a packed data test operation result to a first value when any of the bits in a respective element of the logical operation result are set to the first value, and set the corresponding bit to a second value otherwise, and store the packed data test operation result into the packed data destination. The fields of the instruction may further identify a packed data mask source, and the executing the decoded instruction with the execution circuit may mask the packed data test operation result according to the packed data mask source to produce a masked resultant, and store the masked resultant, instead of the packed data test operation result, into the packed data destination. The packed data destination may be a write mask register. The packed data destination may be a vector register. The bitwise logical operation may be a bitwise logical OR. The bitwise logical operation may be a bitwise logical XOR. The opcode may indicate a logical not operation may be performed, and the executing the decoded instruction with the execution circuit may perform a bitwise logical not operation on the packed data test operation result to produce a negated resultant, and store the negated resultant, instead of the packed data test operation result, into the packed data destination. The bitwise logical operation may be a bitwise logical XOR or a bitwise logical OR, the opcode may indicate a logical not operation is to be performed, and the executing the decoded instruction with the execution circuit may perform a bitwise logical not operation on the packed data test operation result to produce a negated resultant, and store the negated resultant, instead of the packed data test operation result, into the packed data destination.

In yet another embodiment, a non-transitory machine readable medium that stores code that when executed by a machine causes the machine to perform a method including decoding an instruction with a decoder of a processor into a decoded instruction, the instruction having fields that identify a first packed data source, a second packed data source, and a packed data destination, and an opcode that may indicate a bitwise logical operation to perform on the first packed data source and the second packed data source and indicate a width of each element of the first packed data source and the second packed data source; and executing the decoded instruction with an execution circuit of the processor to: perform the bitwise logical operation indicated by the opcode on the first packed data source and the second packed data source to produce a logical operation result of packed data elements having a same width as the width indicated by the opcode, perform a test operation on each element of the logical operation result to set a corresponding bit in a packed data test operation result to a first value when any of the bits in a respective element of the logical operation result are set to the first value, and set the corresponding bit to a second value otherwise, and store the packed data test operation result into the packed data destination. The fields of the instruction may further identify a packed data mask source, and the executing the decoded instruction with the execution circuit may mask the packed data test operation result according to the packed data mask source to produce a masked resultant, and store the masked resultant, instead of the packed data test operation result, into the packed data destination. The packed data destination may be a write mask register. The packed data destination may be a vector register. The bitwise logical operation may be a bitwise logical OR. The bitwise logical operation may be a bitwise logical XOR. The opcode may indicate a logical not operation may be performed, and the executing the decoded instruction with the execution circuit may perform a bitwise logical not operation on the packed data test operation result to produce a negated resultant, and store the negated resultant, instead of the packed data test operation result, into the packed data destination. The bitwise logical operation may be a bitwise logical XOR or a bitwise logical OR, the opcode may indicate a logical not operation is to be performed, and the executing the decoded instruction with the execution circuit may perform a bitwise logical not operation on the packed data test operation result to produce a negated resultant, and store the negated resultant, instead of the packed data test operation result, into the packed data destination.

In another embodiment, a processor includes first means to decode an instruction into a decoded instruction, the instruction having fields that identify a first packed data source, a second packed data source, and a packed data destination, and an opcode that may indicate a bitwise logical operation to perform on the first packed data source and the second packed data source and indicate a width of each element of the first packed data source and the second packed data source; and second means to execute the decoded instruction to: perform the bitwise logical operation indicated by the opcode on the first packed data source and the second packed data source to produce a logical operation result of packed data elements having a same width as the width indicated by the opcode, perform a test operation on each element of the logical operation result to set a corresponding bit in a packed data test operation result to a first value when any of the bits in a respective element of the logical operation result are set to the first value, and set the corresponding bit to a second value otherwise, and store the packed data test operation result into the packed data destination.

In yet another embodiment, an apparatus comprises a data storage device that stores code that when executed by a hardware processor causes the hardware processor to perform any method disclosed herein. An apparatus may be as described in the detailed description. A method may be as described in the detailed description.

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, November 2018; and see Intel® Architecture Instruction Set Extensions Programming Reference, October 2018).

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 16A:
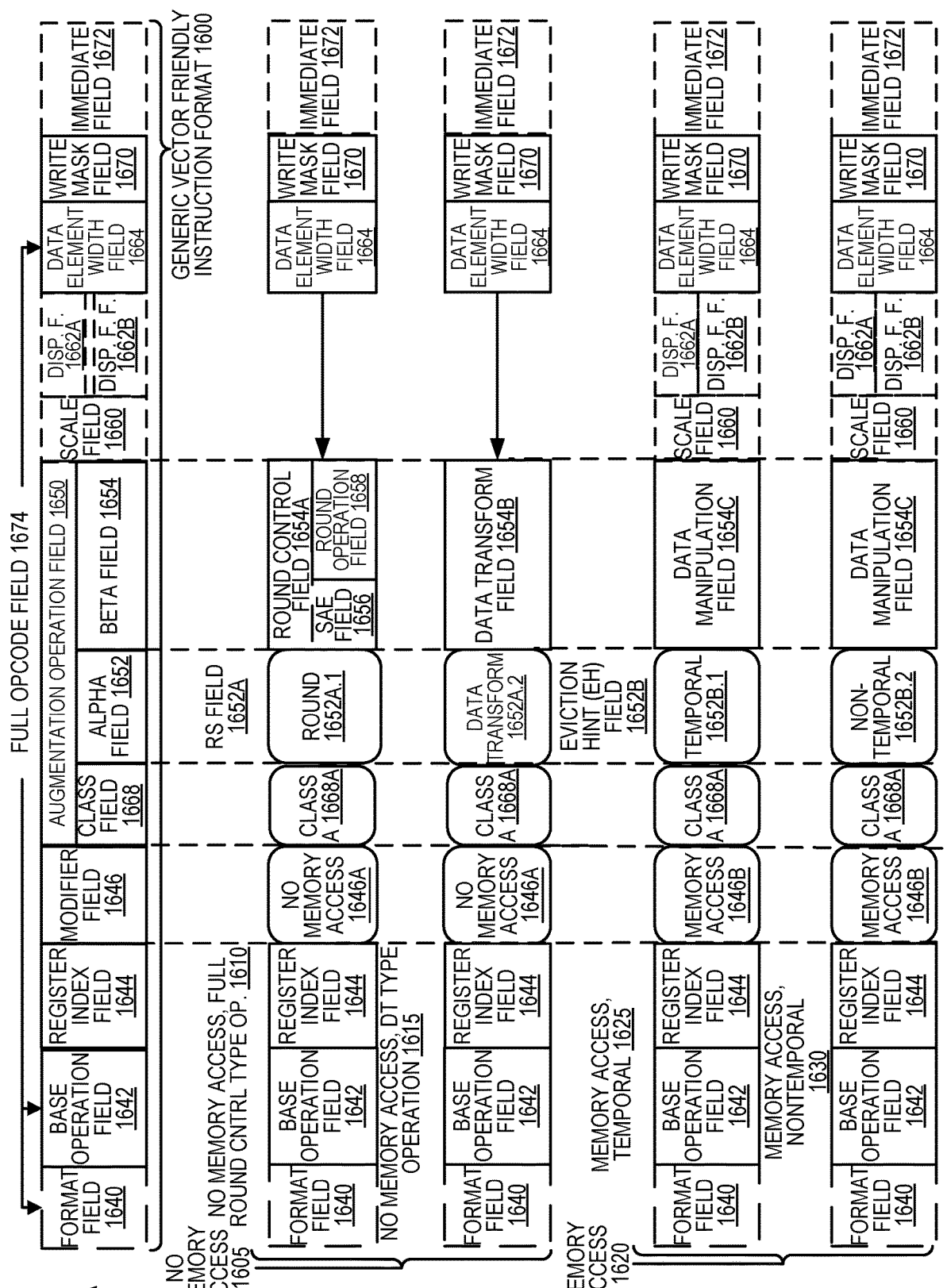
FIG. 16A is a block diagram illustrating a generic vector friendly instruction format and class A instruction templates thereof according to embodiments of the disclosure.
Figure 16B:
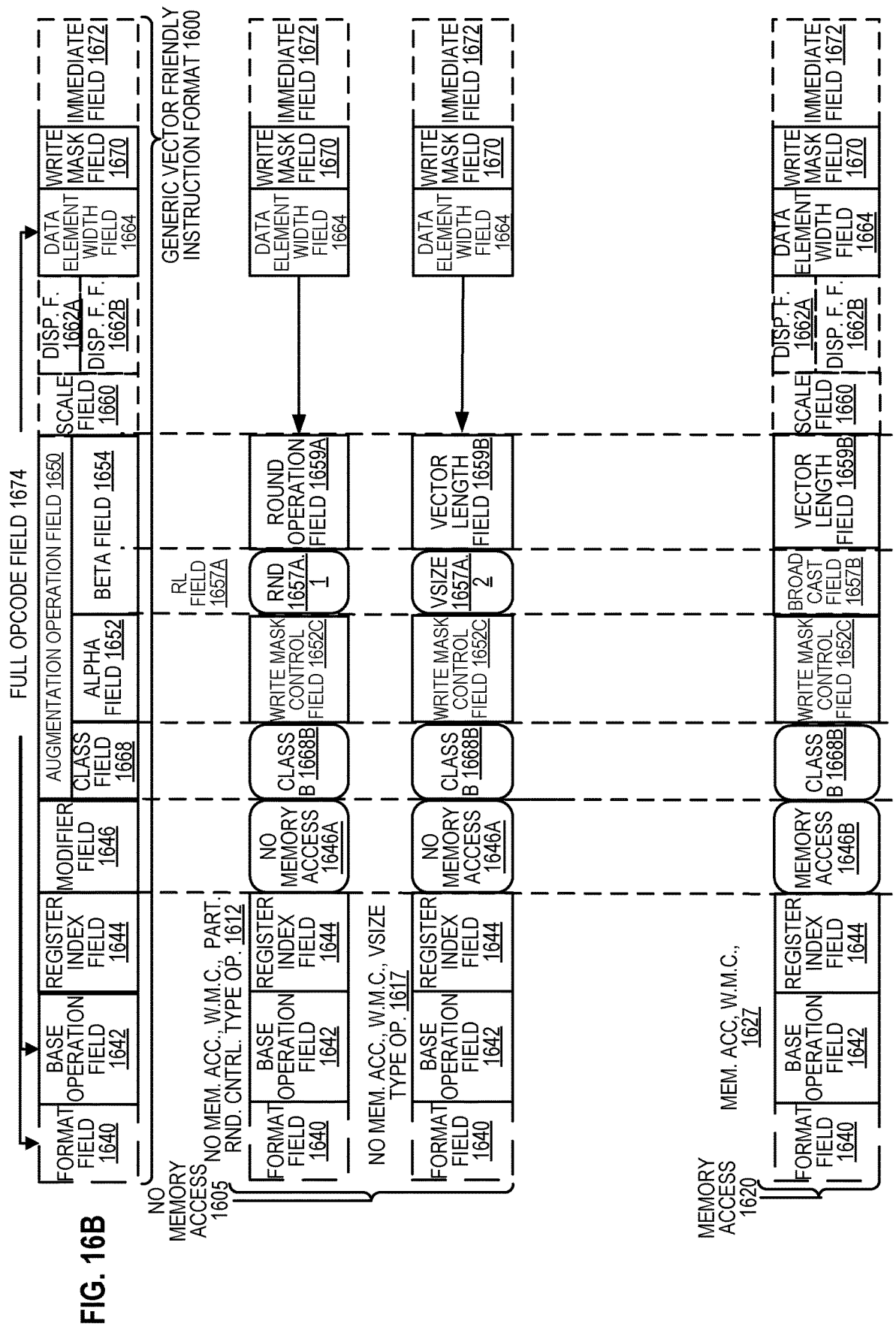
FIG. 16B is a block diagram illustrating the generic vector friendly instruction format and class B instruction templates thereof according to embodiments of the disclosure.

FIGS. 16A-16B are block diagrams illustrating a generic vector friendly instruction format and instruction templates thereof according to embodiments of the disclosure. FIG. 16A is a block diagram illustrating a generic vector friendly instruction format and class A instruction templates thereof according to embodiments of the disclosure; while FIG. 16B is a block diagram illustrating the generic vector friendly instruction format and class B instruction templates thereof according to embodiments of the disclosure. Specifically, a generic vector friendly instruction format 1600 for which are defined class A and class B instruction templates, both of which include no memory access 1605 instruction templates and memory access 1620 instruction templates. The term generic in the context of the vector friendly instruction format refers to the instruction format not being tied to any specific instruction set.

While embodiments of the disclosure will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 16A include: 1) within the no memory access 1605 instruction templates there is shown a no memory access, full round control type operation 1610 instruction template and a no memory access, data transform type operation 1615 instruction template; and 2) within the memory access 1620 instruction templates there is shown a memory access, temporal 1625 instruction template and a memory access, non-temporal 1630 instruction template. The class B instruction templates in FIG. 16B include: 1) within the no memory access 1605 instruction templates there is shown a no memory access, write mask control, partial round control type operation 1612 instruction template and a no memory access, write mask control, vsize type operation 1617 instruction template; and 2) within the memory access 1620 instruction templates there is shown a memory access, write mask control 1627 instruction template.

The generic vector friendly instruction format 1600 includes the following fields listed below in the order illustrated in FIGS. 16A-16B.

Format field 1640—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 1642—its content distinguishes different base operations.

Register index field 1644—its content, directly or through address generation, specifies the locations of the source and destination operands, be they in registers or in memory. These include a sufficient number of bits to select N registers from a P×Q (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 1646—its content distinguishes occurrences of instructions in the generic vector instruction format that specify memory access 1646B from those that do not 1646A; that is, between no memory access 1605 instruction templates and memory access 1620 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 1650—its content distinguishes which one of a variety of different operations to be performed in addition to the base operation. This field is context specific. In one embodiment of the disclosure, this field is divided into a class field 1668, an alpha field 1652, and a beta field 1654. The augmentation operation field 1650 allows common groups of operations to be performed in a single instruction rather than 2, 3, or 4 instructions.

Scale field 1660—its content allows for the scaling of the index field's content for memory address generation (e.g., for address generation that uses $2^{scale}*index+base$).

Displacement Field 1662A—its content is used as part of memory address generation (e.g., for address generation that uses $2^{scale}*index+base+displacement$).

Displacement Factor Field 1662B (note that the juxtaposition of displacement field 1662A directly over displacement factor field 1662B indicates one or the other is used)—its content is used as part of address generation; it specifies a displacement factor that is to be scaled by the size of a memory access (N)—where N is the number of bytes in the memory access (e.g., for address generation that uses $2^{scale}*index+base+scaled\ displacement$). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 1674 (described later herein) and the data manipulation field 1654C. The displacement field 1662A and the displacement factor field 1662B are optional in the sense that they are not used for the no memory access 1605 instruction templates and/or different embodiments may implement only one or none of the two.

Data element width field 1664—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 1670—its content controls, on a per data element position basis, whether that data element position in the destination vector operand reflects the result of the base operation and augmentation operation. Class A instruction templates support merging-write masking, while class B instruction templates support both merging- and zeroing-write masking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 1670 allows for partial vector operations, including loads, stores, arithmetic, logical, etc. While embodiments of the disclosure are described in which the write mask field's 1670 content selects one of a number of write mask registers that contains the write mask to be used (and thus the write mask field's 1670 content indirectly identifies that masking to be performed), alternative embodiments instead or additional allow the mask write field's 1670 content to directly specify the masking to be performed.

Immediate field 1672—its content allows for the specification of an immediate. This field is optional in the sense that is it not present in an implementation of the generic vector friendly format that does not support immediate and it is not present in instructions that do not use an immediate.

Class field 1668—its content distinguishes between different classes of instructions. With reference to FIGS. 16A-B, the contents of this field select between class A and class B instructions. In FIGS. 16A-B, rounded corner squares are used to indicate a specific value is present in a field (e.g., class A 1668A and class B 1668B for the class field 1668 respectively in FIGS. 16A-B).

Instruction Templates of Class A

In the case of the non-memory access 1605 instruction templates of class A, the alpha field 1652 is interpreted as an RS field 1652A, whose content distinguishes which one of the different augmentation operation types are to be performed (e.g., round 1652A.1 and data transform 1652A.2 are respectively specified for the no memory access, round type operation 1610 and the no memory access, data transform type operation 1615 instruction templates), while the beta field 1654 distinguishes which of the operations of the specified type is to be performed. In the no memory access 1605 instruction templates, the scale field 1660, the displacement field 1662A, and the displacement factor field 1662B are not present.

No-Memory Access Instruction Templates—Full Round Control Type Operation

In the no memory access full round control type operation 1610 instruction template, the beta field 1654 is interpreted as a round control field 1654A, whose content(s) provide static rounding. While in the described embodiments of the disclosure the round control field 1654A includes a suppress all floating point exceptions (SAE) field 1656 and a round operation control field 1658, alternative embodiments may support may encode both these concepts into the same field or only have one or the other of these concepts/fields (e.g., may have only the round operation control field 1658).

SAE field 1656—its content distinguishes whether or not to disable the exception event reporting; when the SAE field's 1656 content indicates suppression is enabled, a given instruction does not report any kind of floating-point exception flag and does not raise any floating point exception handler.

Round operation control field 1658— its content distinguishes which one of a group of rounding operations to perform (e.g., Round-up, Round-down, Round-towards-zero and Round-to-nearest). Thus, the round operation control field 1658 allows for the changing of the rounding mode on a per instruction basis. In one embodiment of the disclosure where a processor includes a control register for specifying rounding modes, the round operation control field's 1658 content overrides that register value.

No Memory Access Instruction Templates—Data Transform Type Operation

In the no memory access data transform type operation 1615 instruction template, the beta field 1654 is interpreted as a data transform field 1654B, whose content distinguishes which one of a number of data transforms is to be performed (e.g., no data transform, swizzle, broadcast).

In the case of a memory access 1620 instruction template of class A, the alpha field 1652 is interpreted as an eviction hint field 1652B, whose content distinguishes which one of the eviction hints is to be used (in FIG. 16A, temporal 1652B.1 and non-temporal 1652B.2 are respectively specified for the memory access, temporal 1625 instruction template and the memory access, non-temporal 1630 instruction template), while the beta field 1654 is interpreted as a data manipulation field 1654C, whose content distinguishes which one of a number of data manipulation operations (also known as primitives) is to be performed (e.g., no manipulation; broadcast; up conversion of a source; and down conversion of a destination). The memory access 1620 instruction templates include the scale field 1660, and optionally the displacement field 1662A or the displacement factor field 1662B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 1652 is interpreted as a write mask control (Z) field 1652C, whose content distinguishes whether the write masking controlled by the write mask field 1670 should be a merging or a zeroing.

In the case of the non In the case of the non-memory access 1605 instruction templates of class B, part of the beta field 1654 is interpreted as an RL field 1657A, whose content distinguishes which one of the different augmentation operation types are to be performed (e.g., round 1657A.1 and vector length (VSIZE) 1657A.2 are respectively specified for the no memory access, write mask control, partial round control type operation 1612 instruction template and the no memory access, write mask control, VSIZE type operation 1617 instruction template), while the rest of the beta field 1654 distinguishes which of the operations of the specified type is to be performed. In the no memory access 1605 instruction templates, the scale field 1660, the displacement field 1662A, and the displacement factor field 1662B are not present.

In the no memory access, write mask control, partial round control type operation 1610 instruction template, the rest of the beta field 1654 is interpreted as a round operation field 1659A and exception event reporting is disabled (a given instruction does not report any kind of floating-point exception flag and does not raise any floating point exception handler).

Round operation control field 1659A—just as round operation control field 1658, its content distinguishes which one of a group of rounding operations to perform (e.g., Round-up, Round-down, Round-towards-zero and Round-to-nearest). Thus, the round operation control field 1659A allows for the changing of the rounding mode on a per instruction basis. In one embodiment of the disclosure where a processor includes a control register for specifying rounding modes, the round operation control field's 1659A content overrides that register value.

In the no memory access, write mask control, VSIZE type operation 1617 instruction template, the rest of the beta field 1654 is interpreted as a vector length field 1659B, whose content distinguishes which one of a number of data vector lengths is to be performed on (e.g., 128, 256, or 512 byte).

In the case of a memory access 1620 instruction template of class B, part of the beta field 1654 is interpreted as a broadcast field 1657B, whose content distinguishes whether or not the broadcast type data manipulation operation is to be performed, while the rest of the beta field 1654 is interpreted the vector length field 1659B. The memory access 1620 instruction templates include the scale field 1660, and optionally the displacement field 1662A or the displacement factor field 1662B.

With regard to the generic vector friendly instruction format 1600, a full opcode field 1674 is shown including the format field 1640, the base operation field 1642, and the data element width field 1664. While one embodiment is shown where the full opcode field 1674 includes all of these fields, the full opcode field 1674 includes less than all of these fields in embodiments that do not support all of them. The full opcode field 1674 provides the operation code (opcode).

The augmentation operation field 1650, the data element width field 1664, and the write mask field 1670 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the disclosure, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the disclosure). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the disclosure. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

FIGS. 17A-D are block diagrams illustrating an exemplary specific vector friendly instruction format according to embodiments of the disclosure. FIGS. 17A-D show a specific vector friendly instruction format 1700 that is specific in the sense that it specifies the location, size, interpretation, and order of the fields, as well as values for some of those fields. The specific vector friendly instruction format 1700 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIGS. 16A-B into which the fields from FIGS. 17A-D map are illustrated.

It should be understood that, although embodiments of the disclosure are described with reference to the specific vector friendly instruction format 1700 in the context of the generic vector friendly instruction format 1600 for illustrative purposes, the disclosure is not limited to the specific vector friendly instruction format 1700 except where claimed. For example, the generic vector friendly instruction format 1600 contemplates a variety of possible sizes for the various fields, while the specific vector friendly instruction format 1700 is shown as having fields of specific sizes. By way of specific example, while the data element width field 1664 is illustrated as a one bit field in the specific vector friendly instruction format 1700, the disclosure is not so limited (that is, the generic vector friendly instruction format 1600 contemplates other sizes of the data element width field 1664).

The generic vector friendly instruction format 1600 includes the following fields listed below in the order illustrated in FIG. 17A.

EVEX Prefix (Bytes 0-3) 1702—is encoded in a four-byte form.

Format Field 1640 (EVEX Byte 0, bits [7:0])—the first byte (EVEX Byte 0) is the format field 1640 and it contains 0x62 (the unique value used for distinguishing the vector friendly instruction format in one embodiment of the disclosure).

The second-fourth bytes (EVEX Bytes 1-3) include a number of bit fields providing specific capability.

REX field 1705 (EVEX Byte 1, bits [7-5])—consists of a EVEX.R bit field (EVEX Byte 1, bit [7]—R), EVEX.X bit field (EVEX byte 1, bit [6]—X), and 1657 BEX byte 1, bit[5]—B). The EVEX.R, EVEX.X, and EVEX.B bit fields provide the same functionality as the corresponding VEX bit fields, and are encoded using is complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 1610—this is the first part of the REX' field 1610 and is the EVEX.R' bit field (EVEX Byte 1, bit [4]—R') that is used to encode either the upper 16 or lower 16 of the extended 32 register set. In one embodiment of the disclosure, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments of the disclosure do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 1715 (EVEX byte 1, bits [3:0]—mmmm)—its content encodes an implied leading opcode byte (0F, 0F 38, or 0F 3).

Data element width field 1664 (EVEX byte 2, bit [7]—W)—is represented by the notation EVEX.W. EVEX.W is used to define the granularity (size) of the datatype (either 32-bit data elements or 64-bit data elements).

EVEX.vvvv 1720 (EVEX Byte 2, bits [6:3]—vvvv)—the role of EVEX.vvvv may include the following: 1) EVEX.vvvv encodes the first source register operand, specified in inverted (1s complement) form and is valid for instructions with 2 or more source operands; 2) EVEX.vvvv encodes the destination register operand, specified in 1s complement form for certain vector shifts; or 3) EVEX.vvvv does not encode any operand, the field is reserved and should contain 1111b. Thus, EVEX.vvvv field 1720 encodes the 4 low-order bits of the first source register specifier stored in inverted (1s complement) form. Depending on the instruction, an extra different EVEX bit field is used to extend the specifier size to 32 registers.

EVEX.U 1668 Class field (EVEX byte 2, bit [2]—U)—If EVEX.U=0, it indicates class A or EVEX.U0; if EVEX.U=1, it indicates class B or EVEX.U1.

Prefix encoding field 1725 (EVEX byte 2, bits [1:0]—pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 1652 (EVEX byte 3, bit [7]—EH; also known as EVEX.EH, EVEX.rs, EVEX.RL, EVEX.write mask control, and EVEX.N; also illustrated with α)—as previously described, this field is context specific.

Beta field 1654 (EVEX byte 3, bits [6:4]—SSS, also known as EVEX.$s_{2-0}$, EVEX.$r_{2-0}$, EVEX.rr1, EVEX.LL0, EVEX.LLB; also illustrated with βββ)—as previously described, this field is context specific.

REX' field 1610—this is the remainder of the REX' field and is the EVEX.V' bit field (EVEX Byte 3, bit [3]—V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 1670 (EVEX byte 3, bits [2:0]—kkk)—its content specifies the index of a register in the write mask registers as previously described. In one embodiment of the disclosure, the specific value EVEX kkk=000 has a special behavior implying no write mask is used for the particular instruction (this may be implemented in a variety of ways including the use of a write mask hardwired to all ones or hardware that bypasses the masking hardware).

Real Opcode Field 1730 (Byte 4) is also known as the opcode byte. Part of the opcode is specified in this field.

MOD R/M Field 1740 (Byte 5) includes MOD field 1742, Reg field 1744, and R/M field 1746. As previously described, the MOD field's 1742 content distinguishes between memory access and non-memory access operations. The role of Reg field 1744 can be summarized to two situations: encoding either the destination register operand or a source register operand, or be treated as an opcode extension and not used to encode any instruction operand. The role of R/M field 1746 may include the following: encoding the instruction operand that references a memory address, or encoding either the destination register operand or a source register operand.

Scale, Index, Base (SIB) Byte (Byte 6)—As previously described, the scale field's 1660 content is used for memory address generation. SIB.xxx 1754 and SIB.bbb 1756— the contents of these fields have been previously referred to with regard to the register indexes Xxxx and Bbbb.

Displacement field 1662A (Bytes 7-10)—when MOD field 1742 contains 10, bytes 7-10 are the displacement field 1662A, and it works the same as the legacy 32-bit displacement (disp32) and works at byte granularity.

Displacement factor field 1662B (Byte 7)—when MOD field 1742 contains 01, byte 7 is the displacement factor field 1662B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 1662B is a reinterpretation of disp8; when using displacement factor field 1662B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 1662B substitutes the legacy x86 instruction set 8-bit displacement. Thus, the displacement factor field 1662B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset). Immediate field 1672 operates as previously described.

Full Opcode Field

FIG. 17B is a block diagram illustrating the fields of the specific vector friendly instruction format 1700 that make up the full opcode field 1674 according to one embodiment of the disclosure. Specifically, the full opcode field 1674 includes the format field 1640, the base operation field 1642, and the data element width (W) field 1664. The base operation field 1642 includes the prefix encoding field 1725, the opcode map field 1715, and the real opcode field 1730.

Register Index Field

FIG. 17C is a block diagram illustrating the fields of the specific vector friendly instruction format 1700 that make up the register index field 1644 according to one embodiment of the disclosure. Specifically, the register index field 1644 includes the REX field 1705, the REX' field 1710, the MODR/M.reg field 1744, the MODR/M.r/m field 1746, the VVVV field 1720, xxx field 1754, and the bbb field 1756.

Augmentation Operation Field

Figure 17D:
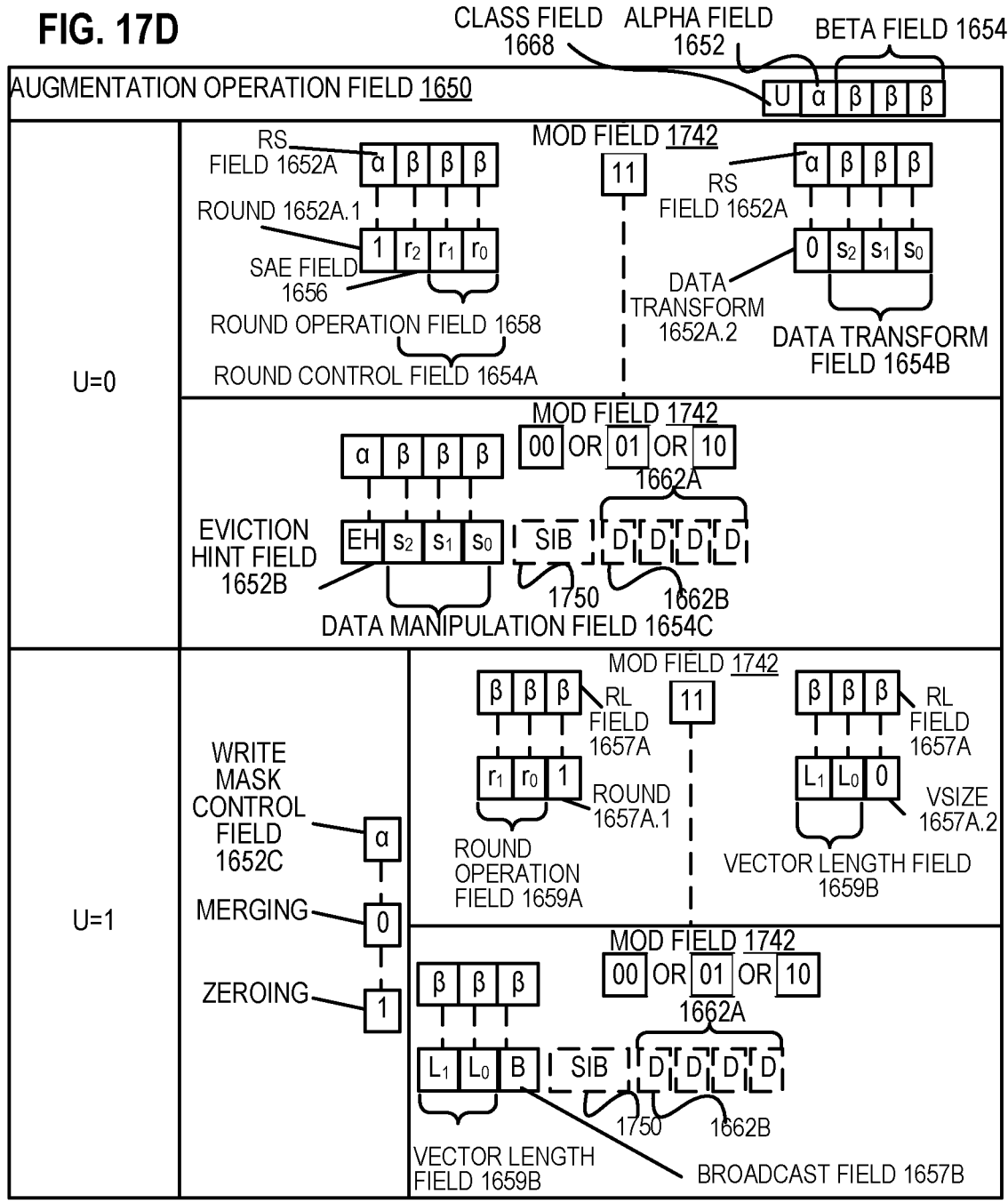
FIG. 17D is a block diagram illustrating the fields of the specific vector friendly instruction format in FIG. 17A that make up the augmentation operation field 1650 according to one embodiment of the disclosure.

FIG. 17D is a block diagram illustrating the fields of the specific vector friendly instruction format 1700 that make up the augmentation operation field 1650 according to one embodiment of the disclosure. When the class (U) field 1668 contains 0, it signifies EVEX.U0 (class A 1668A); when it contains 1, it signifies EVEX.U1 (class B 1668B). When U=0 and the MOD field 1742 contains 11 (signifying a no memory access operation), the alpha field 1652 (EVEX byte 3, bit [7]—EH) is interpreted as the rs field 1652A. When the rs field 1652A contains a 1 (round 1652A.1), the beta field 1654 (EVEX byte 3, bits [6:4]—SSS) is interpreted as the round control field 1654A. The round control field 1654A includes a one bit SAE field 1656 and a two bit round operation field 1658. When the rs field 1652A contains a 0 (data transform 1652A.2), the beta field 1654 (EVEX byte 3, bits [6:4]—SSS) is interpreted as a three bit data transform field 1654B. When U=0 and the MOD field 1742 contains 00, 01, or 10 (signifying a memory access operation), the alpha field 1652 (EVEX byte 3, bit [7]—EH) is interpreted as the eviction hint (EH) field 1652B and the beta field 1654 (EVEX byte 3, bits [6:4]—SSS) is interpreted as a three bit data manipulation field 1654C.

When U=1, the alpha field 1652 (EVEX byte 3, bit [7]—EH) is interpreted as the write mask control (Z) field 1652C. When U=1 and the MOD field 1742 contains 11 (signifying a no memory access operation), part of the beta field 1654 (EVEX byte 3, bit [4]—$S_0$) is interpreted as the RL field 1657A; when it contains a 1 (round 1657A.1) the rest of the beta field 1654 (EVEX byte 3, bit [6-5]—$S_{2-1}$) is interpreted as the round operation field 1659A, while when the RL field 1657A contains a 0 (VSIZE 1657.A2) the rest of the beta field 1654 (EVEX byte 3, bit [6-5]—$S_{2-1}$) is interpreted as the vector length field 1659B (EVEX byte 3, bit [6-5]—$L_{1-0}$). When U=1 and the MOD field 1742 contains 00, 01, or 10 (signifying a memory access operation), the beta field 1654 (EVEX byte 3, bits [6:4]—SSS) is interpreted as the vector length field 1659B (EVEX byte 3, bit [6-5]—$L_{1-0}$) and the broadcast field 1657B (EVEX byte 3, bit [4]—B).

Exemplary Register Architecture

Figure 18:
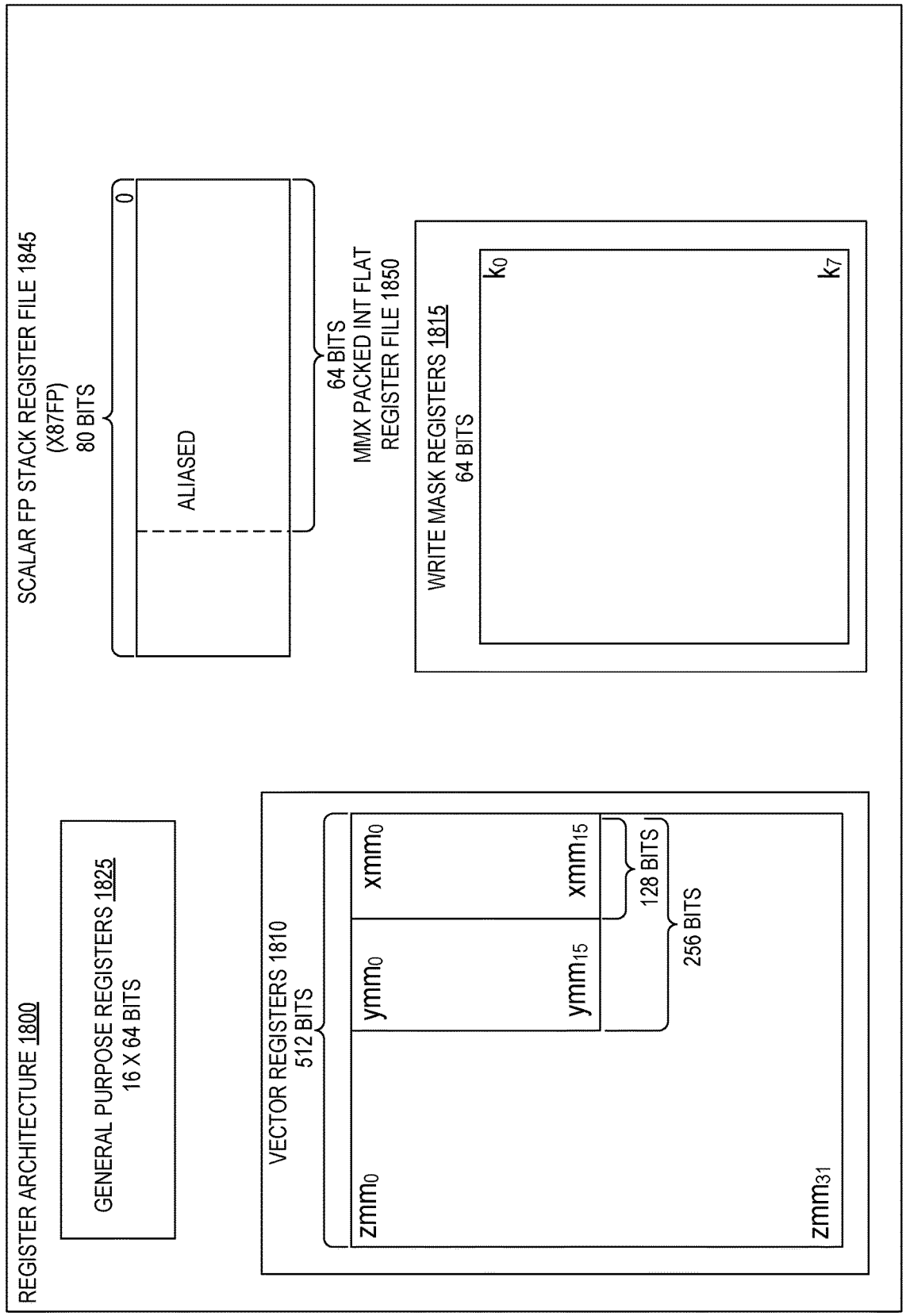
FIG. 18 is a block diagram of a register architecture according to one embodiment of the disclosure.

FIG. 18 is a block diagram of a register architecture 1800 according to one embodiment of the disclosure. In the embodiment illustrated, there are 32 vector registers 1810 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 1700 operates on these overlaid register file as illustrated in the below tables.

order data element positions are either left the same as they were prior to the instruction or zeroed depending on the embodiment.

Write mask registers 1815—in the embodiment illustrated, there are 8 write mask registers (k0 through k7), each 64 bits in size. In an alternate embodiment, the write mask registers 1815 are 16 bits in size. As previously described, in one embodiment of the disclosure, the vector mask register k0 cannot be used as a write mask; when the encoding that would normally indicate k0 is used for a write mask, it selects a hardwired write mask of 0xFFFF, effectively disabling write masking for that instruction.

General-purpose registers 1825—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 1845, on which is aliased the MMX packed integer flat register file 1850—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the disclosure may use wider or narrower registers. Additionally, alternative embodiments of the disclosure may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of dif-

| Adjustable Vector Length | Class | Operations | Registers |
|---|---|---|---|
| Instruction Templates that do not include the vector length field 1659B | A (FIG. 16A; U = 0) | 1610, 1615, 1625, 1630 | zmm registers (the vector length is 64 byte) |
| | B (FIG. 16B; U = 1) | 1612 | zmm registers (the vector length is 64 byte) |
| Instruction templates that do include the vector length field 1659B | B (FIG. 16B; U = 1) | 1617, 1627 | zmm, ymm, or xmm registers (the vector length is 64 byte, 32 byte, or 16 byte) depending on the vector length field 1659B |

In other words, the vector length field 1659B selects between a maximum length and one or more other shorter lengths, where each such shorter length is half the length of the preceding length; and instructions templates without the vector length field 1659B operate on the maximum vector length. Further, in one embodiment, the class B instruction templates of the specific vector friendly instruction format 1700 operate on packed or scalar single/double-precision floating point data and packed or scalar integer data. Scalar operations are operations performed on the lowest order data element position in an zmm/ymm/xmm register; the higher ferent processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput) computing. Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures
In-Order and Out-of-Order Core Block Diagram

FIG. 19A is a block diagram illustrating both an exemplary in-order pipeline and an exemplary register renaming, out-of-order issue/execution pipeline according to embodiments of the disclosure. FIG. 19B is a block diagram illustrating both an exemplary embodiment of an in-order architecture core and an exemplary register renaming, out-of-order issue/execution architecture core to be included in a processor according to embodiments of the disclosure. The solid lined boxes in FIGS. 19A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 19A, a processor pipeline 1900 includes a fetch stage 1902, a length decode stage 1904, a decode stage 1906, an allocation stage 1908, a renaming stage 1910, a scheduling (also known as a dispatch or issue) stage 1912, a register read/memory read stage 1914, an execute stage 1916, a write back/memory write stage 1918, an exception handling stage 1922, and a commit stage 1924.

FIG. 19B shows processor core 1990 including a front end unit 1930 coupled to an execution engine unit 1950, and both are coupled to a memory unit 1970. The core 1990 may be a reduced instruction set computing (RISC) core, a complex instruction set computing (CISC) core, a very long instruction word (VLIW) core, or a hybrid or alternative core type. As yet another option, the core 1990 may be a special-purpose core, such as, for example, a network or communication core, compression engine, coprocessor core, general purpose computing graphics processing unit (GPGPU) core, graphics core, or the like.

The front end unit 1930 includes a branch prediction unit 1932 coupled to an instruction cache unit 1934, which is coupled to an instruction translation lookaside buffer (TLB) 1936, which is coupled to an instruction fetch unit 1938, which is coupled to a decode unit 1940. The decode unit 1940 (or decoder or decoder unit) may decode instructions (e.g., macro-instructions), and generate as an output one or more micro-operations, micro-code entry points, micro-instructions, other instructions, or other control signals, which are decoded from, or which otherwise reflect, or are derived from, the original instructions. The decode unit 1940 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1990 includes a microcode ROM or other medium that stores microcode for certain macro-instructions (e.g., in decode unit 1940 or otherwise within the front end unit 1930). The decode unit 1940 is coupled to a rename/allocator unit 1952 in the execution engine unit 1950.

The execution engine unit 1950 includes the rename/allocator unit 1952 coupled to a retirement unit 1954 and a set of one or more scheduler unit(s) 1956. The scheduler unit(s) 1956 represents any number of different schedulers, including reservations stations, central instruction window, etc. The scheduler unit(s) 1956 is coupled to the physical register file unit(s) 1958. Each of the physical register file unit(s) 1958 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file unit(s) 1958 comprises a vector registers unit, a write mask registers unit, and a scalar registers unit. These register units may provide architectural vector registers, vector mask registers, and general purpose registers. The physical register file unit(s) 1958 is overlapped by the retirement unit 1954 to illustrate various ways in which register renaming and out-of-order execution may be implemented (e.g., using a reorder buffer(s) and a retirement register file(s); using a future file(s), a history buffer(s), and a retirement register file(s); using a register map and a pool of registers; etc.). The retirement unit 1954 and the physical register file unit(s) 1958 are coupled to the execution cluster(s) 1960. The execution cluster(s) 1960 includes a set of one or more execution units 1962 and a set of one or more memory access units 1964. The execution units 1962 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1956, physical register file unit(s) 1958, and execution cluster(s) 1960 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file unit(s), and/or execution cluster—and in the case of a separate memory access pipeline, certain embodiments are implemented in which only the execution cluster of this pipeline has the memory access unit(s) 1964). It should also be understood that where separate pipelines are used, one or more of these pipelines may be out-of-order issue/execution and the rest in-order.

The set of memory access units 1964 is coupled to the memory unit 1970, which includes a data TLB unit 1972 coupled to a data cache unit 1974 coupled to a level 2 (L2) cache unit 1976. In one exemplary embodiment, the memory access units 1964 may include a load unit, a store address unit, and a store data unit, each of which is coupled to the data TLB unit 1972 in the memory unit 1970. The instruction cache unit 1934 is further coupled to a level 2 (L2) cache unit 1976 in the memory unit 1970. The L2 cache unit 1976 is coupled to one or more other levels of cache and eventually to a main memory.

By way of example, the exemplary register renaming, out-of-order issue/execution core architecture may implement the pipeline 1900 as follows: 1) the instruction fetch 1938 performs the fetch and length decoding stages 1902 and 1904; 2) the decode unit 1940 performs the decode stage 1906; 3) the rename/allocator unit 1952 performs the allocation stage 1908 and renaming stage 1910; 4) the scheduler unit(s) 1956 performs the schedule stage 1912; 5) the physical register file unit(s) 1958 and the memory unit 1970 perform the register read/memory read stage 1914; the execution cluster 1960 perform the execute stage 1916; 6) the memory unit 1970 and the physical register file unit(s) 1958 perform the write back/memory write stage 1918; 7) various units may be involved in the exception handling stage 1922; and 8) the retirement unit 1954 and the physical register file unit(s) 1958 perform the commit stage 1924.

The core 1990 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1990 includes logic to support a packed data instruction set extension (e.g., AVX1, AVX2), thereby allowing the operations used by many multimedia applications to be performed using packed data.

It should be understood that the core may support multi-threading (executing two or more parallel sets of operations or threads), and may do so in a variety of ways including time sliced multithreading, simultaneous multithreading (where a single physical core provides a logical core for each of the threads that physical core is simultaneously multi-threading), or a combination thereof (e.g., time sliced fetching and decoding and simultaneous multithreading thereafter such as in the Intel® Hyper-Threading technology).

While register renaming is described in the context of out-of-order execution, it should be understood that register renaming may be used in an in-order architecture. While the illustrated embodiment of the processor also includes separate instruction and data cache units 1934/1974 and a shared L2 cache unit 1976, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 20B:
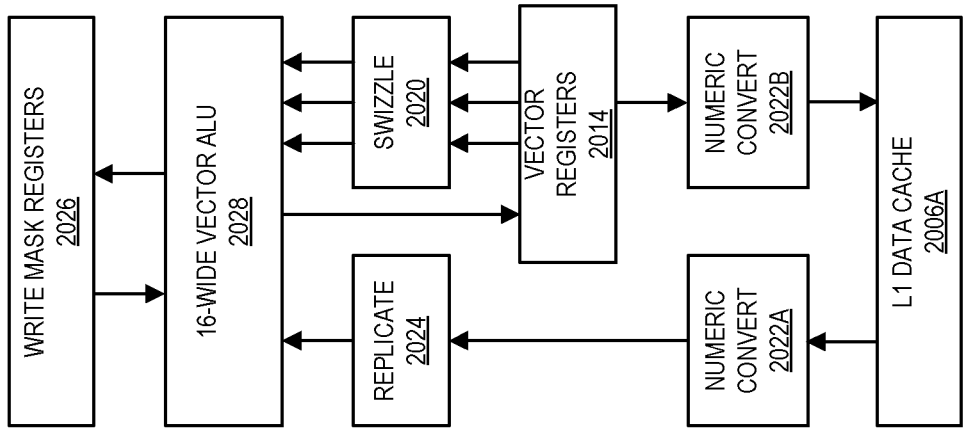
FIG. 20B is an expanded view of part of the processor core in FIG. 20A according to embodiments of the disclosure.
Figure 20A:
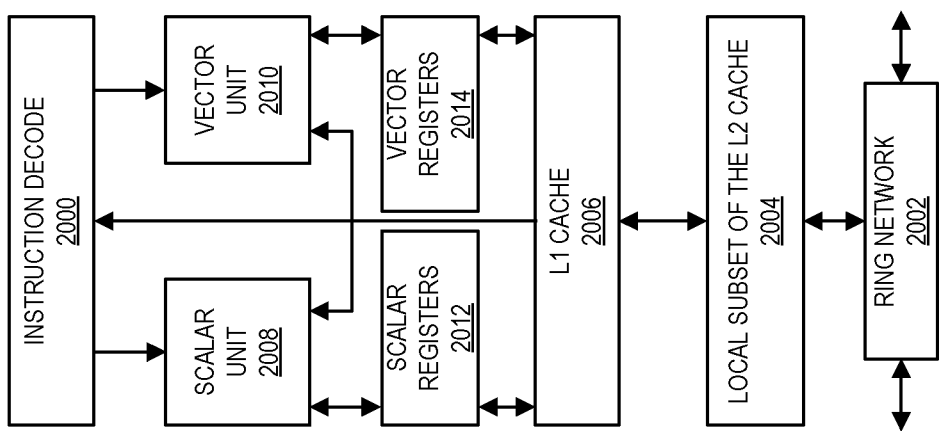
FIG. 20A is a block diagram of a single processor core, along with its connection to the on-die interconnect network and with its local subset of the Level 2 (L2) cache, according to embodiments of the disclosure.

FIGS. 20A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 20A is a block diagram of a single processor core, along with its connection to the on-die interconnect network 2002 and with its local subset of the Level 2 (L2) cache 2004, according to embodiments of the disclosure. In one embodiment, an instruction decode unit 2000 supports the x86 instruction set with a packed data instruction set extension. An L1 cache 2006 allows low-latency accesses to cache memory into the scalar and vector units. While in one embodiment (to simplify the design), a scalar unit 2008 and a vector unit 2010 use separate register sets (respectively, scalar registers 2012 and vector registers 2014) and data transferred between them is written to memory and then read back in from a level 1 (L1) cache 2006, alternative embodiments of the disclosure may use a different approach (e.g., use a single register set or include a communication path that allow data to be transferred between the two register files without being written and read back).

The local subset of the L2 cache 2004 is part of a global L2 cache that is divided into separate local subsets, one per processor core. Each processor core has a direct access path to its own local subset of the L2 cache 2004. Data read by a processor core is stored in its L2 cache subset 2004 and can be accessed quickly, in parallel with other processor cores accessing their own local L2 cache subsets. Data written by a processor core is stored in its own L2 cache subset 2004 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 20B is an expanded view of part of the processor core in FIG. 20A according to embodiments of the disclosure. FIG. 20B includes an L1 data cache part 2006A of the L1 cache 2006, as well as more detail regarding the vector unit 2010 and the vector registers 2014. Specifically, the vector unit 2010 is a 16-wide vector processing unit (VPU) (see the 16-wide ALU 2028), which executes one or more of integer, single-precision float, and double-precision float instructions. The VPU supports swizzling the register inputs with swizzle unit 2020, numeric conversion with numeric convert units 2022A-B, and replication with replication unit 2024 on the memory input. Write mask registers 2026 allow predicating resulting vector writes.

Figure 21:
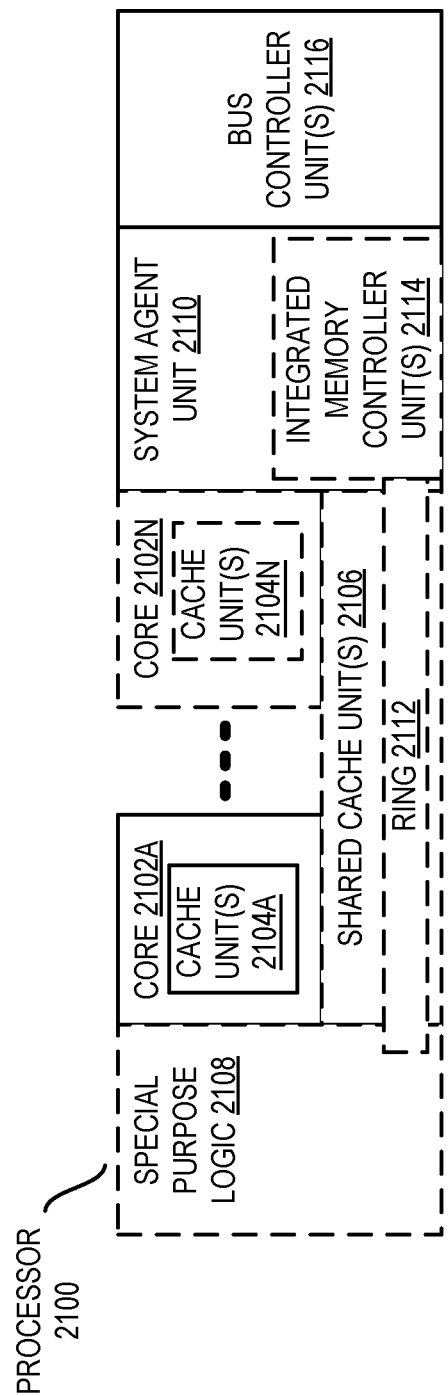
FIG. 21 is a block diagram of a processor that may have more than one core, may have an integrated memory controller, and may have integrated graphics according to embodiments of the disclosure.

FIG. 21 is a block diagram of a processor 2100 that may have more than one core, may have an integrated memory controller, and may have integrated graphics according to embodiments of the disclosure. The solid lined boxes in FIG. 21 illustrate a processor 2100 with a single core 2102A, a system agent 2110, a set of one or more bus controller units 2116, while the optional addition of the dashed lined boxes illustrates an alternative processor 2100 with multiple cores 2102A-N, a set of one or more integrated memory controller unit(s) 2114 in the system agent unit 2110, and special purpose logic 2108.

Thus, different implementations of the processor 2100 may include: 1) a CPU with the special purpose logic 2108 being integrated graphics and/or scientific (throughput) logic (which may include one or more cores), and the cores 2102A-N being one or more general purpose cores (e.g., general purpose in-order cores, general purpose out-of-order cores, a combination of the two); 2) a coprocessor with the cores 2102A-N being a large number of special purpose cores intended primarily for graphics and/or scientific (throughput); and 3) a coprocessor with the cores 2102A-N being a large number of general purpose in-order cores. Thus, the processor 2100 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 2100 may be a part of and/or may be implemented on one or more substrates using any of a number of process technologies, such as, for example, BiCMOS, CMOS, or NMOS.

The memory hierarchy includes one or more levels of cache 2104A-2104N within the cores 2102A-2102N, a set or one or more shared cache units 2106, and external memory (not shown) coupled to the set of integrated memory controller units 2114. The set of shared cache units 2106 may include one or more mid-level caches, such as level 2 (L2), level 3 (L3), level 4 (L4), or other levels of cache, a last level cache (LLC), and/or combinations thereof. While in one embodiment a ring based interconnect unit 2112 interconnects the integrated graphics logic 2108, the set of shared cache units 2106, and the system agent unit 2110/integrated memory controller unit(s) 2114, alternative embodiments may use any number of well-known techniques for interconnecting such units. In one embodiment, coherency is maintained between one or more cache units 2106 and cores 2102-A-N.

In some embodiments, one or more of the cores 2102A-N are capable of multithreading. The system agent 2110 includes those components coordinating and operating cores 2102A-N. The system agent unit 2110 may include for example a power control unit (PCU) and a display unit. The PCU may be or include logic and components needed for regulating the power state of the cores 2102A-N and the integrated graphics logic 2108. The display unit is for driving one or more externally connected displays.

The cores 2102A-N may be homogenous or heterogeneous in terms of architecture instruction set; that is, two or more of the cores 2102A-N may be capable of executing the same instruction set, while others may be capable of executing only a subset of that instruction set or a different instruction set.

Exemplary Computer Architectures

FIGS. 22-25 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 22:
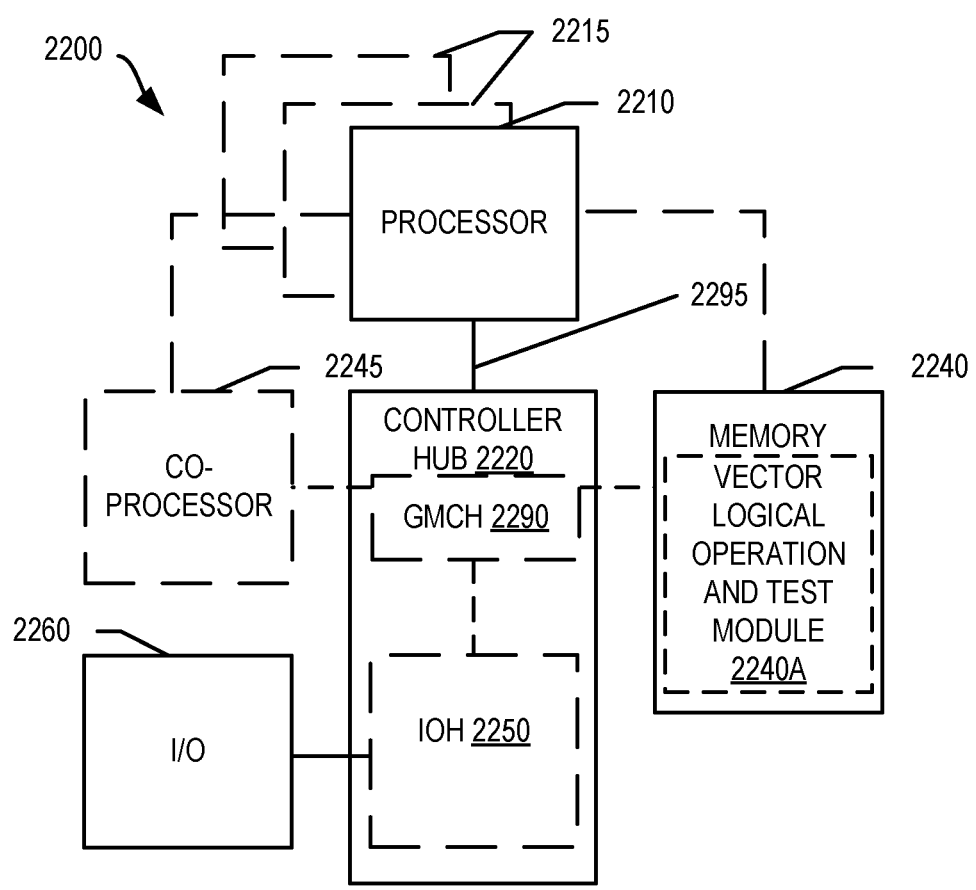
FIG. 22 is a block diagram of a system in accordance with one embodiment of the present disclosure.

Referring now to FIG. 22, shown is a block diagram of a system 2200 in accordance with one embodiment of the present disclosure. The system 2200 may include one or more processors 2210, 2215, which are coupled to a controller hub 2220. In one embodiment the controller hub 2220 includes a graphics memory controller hub (GMCH) 2290 and an Input/Output Hub (IOH) 2250 (which may be on separate chips); the GMCH 2290 includes memory and graphics controllers to which are coupled memory 2240 and a coprocessor 2245; the IOH 2250 couples input/output (I/O) devices 2260 to the GMCH 2290. Alternatively, one or both of the memory and graphics controllers are integrated within the processor (as described herein), the memory 2240 and the coprocessor 2245 are coupled directly to the processor 2210, and the controller hub 2220 in a single chip with the IOH 2250. Memory 2240 may include a vector logical operation and test module 2240A, for example, to store code that when executed causes a processor to perform any method of this disclosure.

The optional nature of additional processors 2215 is denoted in FIG. 22 with broken lines. Each processor 2210, 2215 may include one or more of the processing cores described herein and may be some version of the processor 2100.

The memory 2240 may be, for example, dynamic random access memory (DRAM), phase change memory (PCM), or a combination of the two. For at least one embodiment, the controller hub 2220 communicates with the processor(s) 2210, 2215 via a multi-drop bus, such as a frontside bus (FSB), point-to-point interface such as Quickpath Interconnect (QPI), or similar connection 2295.

In one embodiment, the coprocessor 2245 is a special-purpose processor, such as, for example, a high-throughput MIC processor, a network or communication processor, compression engine, graphics processor, GPGPU, embedded processor, or the like. In one embodiment, controller hub 2220 may include an integrated graphics accelerator.

There can be a variety of differences between the physical resources 2210, 2215 in terms of a spectrum of metrics of merit including architectural, microarchitectural, thermal, power consumption characteristics, and the like.

In one embodiment, the processor 2210 executes instructions that control data processing operations of a general type. Embedded within the instructions may be coprocessor instructions. The processor 2210 recognizes these coprocessor instructions as being of a type that should be executed by the attached coprocessor 2245. Accordingly, the processor 2210 issues these coprocessor instructions (or control signals representing coprocessor instructions) on a coprocessor bus or other interconnect, to coprocessor 2245. Coprocessor(s) 2245 accept and execute the received coprocessor instructions.

Figure 23:
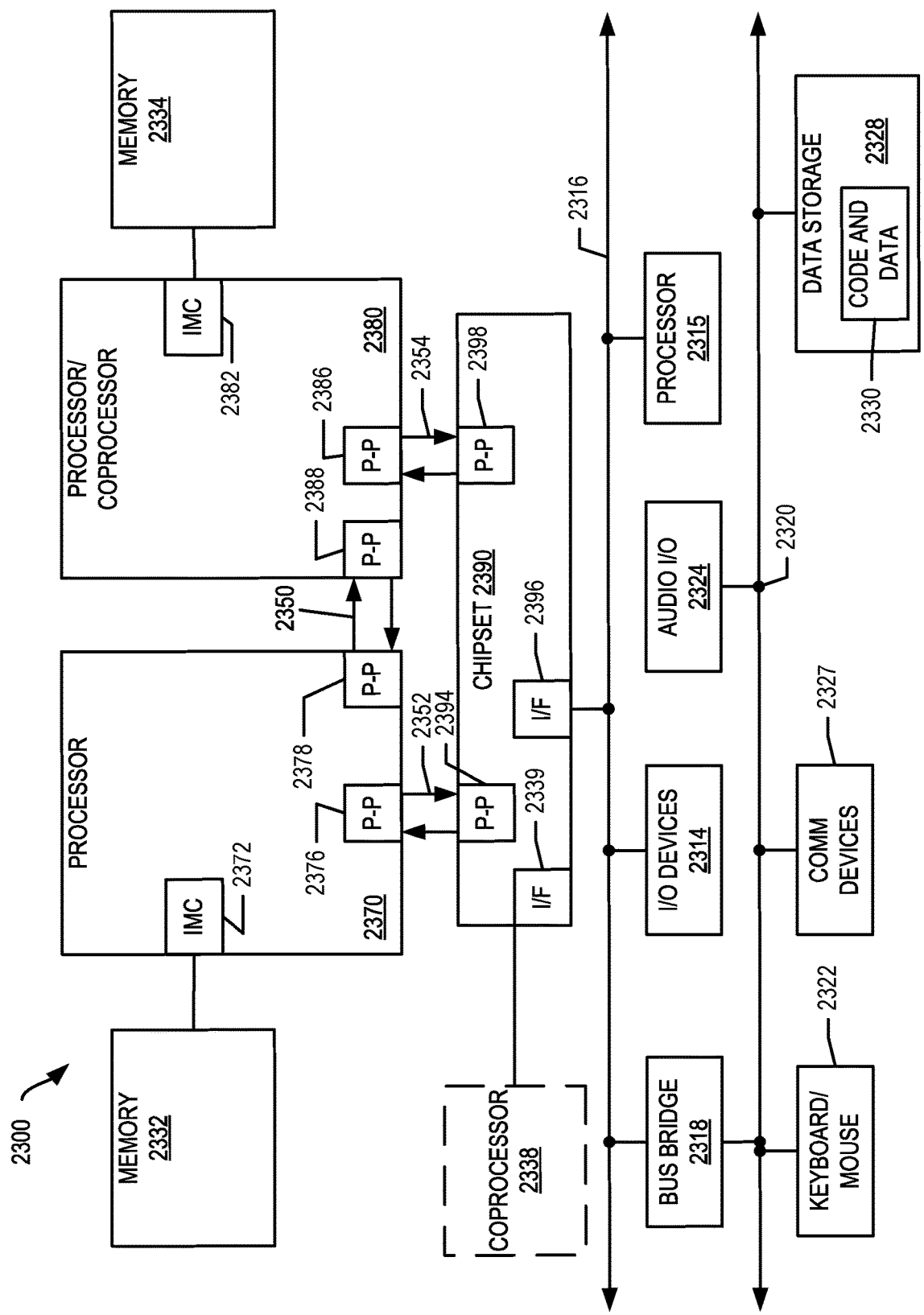
FIG. 23 is a block diagram of a more specific exemplary system in accordance with an embodiment of the present disclosure.

Referring now to FIG. 23, shown is a block diagram of a first more specific exemplary system 2300 in accordance with an embodiment of the present disclosure. As shown in FIG. 23, multiprocessor system 2300 is a point-to-point interconnect system, and includes a first processor 2370 and a second processor 2380 coupled via a point-to-point interconnect 2350. Each of processors 2370 and 2380 may be some version of the processor 2100. In one embodiment of the disclosure, processors 2370 and 2380 are respectively processors 2210 and 2215, while coprocessor 2338 is coprocessor 2245. In another embodiment, processors 2370 and 2380 are respectively processor 2210 and coprocessor 2245.

Processors 2370 and 2380 are shown including integrated memory controller (IMC) units 2372 and 2382, respectively. Processor 2370 also includes as part of its bus controller units point-to-point (P-P) interfaces 2376 and 2378; similarly, second processor 2380 includes P-P interfaces 2386 and 2388. Processors 2370, 2380 may exchange information via a point-to-point (P-P) interface 2350 using P-P interface circuits 2378, 2388. As shown in FIG. 23, IMCs 2372 and 2382 couple the processors to respective memories, namely a memory 2332 and a memory 2334, which may be portions of main memory locally attached to the respective processors.

Processors 2370, 2380 may each exchange information with a chipset 2390 via individual P-P interfaces 2352, 2354 using point to point interface circuits 2376, 2394, 2386, 2398. Chipset 2390 may optionally exchange information with the coprocessor 2338 via a high-performance interface 2339. In one embodiment, the coprocessor 2338 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 2390 may be coupled to a first bus 2316 via an interface 2396. In one embodiment, first bus 2316 may be a Peripheral Component Interconnect (PCI) bus, or a bus such as a PCI Express bus or another third generation I/O interconnect bus, although the scope of the present disclosure is not so limited.

As shown in FIG. 23, various I/O devices 2314 may be coupled to first bus 2316, along with a bus bridge 2318 which couples first bus 2316 to a second bus 2320. In one embodiment, one or more additional processor(s) 2315, such as coprocessors, high-throughput MIC processors, GPGPU's, accelerators (such as, e.g., graphics accelerators or digital signal processing (DSP) units), field programmable gate arrays, or any other processor, are coupled to first bus 2316. In one embodiment, second bus 2320 may be a low pin count (LPC) bus. Various devices may be coupled to a second bus 2320 including, for example, a keyboard and/or mouse 2322, communication devices 2327 and a storage unit 2328 such as a disk drive or other mass storage device which may include instructions/code and data 2330, in one embodiment. Further, an audio I/O 2324 may be coupled to the second bus 2320. Note that other architectures are possible. For example, instead of the point-to-point architecture of FIG. 23, a system may implement a multi-drop bus or other such architecture.

Figure 24:
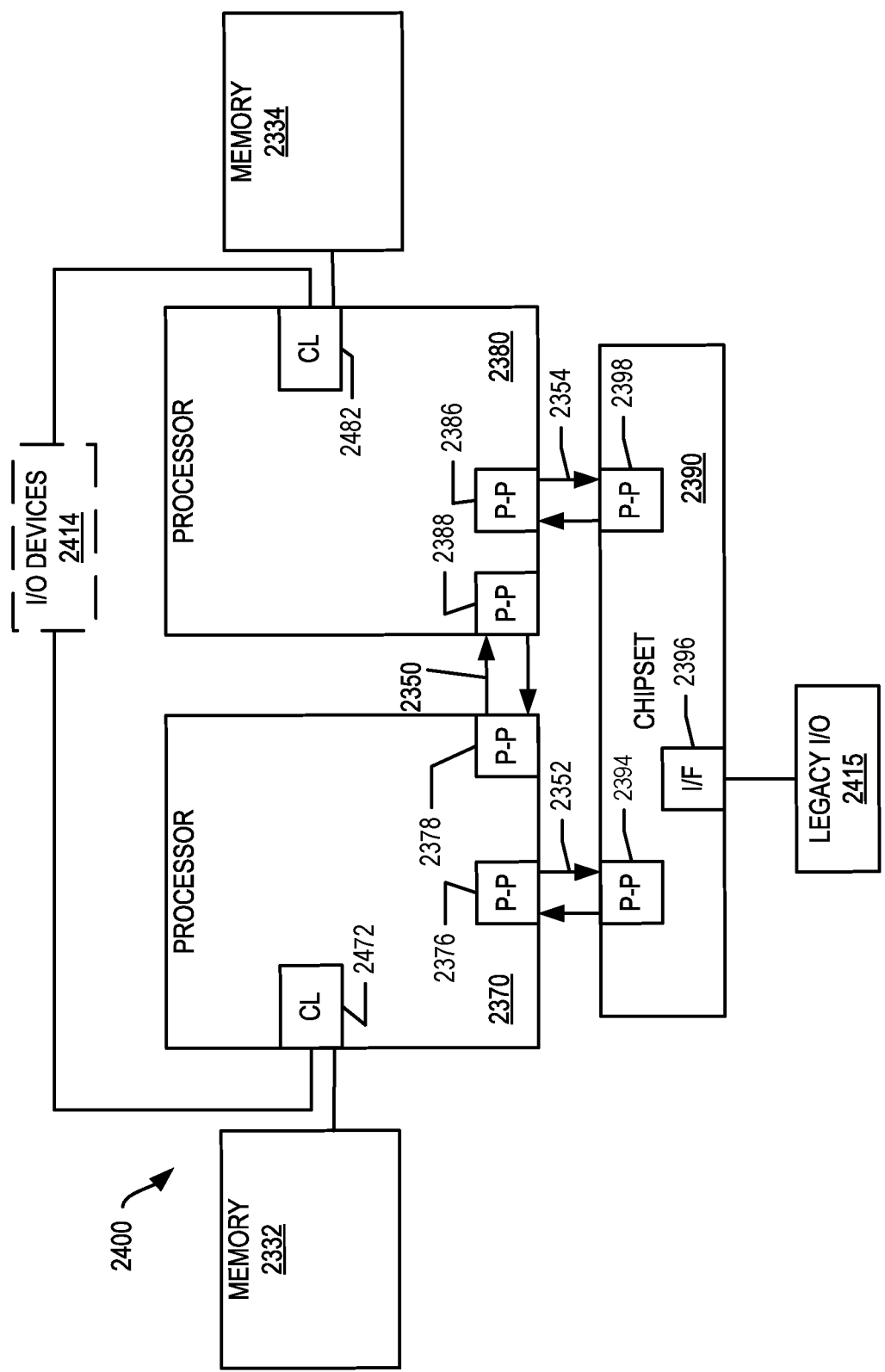
FIG. 24, shown is a block diagram of a second more specific exemplary system in accordance with an embodiment of the present disclosure.

Referring now to FIG. 24, shown is a block diagram of a second more specific exemplary system 2400 in accordance with an embodiment of the present disclosure Like elements in FIGS. 23 and 24 bear like reference numerals, and certain aspects of FIG. 23 have been omitted from FIG. 24 in order to avoid obscuring other aspects of FIG. 24.

The FIG. 24 illustrates that the processors 2370, 2380 may include integrated memory and I/O control logic ("CL") 2472 and 2482, respectively. Thus, the CL 2472, 2482 include integrated memory controller units and include I/O control logic. FIG. 24 illustrates that not only are the memories 2332, 2334 coupled to the CL 2472, 2482, but also that I/O devices 2414 are also coupled to the control logic 2472, 2482. Legacy I/O devices 2415 are coupled to the chipset 2390.

Figure 25:
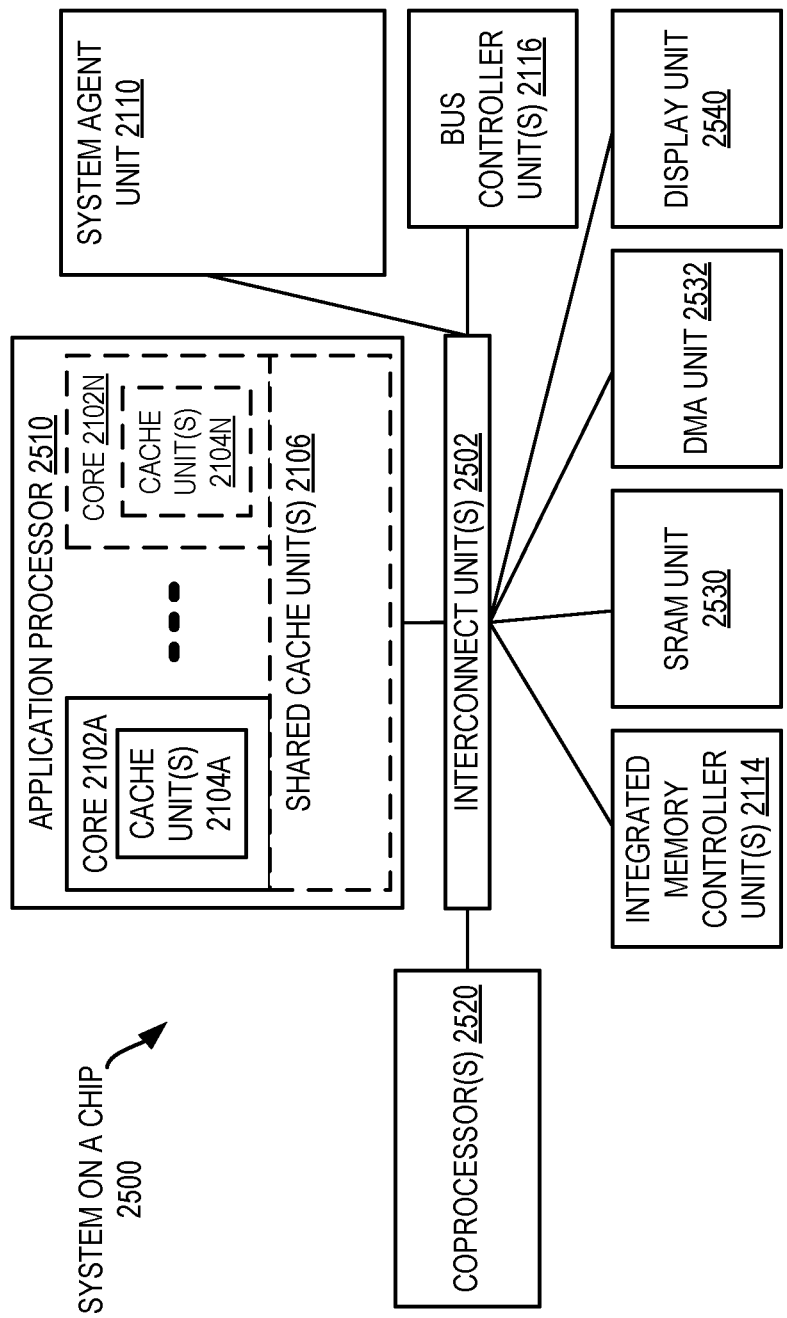
FIG. 25, shown is a block diagram of a system on a chip (SoC) in accordance with an embodiment of the present disclosure.

Referring now to FIG. 25, shown is a block diagram of a SoC 2500 in accordance with an embodiment of the present disclosure. Similar elements in FIG. 21 bear like reference numerals. Also, dashed lined boxes are optional features on more advanced SoCs. In FIG. 25, an interconnect unit(s) 2502 is coupled to: an application processor 2510 which includes a set of one or more cores 2102A-N and shared cache unit(s) 2106; a system agent unit 2110; a bus controller unit(s) 2116; an integrated memory controller unit(s) 2114; a set or one or more coprocessors 2520 which may include integrated graphics logic, an image processor, an audio processor, and a video processor; a static random access memory (SRAM) unit 2530; a direct memory access (DMA) unit 2532; and a display unit 2540 for coupling to one or more external displays. In one embodiment, the coprocessor(s) 2520 include a special-purpose processor, such as, for example, a network or communication processor, compression engine, GPGPU, a high-throughput MIC processor, embedded processor, or the like.

Embodiments (e.g., of the mechanisms) disclosed herein may be implemented in hardware, software, firmware, or a combination of such implementation approaches. Embodiments of the disclosure may be implemented as computer programs or program code executing on programmable systems comprising at least one processor, a storage system (including volatile and non-volatile memory and/or storage elements), at least one input device, and at least one output device.

Program code, such as code 2330 illustrated in FIG. 23, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (including Binary Translation, Code Morphing, etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 26:
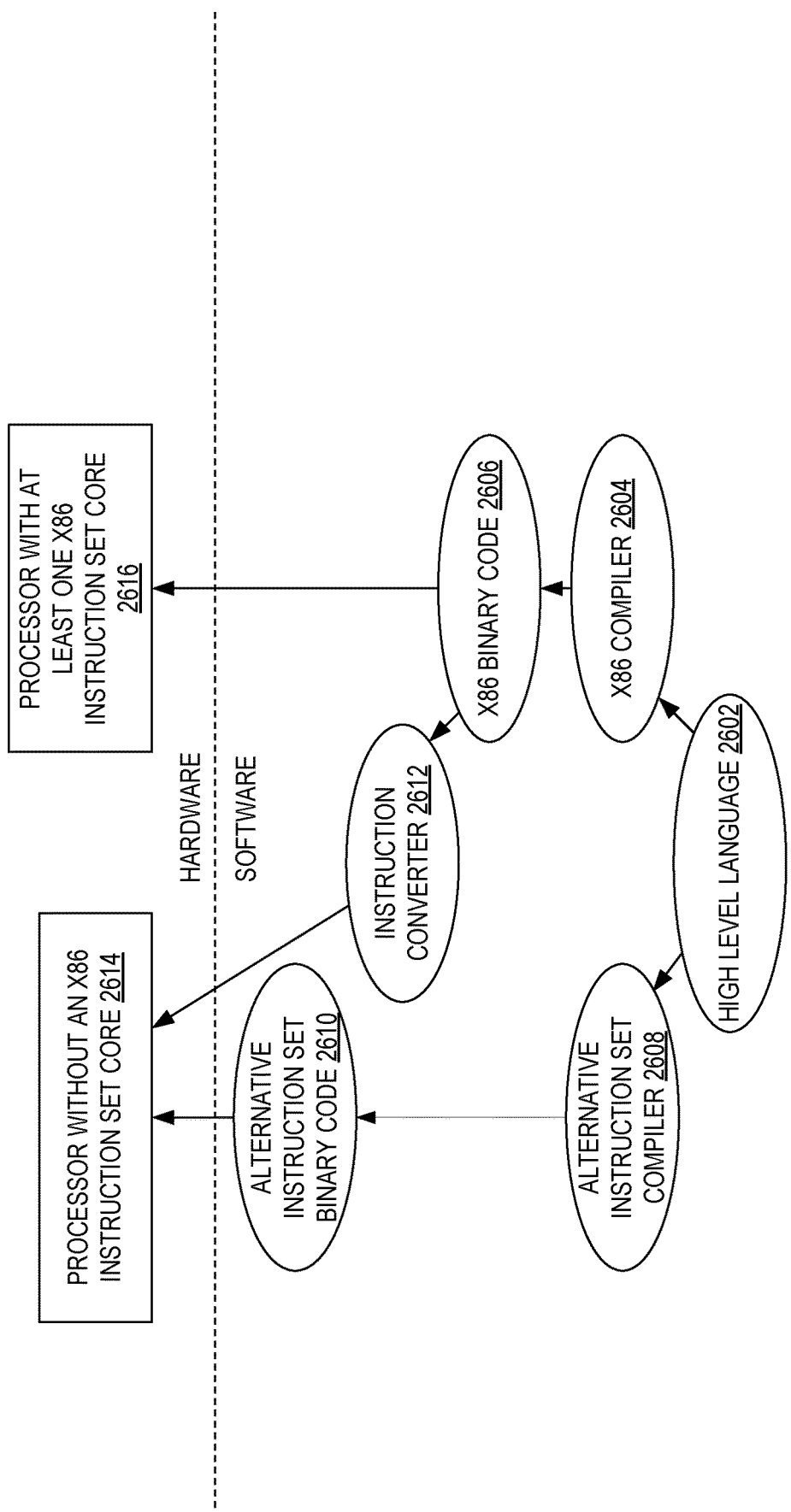
FIG. 26 is a block diagram contrasting the use of a software instruction converter to convert binary instructions in a source instruction set to binary instructions in a target instruction set according to embodiments of the disclosure.

FIG. 26 is a block diagram contrasting the use of a software instruction converter to convert binary instructions in a source instruction set to binary instructions in a target instruction set according to embodiments of the disclosure. In the illustrated embodiment, the instruction converter is a software instruction converter, although alternatively the instruction converter may be implemented in software, firmware, hardware, or various combinations thereof. FIG. 26 shows a program in a high level language 2602 may be compiled using an x86 compiler 2604 to generate x86 binary code 2606 that may be natively executed by a processor with at least one x86 instruction set core 2616. The processor with at least one x86 instruction set core 2616 represents any processor that can perform substantially the same functions as an Intel® processor with at least one x86 instruction set core by compatibly executing or otherwise processing (1) a substantial portion of the instruction set of the Intel® x86 instruction set core or (2) object code versions of applications or other software targeted to run on an Intel® processor with at least one x86 instruction set core, in order to achieve substantially the same result as an Intel® processor with at least one x86 instruction set core. The x86 compiler 2604 represents a compiler that is operable to generate x86 binary code 2606 (e.g., object code) that can, with or without additional linkage processing, be executed on the processor with at least one x86 instruction set core 2616. Similarly, FIG. 26 shows the program in the high level language 2602 may be compiled using an alternative instruction set compiler 2608 to generate alternative instruction set binary code 2610 that may be natively executed by a processor without at least one x86 instruction set core 2614 (e.g., a processor with cores that execute the MIPS instruction set of MIPS Technologies of Sunnyvale, Calif. and/or that execute the ARM instruction set of ARM Holdings of Sunnyvale, Calif.). The instruction converter 2612 is used to convert the x86 binary code 2606 into code that may be natively executed by the processor without an x86 instruction set core 2614. This converted code is not likely to be the same as the alternative instruction set binary code 2610 because an instruction converter capable of this is difficult to make; however, the converted code will accomplish the general operation and be made up of instructions from the alternative instruction set. Thus, the instruction converter 2612 represents software, firmware, hardware, or a combination thereof that, through emulation, simulation or any other process, allows a processor or other electronic device that does not have an x86 instruction set processor or core to execute the x86 binary code 2606.

What is claimed is:

1. A processor comprising:
 a decoder to decode an instruction into one or more micro-operations, the instruction having fields that identify a first packed data source, a second packed data source, and a packed data, and an opcode that is to indicate a bitwise logical operation to perform on the first packed data source and the second packed data source and indicate a width of each element of the first packed data source and the second packed data source; and
 an execution circuit to execute the one or more micro-operations to:
  perform the bitwise logical operation indicated by the opcode on the first packed data source and the second packed data source to produce a logical operation result of packed data elements having a same width as the width indicated by the opcode,
  perform a test operation on each element of the logical operation result to set a corresponding bit in a packed data test operation result to a first value when any of the bits in a respective element of the logical operation result are set to the first value, and set the corresponding bit to a second value otherwise,
  perform a bitwise logical not operation on the packed data test operation result to produce a resultant, and store the resultant into the packed data destination.

2. The processor of claim 1, wherein the fields of the instruction further identify a packed data mask source, and the execution circuit is to, before the store of the resultant, execute the one or more micro-operations to further mask the resultant from the bitwise logical not operation according to the packed data mask source to produce a masked resultant, and the store of the resultant is a store of the masked resultant.

3. The processor of claim 1, wherein the packed data destination is a write mask register.

4. The processor of claim 1, wherein the packed data destination is a vector register.

5. The processor of claim 1, wherein the bitwise logical operation indicated by the opcode is a bitwise logical OR.

6. The processor of claim 1, wherein the bitwise logical operation indicated by the opcode is a bitwise logical XOR.

7. The processor of claim 1, wherein the width of each element of the first packed data source and the second packed data source is a plurality of bits and the resultant is a single bit for each element of the logical operation result.

8. A method comprising:
 decoding an instruction with a decoder of a processor into one or more micro-operations, the instruction having fields that identify a first packed data source, a second packed data source, and a packed data destination, and an opcode that is to indicate a bitwise logical operation to perform on the first packed data source and the second packed data source and indicate a width of each element of the first packed data source and the second packed data source; and
 executing the one or more micro-operations with an execution circuit of the processor to:
  perform the bitwise logical operation indicated by the opcode on the first packed data source and the second packed data source to produce a logical operation result of packed data elements having a same width as the width indicated by the opcode,
  perform a test operation on each element of the logical operation result to set a corresponding bit in a packed data test operation result to a first value when any of the bits in a respective element of the logical operation result are set to the first value, and set the corresponding bit to a second value otherwise,
  perform a bitwise logical not operation on the packed data test operation result to produce a resultant, and store the resultant into the packed data destination.

9. The method of claim 8, wherein the fields of the instruction further identify a packed data mask source, and the executing the one or more micro-operations with the execution circuit, before the store of the resultant, further masks the resultant from the bitwise logical not operation according to the packed data mask source to produce a masked resultant, and the store of the resultant is a store of the masked resultant.

10. The method of claim 8, wherein the packed data destination is a write mask register.

11. The method of claim 8, wherein the packed data destination is a vector register.

12. The method of claim 8, wherein the bitwise logical operation indicated by the opcode is a bitwise logical OR.

13. The method of claim 8, wherein the bitwise logical operation indicated by the opcode is a bitwise logical XOR.

14. The method of claim 8, wherein the width of each element of the first packed data source and the second packed data source is a plurality of bits and the resultant is a single bit for each element of the logical operation result.

15. A non-transitory machine readable medium that stores code that when executed by a machine causes the machine to perform a method comprising:
- decoding an instruction with a decoder of a processor into one or more micro-operations, the instruction having fields that identify a first packed data source, a second packed data source, and a packed data destination, and an opcode that is to indicate a bitwise logical operation to perform on the first packed data source and the second packed data source and indicate a width of each element of the first packed data source and the second packed data source; and
- executing the one or more micro-operations with an execution circuit of the processor to:
  - perform the bitwise logical operation indicated by the opcode on the first packed data source and the second packed data source to produce a logical operation result of packed data elements having a same width as the width indicated by the opcode,
  - perform a test operation on each element of the logical operation result to set a corresponding bit in a packed data test operation result to a first value when any of the bits in a respective element of the logical operation result are set to the first value, and set the corresponding bit to a second value otherwise,
  - perform a bitwise logical not operation on the packed data test operation result to produce a resultant, and store the resultant into the packed data destination.

16. The non-transitory machine readable medium of claim 15, wherein the fields of the instruction further identify a packed data mask source, and the executing the one or more micro-operations with the execution circuit, before the store of the resultant, further masks the resultant from the bitwise logical not operation according to the packed data mask source to produce a masked resultant, and the store of the resultant is a store of the masked resultant.

17. The non-transitory machine readable medium of claim 15, wherein the packed data destination is a write mask register.

18. The non-transitory machine readable medium of claim 15, wherein the packed data destination is a vector register.

19. The non-transitory machine readable medium of claim 15, wherein the bitwise logical operation indicated by the opcode is a bitwise logical OR.

20. The non-transitory machine readable medium of claim 15, wherein the bitwise logical operation indicated by the opcode is a bitwise logical XOR.

21. The non-transitory machine readable medium of claim 15, wherein the width of each element of the first packed data source and the second packed data source is a plurality of bits and the resultant is a single bit for each element of the logical operation result.

* * * * *